(12) United States Patent
Lu et al.

(10) Patent No.: US 12,160,096 B2
(45) Date of Patent: Dec. 3, 2024

(54) SOLID-STATE CIRCUIT BREAKER BASED ON A WIRELESS COUPLING AND RESONANT CIRCUIT FOR MVDC SYSTEMS

(71) Applicant: Drexel University, Philadelphia, PA (US)

(72) Inventors: Fei Lu, Wynnewood, PA (US); Hua Zhang, Philadelphia, PA (US); Reza Kheirollahi, Philadelphia, PA (US); Yao Wang, Philadelphia, PA (US); Shuyan Zhao, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 190 days.

(21) Appl. No.: 17/996,088

(22) PCT Filed: Apr. 13, 2021

(86) PCT No.: PCT/US2021/027166
§ 371 (c)(1),
(2) Date: Oct. 13, 2022

(87) PCT Pub. No.: WO2021/211639
PCT Pub. Date: Oct. 21, 2021

(65) Prior Publication Data
US 2023/0187923 A1 Jun. 15, 2023

Related U.S. Application Data

(60) Provisional application No. 63/174,476, filed on Apr. 13, 2021, provisional application No. 63/009,529, filed on Apr. 14, 2020.

(51) Int. Cl.
*H02H 3/087* (2006.01)
*H01H 9/54* (2006.01)

(52) U.S. Cl.
CPC .............. *H02H 3/087* (2013.01); *H01H 9/54* (2013.01)

(58) Field of Classification Search
CPC ............................ H02H 3/087; H01H 33/596
See application file for complete search history.

(56) References Cited

U.S. PATENT DOCUMENTS

| 5,266,758 A | 11/1993 | Pham et al. |
| 2014/0346891 A1 | 11/2014 | Kang |

(Continued)

OTHER PUBLICATIONS

Written Opinion for the International Searching Authority issued in the Patent Corporation Treaty Application No. PCT/US2021/027166, mailed Aug. 2, 2021, 3 pages.

(Continued)

*Primary Examiner* — Jared Fureman
*Assistant Examiner* — Christopher J Clark
(74) *Attorney, Agent, or Firm* — Schott, PC

(57) ABSTRACT

With the fasting growth of renewable energy resources and DC supplied loads, DC electrical systems have been increasingly received attentions all over the world. DC breaker systems play a key role in protection systems for disconnecting sources and loads, and they are also used mainly for removing faulted sections from the system accurately and reliably. Solid state DC breakers benefit from fast response time and compactness features; however, due to the lack of zero current realization and high-power losses, the reliability and efficiency of these devices is low. The system proposes a solid-state DC breaker for medium voltage DC (MVDC) systems. The presented structure have two main parts: 1) a main conduction branch including stacked MV Silicon-Carbide (SiC) devices to improve the efficiency and provide a fast response time, 2) a breaker branch including a wireless capacitive coupling to avoid metal-to-metal contact and (Continued)

increase the overall reliability, and also a modular current pulse power supply to realize zero-current switching.

13 Claims, 63 Drawing Sheets

(56) References Cited

U.S. PATENT DOCUMENTS

| | | |
|---|---|---|
| 2018/0005783 A1 | 1/2018 | Yaun et al. |
| 2021/0006063 A1* | 1/2021 | Mackey ............... H02H 1/0007 |
| 2021/0082643 A1* | 3/2021 | Davidson ............... H01H 9/542 |
| 2021/0218387 A1* | 7/2021 | Krishnan ............... H03K 17/73 |
| 2022/0006281 A1* | 1/2022 | Shen ..................... H01H 9/542 |

OTHER PUBLICATIONS

International Search Report issued in the Patent Corporation Treaty Application No. PCT/US2021/027166, mailed Aug. 2, 2021, 1 pages.

\* cited by examiner (a) Mechanical circuit breaker (b) Solid state circuit breaker (c) Hybrid circuit breaker 0    40    80(mm)

0    35    70(mm)

Proposed flowchart for determining $L_{eq}$ and $C_M$

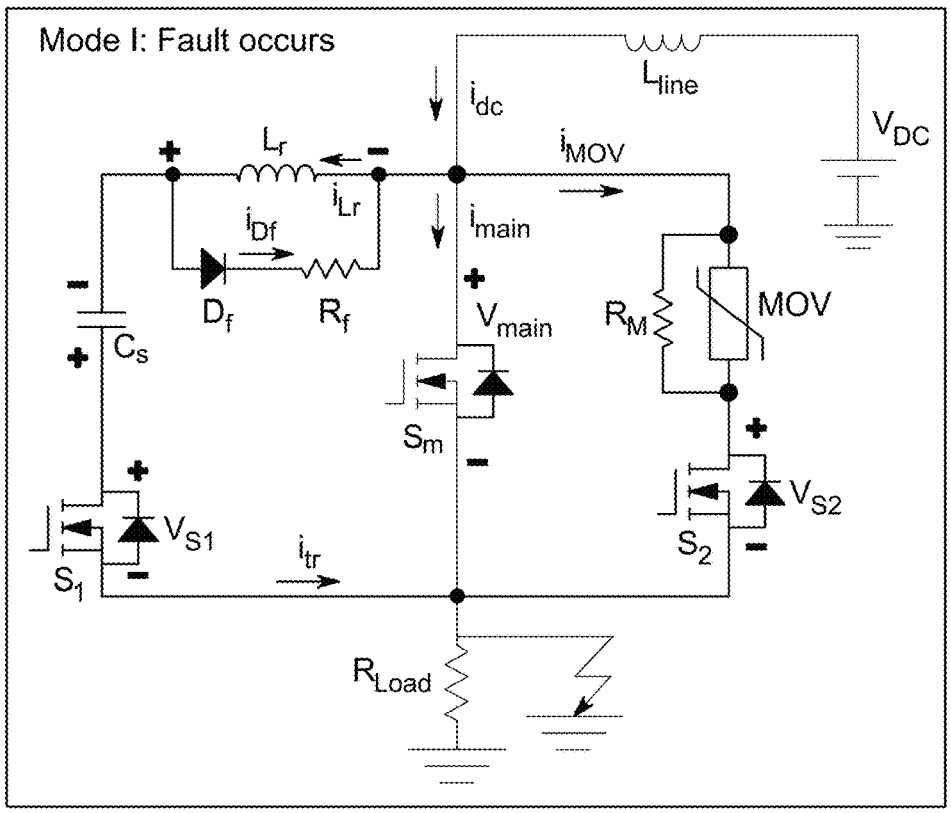
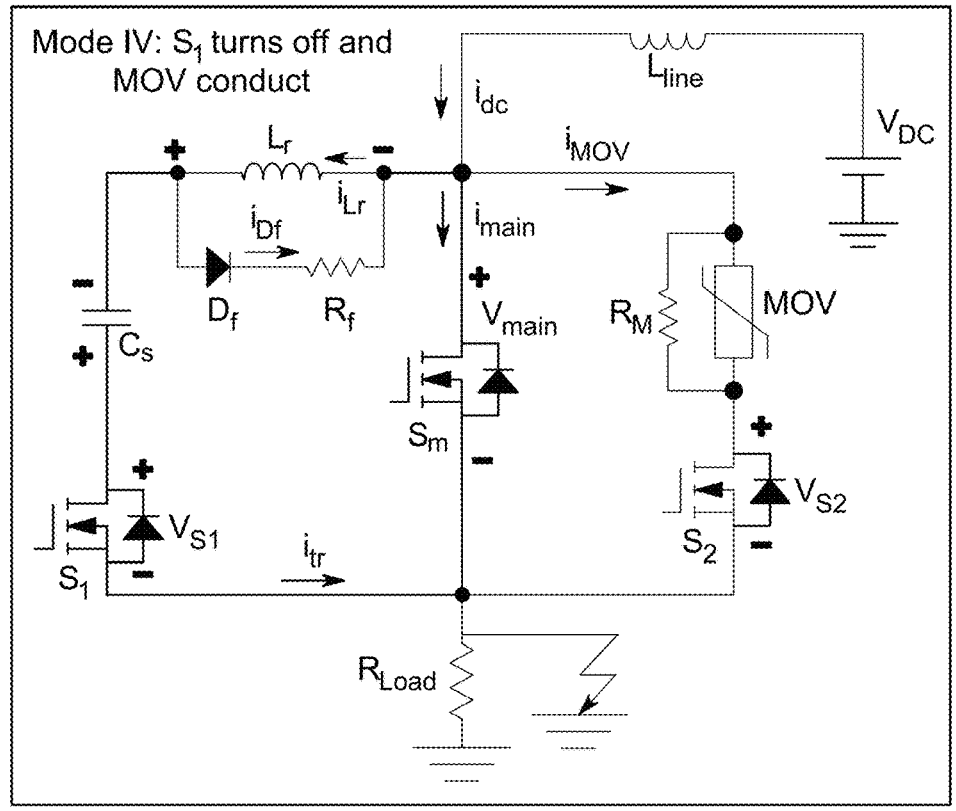
FIG. 50A

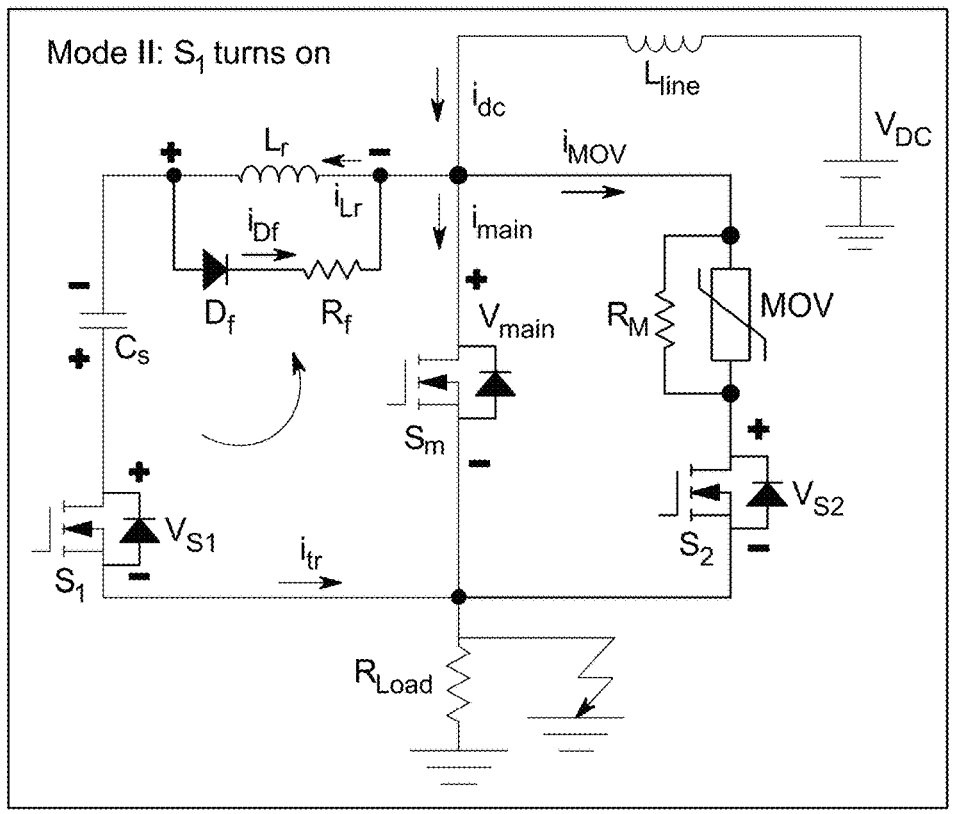
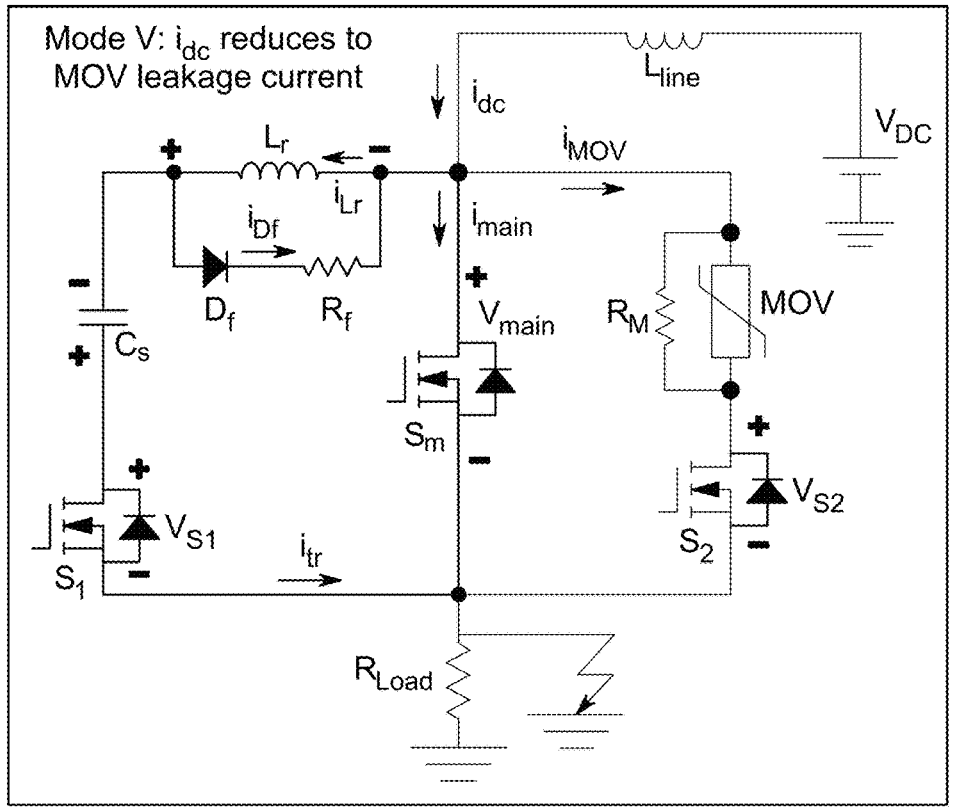
FIG. 50B

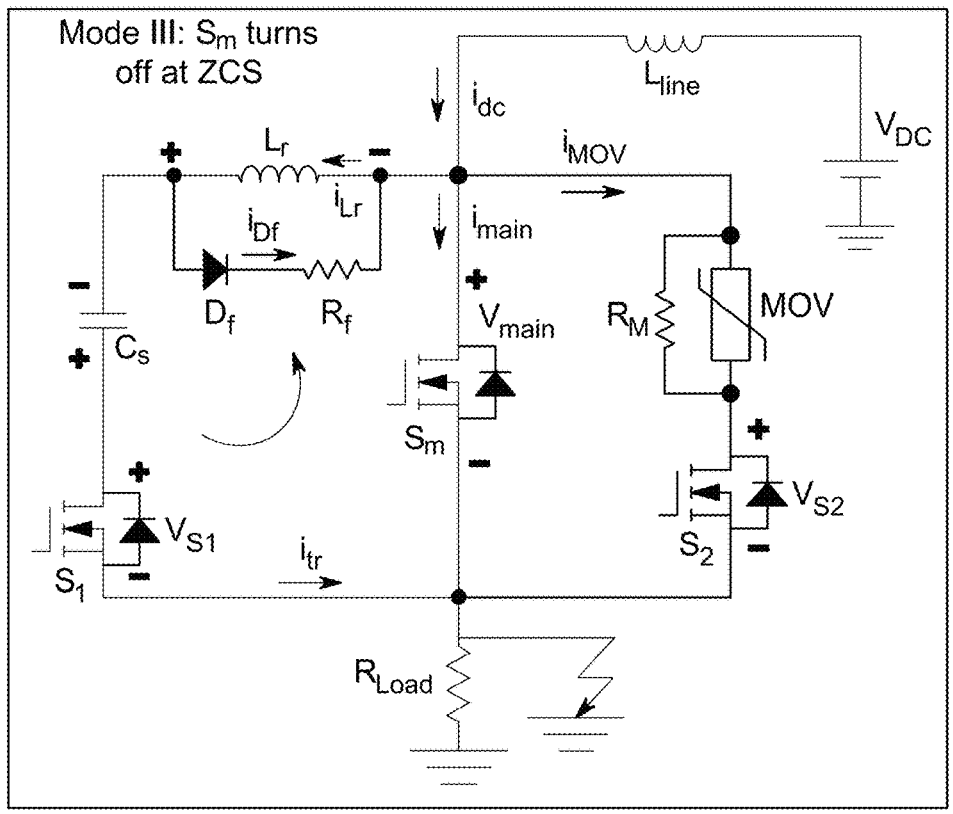
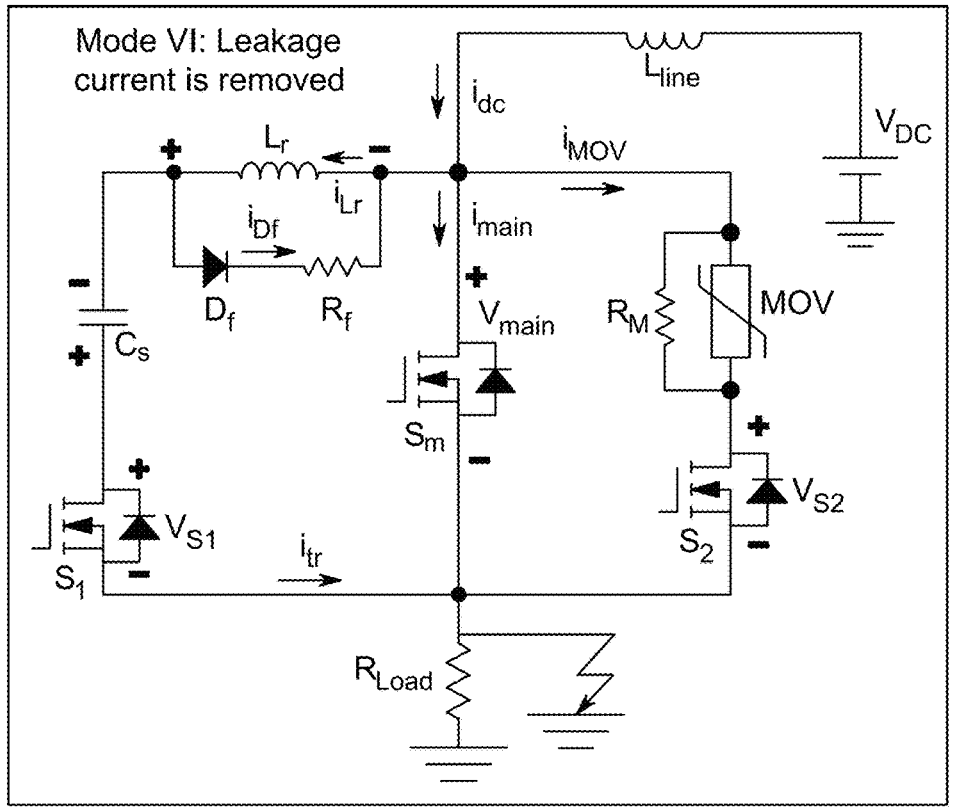
FIG. 50C

Table 1

| Current value | Module 1 | Module 2 | Module 3 | Module 4 |
|---|---|---|---|---|
| $I_{dc,min}$ | Active | Inactive | Inactive | Inactive |
| $I_2$ | Inactive | Active | Inactive | Inactive |
| ⋮ | ⋮ | ⋮ | ⋮ | ⋮ |
| $I_{dc,max}$ | Active | Active | Active | Active |

FIG. 58

Table 2

| Parameters | Upper level | Lower level |
|---|---|---|
| $\Delta t_{min}$ | NON | 1 µs |
| $\alpha_0$ | 1 | 0.75 |
| $C_M$ | 100nF | 200pF |
| $I_{Load}$ | $I_{dc,max}$ = 200 | $I_{dc,min}$ = 40 |
| $L_{eq}$ | 0.1µH | 150µH |

FIG. 59

Table 3

| Parameter | Value |
|---|---|
| Number of particles | 20 |
| Maximum iteration | 10000 |
| Accelerate constant C1 | 2 |
| Accelerate constant C2 | 2 |
| Maximum inertia weight | 0.9 |
| Maximum inertia weight | 0.2 |
| Maximum limited velocity | $(\mu b - 1b)* 0.2;$ |
| $K_1, K_2, K_3, K_4$ | 100 |

FIG. 60

Table 4

| Parameter | $C_M$ | $L_{eq}$ | $L_1$ | $L_2$ | $L_3$ | $L_4$ | $V_0$ | $R_1...R_4$ | $\alpha_0$ |
|---|---|---|---|---|---|---|---|---|---|
| Design value | 88nF | 8.73µH | 150µH | 102.9µH | 55.8µH | 12.5µH | 2kV | 0.04 Ohm | 0.8 |

FIG. 61

Table 5

| Parameter | Design value | Parameter | Design value |
|---|---|---|---|
| $V_{DC}$ | 380V | $L_{line}$ | 300μH |
| $L_1(L_2)$ | 14μH (8μH) | $R_1(R_2)$ | 1Ω(1Ω) |
| C | 300nF | $V_c$ | 135V |
| MOV | V320LA20AP | MOSFETs | C3M0016120D |
| Diodes | MSC030SDA120B | $V_{in}$ | 9V |
| $C_1(C_2)$ | 36.93nF (21.2nF) | $L_{s1}(L_{s2})$ | 96.9μH (166μH) |
| $Q_1(Q_2)$* | 265 (405) | k | 0.2 |

*Primary and secondary quality factora

FIG. 62

Table 6

| Parameter | Design value | Parameter | Design value |
|---|---|---|---|
| $|V_{in}|$ | 36V | $|V_1|,|V_2|,|V_3|$ | 24V |
| $L_f$ | 2.45μH | k | 0.067 |
| $L_{0t}, L_{1t}, L_{2t}, L_{3t}$ | 23.8μH | $L_{1r}, L_{2r}, L_{3r}$ | 23.8μH |
| $M_{T1}, M_{T2}, M_{T3}$ | 1.72V | Q | 400 |
| $R_{11} \sim R_{33}$ | 64Ω | $f_{sw}$ | 500kHz |
| $f_{sw}$ | 500kHz | Number of turns | 12 |
| Diameter of each Coil | 100mm | Distance | 65mm |

FIG. 63

Table 7

| Parameter | Design value | Parameter | Design value |
|---|---|---|---|
| $L_T, L_0, L_1, L_2, L_3$ | 4A | $L_{T1}, L_{T2}, L_{T3}$ | 3.93μH |
| $L_{S1}, L_{S2}, L_{S3}$ | 5.2μH | $N_p$ | 1 |
| $N_s$ | 3 | $K_{T1}, K_{T2}, K_{T3}$ | 0.38 |
| $\mu_0$ | 1000 | Core size | 35×6×6mm |
| Diameter of primary | 315mm | $V_{out}$ | 21.6V |

FIG. 64

Table 8

| Parameter | Design value | Parameter | Design value |
|---|---|---|---|
| $V_{DC}$ | 1.67kV | $I_{DC,max}$ | 166.67A |
| $L_{line}$ | 300μH | $R_{Load}$ | 10Ω |
| $C_s$ | 22μH | $C_r$ | 1.1μF |
| $L_r$ | 5μH | $V_{Cs}$ | 400V |
| MOV | V661DB40 | $R_f$ | 1kΩ |
| $V_{in}$ | 24V | $L_1 (L_2)$ | 60μH (300μH) |
| $C_1 (C_2)$ | 50nF (21.9nF) | $Q_1 (Q_2)$ | 350 (500) |
| k | 0.1 | | |

FIG. 65

Table 9

| Parameter | Design value | Parameter | Design value |
|---|---|---|---|
| $V_{DC}$ | 1.67kV | $I_{DC,max}$ | 88.33A |
| $L_{line}$ | 300µH | $R_{Load}$ | 20Ω |
| $C_s$ | 22µH | $L_r$ | 8µH |
| $V_{Cs}$ | 85V | MOV | V661DB40 |
| $R_M$ | 1kΩ | $R_f$ | 1Ω |
| $V_{in}$ | 24V | $L_1 (L_2)$ | 80µH (100µH) |
| $C_1 (C_2)$ | 48nF (35nF) | $Q_1 (Q_2)$ | 350 (500) |
| k | 0.2 | | |

FIG. 66

Table 10

| Parameter | Design value | Parameter | Design value |
|---|---|---|---|
| $V_{DC}$ | 380V | $L_{line}$ | 300µH |
| $R_{line}$ | 0.15Ω | $R_{Load}$ | 4.55Ω(8kW) |
| $L_{Load}$ | 3µH | $L_r$ | 8µH |
| $C_s$ | 22µF | $V_{Cs}$ | 104V |
| $R_M$ | 1kΩ (200W) | $R_f$ | 1Ω |
| $V_{in}$ | 6.8V | $C_1 (C_2)$ | 36.93nF (21.2nF) |
| $L_1 (L_2)$ | 96.9µH (166µH) | $L_1 (L_2)$ | 96.9µH (166µH) |
| k | 0.2 | | |

FIG. 67

SOLID-STATE CIRCUIT BREAKER BASED ON A WIRELESS COUPLING AND RESONANT CIRCUIT FOR MVDC SYSTEMS

STATEMENT REGARDING GOVERNMENT SUPPORT

This invention was made with government support under Award No.: DE-AR0001114 awarded by Research Projects Agency-Energy (ARPA-E). The government has certain rights in the invention.

BACKGROUND

A DC system is a straightforward method to achieve electric power transmission and has shown advantages over the conventional AC power grid in terms of power capability and efficiency. High (>100 kV), medium (1 kV-100 kV), and low voltage (<1 kV) DC (HVDC, MVDC, and LVDC) systems have been widely applied in modern power systems, especially in newly established power generation and distribution systems. The DC power system also can act as a buffer in the interconnection of different AC systems. In practical applications, the voltage level of DC transmission systems keeps increasing, resulting in ultra-high voltage DC (1100 kV) systems in order to reduce the power loss. All these factors have promoted the development of DC power systems in industry and stimulated research in academia to improve this technology.

The DC power system is also convenient to combine dc-based power generators and loads together, reducing the required stages of power conversion and increasing the total energy transmission efficiency. As more DC renewable energy, such as solar power generation, is added to the power system, it becomes more necessary to directly use its original form for the transmission, and the dc-to-ac inverter is then mitigated. In addition, as more DC-form loads, such as batteries and other energy storage components, are directly connected to the power grid, eliminating the ac-to-dc converter required for an AC system improves overall system efficiency. Therefore, it is expected to have more DC power systems at both the generation and load sides.

Both HVDC and LVDC technologies have been well-studied recently. Meanwhile, research and application of MVDC systems are also increasing as the intermediate bridge between the HVDC and LVDC systems. In applications, the challenge lies in identifying the proper technique to adopt and optimize according to requirements. In most scenarios the MVDC system is simply designed as a downsized version of the HVDC system or an upsized version of the LVDC system, in which the distinguishing properties of the MVDC system are usually not sufficiently considered. In addition, since more distributed energy generation systems and high-power electronic loads are directly connected to the MVDC transmission system, the system complexity is significantly increased. Therefore, it may be meaningful to consider the characteristics of the MVDC system and design the corresponding power electronics hardware and control algorithm to ensure optimal operation of the MVDC system.

To utilize MV systems, protection functions may be well developed. Timely and accurately detecting faults and removing them from the system without imposing electrical stress on load side's devices are the main duties of the implemented protection systems. Among protective devices, DC circuit breakers perform a key role in disconnecting loads or removing faulted sections. Thanks to research conducted during last decades, there are three categories of circuit breakers in the DC power system: the mechanical circuit breaker (MCB), the solid-state circuit breaker (SSCB), and the hybrid circuit breaker (HCB), as shown in FIGS. 1(a)-1(c).

The structure of a MCB circuit is quite simple, including a mechanical switch series-connected into the main power line. The advantages lie in its low cost and high efficiency. However, the response speed of the mechanical switch is relatively slow. In addition, in the switching transient, the high current flowing through the switch can generate arcing problems that affect the safety and lifetime of the breaker. In a conventional SSBC switch, semiconductor devices replace the mechanical switch to achieve the protection function. The voltage rating of the switch is determined by the number of devices in series, and so it is sufficiently flexible to be used in both low- and high-voltage systems. The most significant merit is its fast response speed, and so can dramatically limit the fault current magnitude. Moreover, the arcing problem can be solved. However, the cost of the switches in-used is relatively high, and the efficiency is relatively low due to its internal resistance. The HCB combines the merits of both the mechanical and solid-state devices and consists of an ultra-fast mechanical disconnector and series-connected semiconductor devices; however, their response time needs to be more improved.

Pulse power is the process of storing energy in a predefined long time period, called charging time, and releasing it at the load side in a really short period of time, named as discharge time which takes from the range of several nanosecond to a few millisecond regarding target applications. Pulse power supplies (PPSs) can be classified into two categories based on the type of energy storage components (electromagnetic fields' energy or electrical field' energy): capacitive PPSs and inductive PPSs. Another classification is made based on the output electrical parameters. If output high voltage pulse is desired, the topology is named as voltage PPS; however, if output high current pulse is required at the load side, the circuit is called current PPS.

In other art, employing wide bandgap (WBGs) devices prepares higher efficiency and increased electrical ratings and leads to a more compact design. Therefore, using WBGs in SSCBs overcome the limitation of low efficiency of SSCBs reported during last decades and makes them as one of the most interesting alternatives in designing CBs for high-tech applications.

Due to the lack of zero-crossing-current in DC systems, interrupting high fault DC current leads to high voltage oscillations which can be the source of damages to CBs itself, the system's equipment, and the load side devices. To solve this problem, one solution is providing an artificial zero-crossing-current during DC current breaking. This is achieved by connecting a transfer active injection circuit in parallel to the main conduction branch and injecting a reverse pulse current to cancel the fault current in the main switch. In combination with main and transfer branches, energy absorbing varistors are placed in parallel to the main branch to protect the SSCB from high voltage oscillations.

SUMMARY OF THE EMBODIMENTS

This disclosure proposes a solid-state dc breaker to overcome the problems of current circuit breaker systems. The concepts and topologies include: 1) breaker branch concept is illustrated to realize the zero-current switching for the DC breaker system, 2) MV SiC devices are stacked as the normal conduction branch of the solid state provide fast response speed and improve efficiency, 3) coupling between main conduction branch and breaker branch is made by wireless capacitive couplers to improve the reliability, 4) a new modular pulse power supply is presented for the breaker branch to obtain high current pulse required for zero-current realization.

This disclosure also presents a fast modular SSCB for MVDC system applications. By achieving zero current switching (ZCS) during DC current interruption, the reliability is improved, the lifetime is increased, and the voltage oscillations during DC current breaking is reduced. In addition, by preparing current-transformer (CT)-based gate-drive power supply connected to an inductive wireless power transfer system, high voltage isolation is obtained for power switches connected in series and parallel in the main branch. Next, the proposed SSCB benefits from modularity to provide electrical ratings scalability. Finally, compactness and high efficiency are achieved.

BRIEF DESCRIPTION OF THE DRAWINGS

FIGS. 50(a)-(c) shows operational modes of the proposed SSCB.

FIG. 58 shows Table 1.
FIG. 59 shows Table 2.
FIG. 60 shows Table 3.
FIG. 61 shows Table 4.
FIG. 62 shows Table 5.
FIG. 63 shows Table 6.
FIG. 64 shows Table 7.
FIG. 65 shows Table 8.
FIG. 66 shows Table 9.
FIG. 67 shows Table 10.

DETAILED DESCRIPTION OF THE EMBODIMENTS

This disclosure proposes a fast and high-reliability solid state breaker for fault protection in a medium voltage DC (MVDC) system as well as a solid-state circuit breaker for use in other DC power systems. Certain known abbreviations and symbols in the figures and specification are shown with an understanding that they would be known to a person of ordinary skill in the art, and are not explained in greater detail.

Figure 1A:
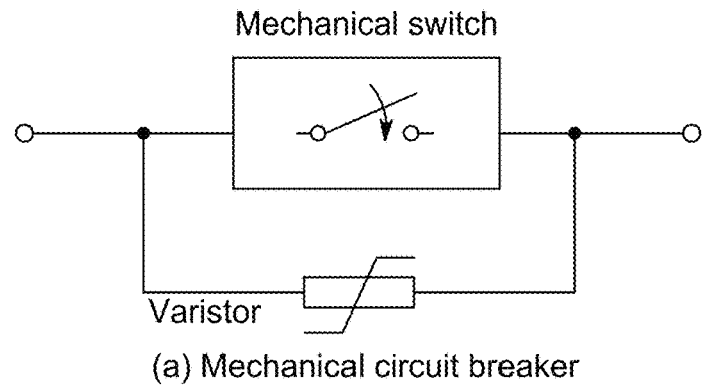
FIGS. 1(a)-1(c) show categories of circuit breakers for a DC system.
Figure 1B:
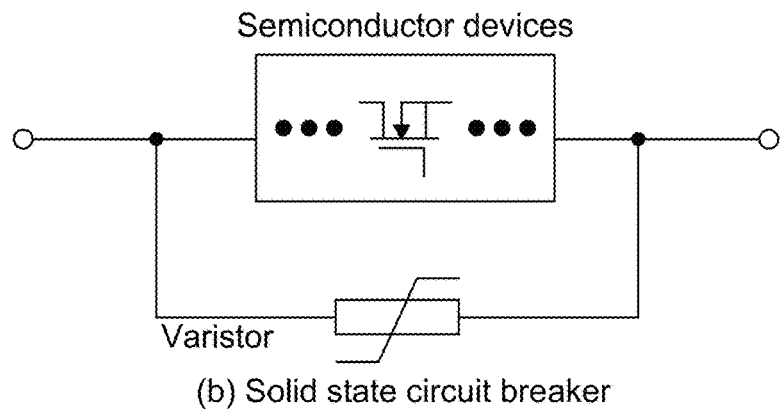
Figure 1C:
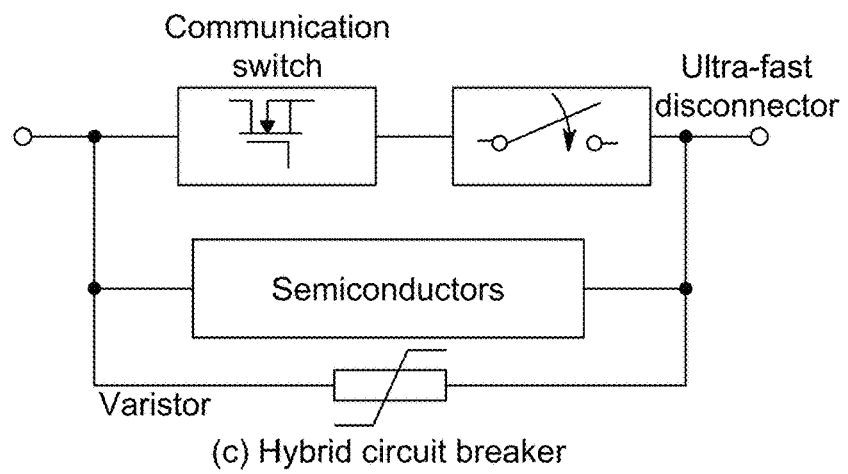
Figure 2:
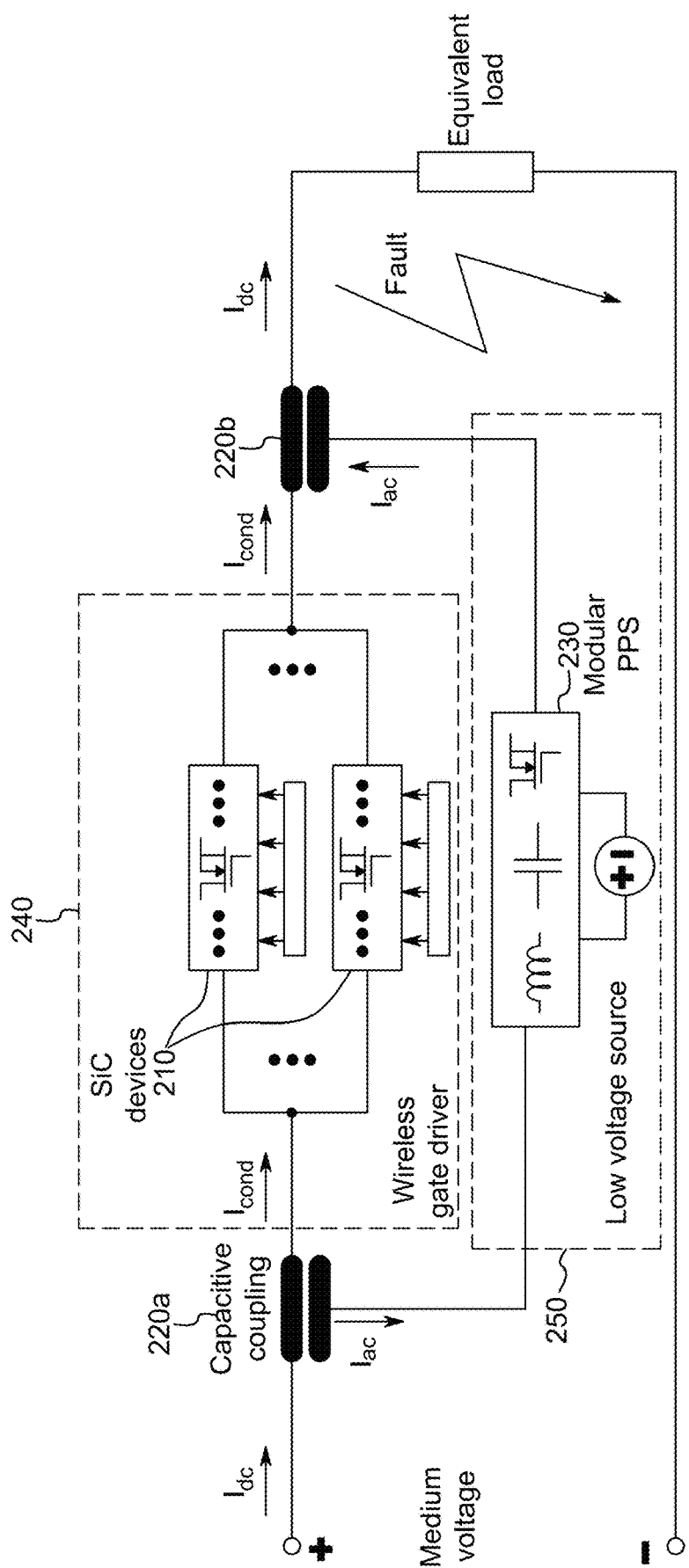
FIG. 2 is a proposed structure of the SSCB for an MVDC system.

1. A Solid-State Circuit Breaker Based on a Wireless Coupling and Resonant Circuit for Mvdc Systems 1.1. Technique Approach 1.1.1. Breaker Branch Concept The proposed structure of solid-state DC breaker system 200 is shown in FIG. 2. The structure includes the normal conduction branch 240 including stacked MV SiC devices 210 and capacitive couplings 220a, 220b (located on either side of the MV SiC devices), and a modular current programmable power supply PPS 230. The working principle of the proposed SSCB topology is shown in FIG. 2.

In the normal operating scenario, the MVDC system 200 supplies power to the load with the desired current $I_{dc}$. High current only flows through the SiC devices 210 in the conduction branch 240 (the SiC devices 210, as opposed to the breaker branch 250) and multiple devices are connected in parallel to reduce the equivalent internal resistance and the corresponding conduction loss. FIG. 2 also shows that the current flows through the primary side of the capacitive coupler 220a as well. Since the capacitive couplings may be made from metal, the conduction loss of the capacitive coupler may be relatively small. In the normal conduction status, the auxiliary modular current PPS 230 is not working and there is no current flowing through the capacitive coupler 220a, which means $I_{ac}=0$.

When a fault occurs in the MVDC system 200, for example a short-circuit fault, the working process of the SSCB is quite different from the normal case. After the fault is detected, the breaker branch needs to react and disconnect the load with the medium voltage source in time. Otherwise, the fault current can increase rapidly to an extremely large value, resulting in a hazard to the system. The performance of the protection is closely determined by the response time, which needs to be fast enough to protect the system from over current. Once the protecting process begins, the auxiliary modular current PPS 230 is triggered. After the PPS circuit 230 is triggered, a current pulse $I_{ac,puls}e$ is generated. This current flows through the capacitive coupler 220b and is injected into the main conduction switch. In this case, the conduction current $I_{cond}$ of the switch is expressed as:

$$I_{cond}=I_{dc}I_{ac,pulse} \quad (1)$$

The current relationship clearly shows that the conduction current $I_{cond}$ can be easily adjusted by the peak pulse current $I_{ac,pulse}$. In the modular current PPS circuit 230, the pulse current value is determined based on the circuit parameters and the input voltage source. Usually, the main conduction switch requires zero-current switching to avoid the oscillation of voltage and current during the switching transient. The proposed structure shows that zero-current switching can be achieved by providing a proper current pulse from the breaker branch.

1.1.2. The Normal Conduction Branch of Stacked MV SiC Devices

Wide bandgap devices contribute to bring a more promising future for the development of power electronics. The gallium nitride (GaN) and SiC devices are the most used new devices. Usually, GaN devices are more suitable for the low power and high frequency systems, and the SiC devices aims at high power and high efficiency applications. In the medium voltage scenario, the SiC devices may be adopted to compose the main conduction branch 240, and the circuit structure is shown in FIG. 3.

Figure 3:
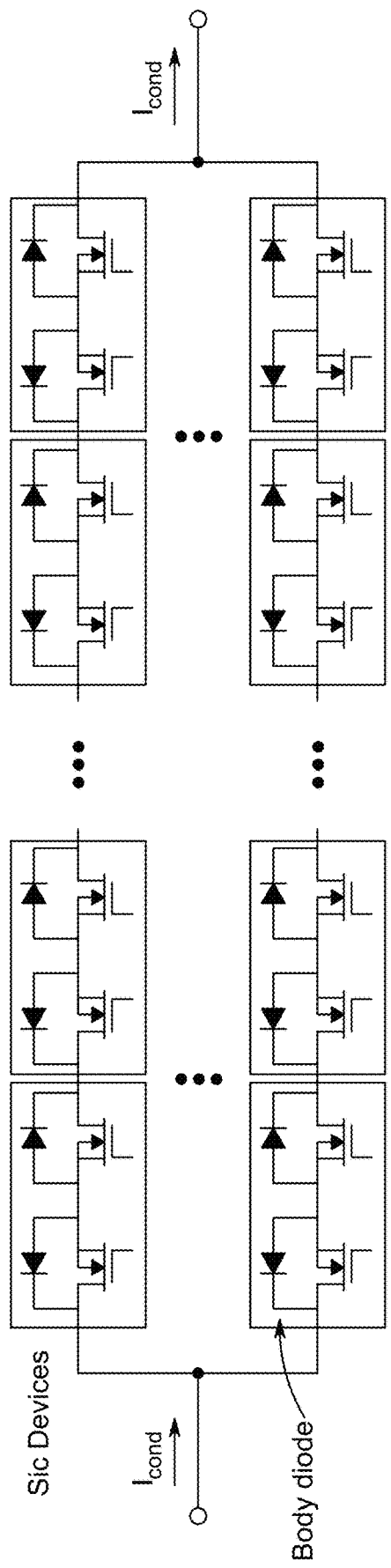
FIG. 3 shows a structure of a bidirectional main conduction branch.

In FIG. 3, the MOSFET contains an anti-parallel connected internal body diode, so two switches are oppositely connected to form a bidirectional switch. It can allow the dc current to flow through in both directions, which is flexible to use in practice. Moreover, this structure works as a fully controlled switch, and the conduction path is only available when the control signal (gate driver signal) is applied. When the control signal is removed from the gate, the proposed switch may stop conducting in either direction. It needs to be pointed out the opposite connection of the MOSFETs would double the conduction loss of the switch. For an application, if the current flow direction is fixed and there is no worry about the reverse current, the total number of the MOSFETs can be reduced by half and the total power loss is then reduced by half as well.

In the normal conduction mode, the gate driver signals may be applied to all the MOSFETs, the main body of all the MOSFET starts to conduct regardless of the connection direction. Meanwhile, the body diode inside the MOSFET is bypassed by the main body, which helps to reduce the conduction loss. Multiple devices are connected in series as a string to increase the voltage capability, and the total number of the devices depends on the rating voltage of a single device. Also, multiple strings are connected in parallel to increase the current capability, and the total number of the strings relates to the conduction loss. In order to meet the design requirement, the string number may need to be large enough. However, there is also a tradeoff between the power loss and the system complexity. Besides, the number of semiconductor devices also determines the total cost and power density of the circuit breaker.

When the short-current fault occurs, the conducting current in each device is going to increase in a short time. The device selection should consider a satisfactory safety margin for the current rating over a certain time period. When the reaction time of the switch is short, the safety margin can be small. However, when the reaction time is relatively long, the safety margin should be large enough, which means there should be more devices connected in parallel. Therefore, it shows that increasing the reaction speed and reducing the reaction time would help to simplify the topology of the conduction branch. After the fault current increases to a relatively large value, the main conduction switch should turn off to limit its continuous increase. If the turn-off action is performed immediately, it would cause voltage oscillation in the dc circuit and induce over voltage across both the switch and the load, which should be avoided. Therefore, an auxiliary breaker branch is designed to compensate or completely cancel the current increase during the fault time inside the breaker system. Although the fault current increases, the current flowing through the main conduction branch is reduced to zero by triggering modular current PPS, realizing the zero-current switch as in the conventional ac breaker. In the way, the main conduction branch works in a highly efficient and reliable status.

From the efficiency point of view, by stacking enough SiC devices, the equivalent turn-on resistance remains low to meet the efficiency requirement. If the equivalent turn-on resistance of stacked SiC devices is, the efficiency of the main conduction branch is given as follows:

$$\eta = \left(1 - \frac{I_{dc}^2 R_{ds,on}}{V_{dc} \cdot I_{dc}}\right) \times 100\% \quad (2)$$

where $V_{dc}$ is the system voltage and $I_{dc}$ is the load current.

Other than the basic working principle of the conduction branch, one important concern in the practical application is the balancing of currents among different strings. Considering the temperature coefficient of the SiC MOSFET, the total conduction current is evenly distributed among the strings to avoid the over current for any of them.

1.1.3. Wireless Coupling Capacitors

Compared to the previous MVDC circuit breakers, one distinguishing advantage of the proposed design is its high reliability provided by the capacitive coupling of the active resonant circuit. It eliminates direct metal-to-metal contact between the main conduction branch as a high-power circuit and breaker branch as a low power circuit. The auxiliary modular current PPS only works in fault conditions or load disconnecting modes, and so its power level does not need to be very high, which contributes to increase the system power density. In addition, FIG. 2 shows that only a low voltage source is required which is described in detail in the next section.

To design and implement capacitive couplers for the breaker branch, there are a few considerations; they are: 1) coupling capacitance: the value of coupling capacitance is determined based on the maximum fault current level, 2) insulating voltage: the insulating voltage is mainly determined based on the main conduction loop operating voltage, 3) current capability: the capacitor coupler should be capable of flowing current regarding the maximum fault current level, 4) size and weight: regarding this fact that compactness is one of the specifications of the resonant solid-state breaker, the size and weight of the capacitive coupler is significantly considered, 5) implementation flexibility: This fact decreases the design time and overall cost of the capacitive coupler.

Figure 4:
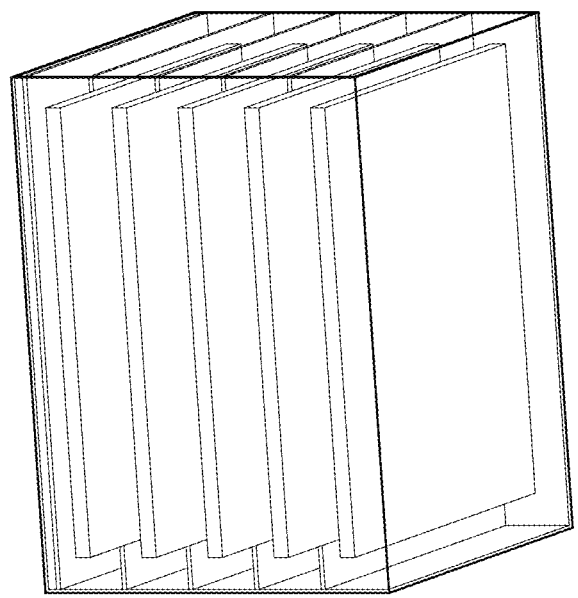
FIGS. 4-6 show three different coupling capacitors designed in Maxwell software which can be considered for practical applications.
Figure 5:
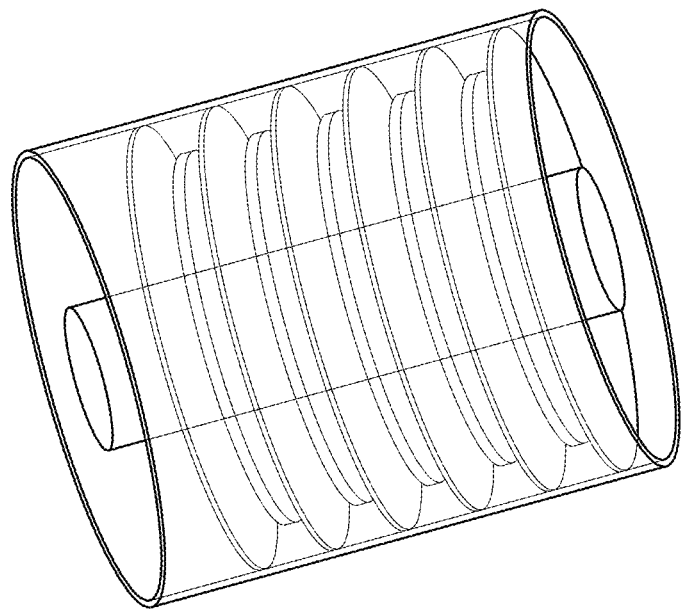
Figure 6:
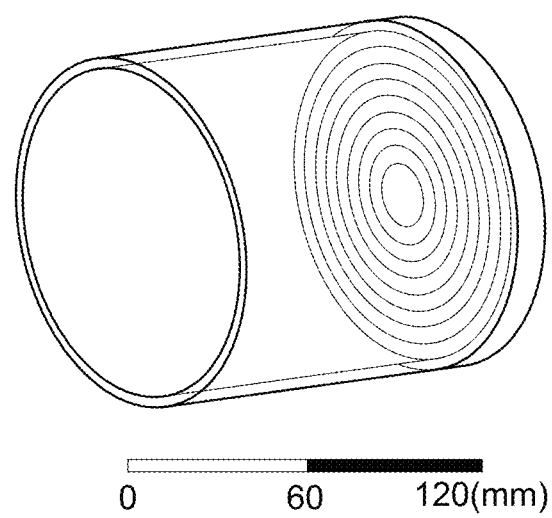

FIGS. 4, 5, and 6 show three different coupling capacitors designed in Maxwell software which can be considered for practical applications. FIG. 4 shows parallel plate structure. In this structure, rectangular plates are placed in parallel. The most advantage of this structure is that the effective area is high, so higher coupling capacitor can be obtained; besides, because two parts can be integrated easily, the implementation flexibility is acceptable. However, because of existing sharp corners in this structure, the electric field strength is high in corner points. FIG. 5 displays a cylinder coupler structure. In this structure, instead of parallel rectangular plates, several disk shape plates are placed in parallel with the same central axis. The advantage of this structure is low and distributed electric field strength all over the design. However, because of low effective area, the coupling capacitance is low; also, the implementation may be a time-consuming process in the procedure of implementing the capacitive coupler. FIG. 6 shows another cylindrical structure. This structure has the advantages of low distributed electric field strength enabling designers to decrease the metal-to-metal distance between concentric cylinders, which leads to higher coupling capacitance. However, the disadvantage of this design is the way of connecting inner and outer part to main conduction and breaker branches.

1.1.4. Modular Current Pulse Power Supply 1.1.4.1 Working Principle

Figure 7:
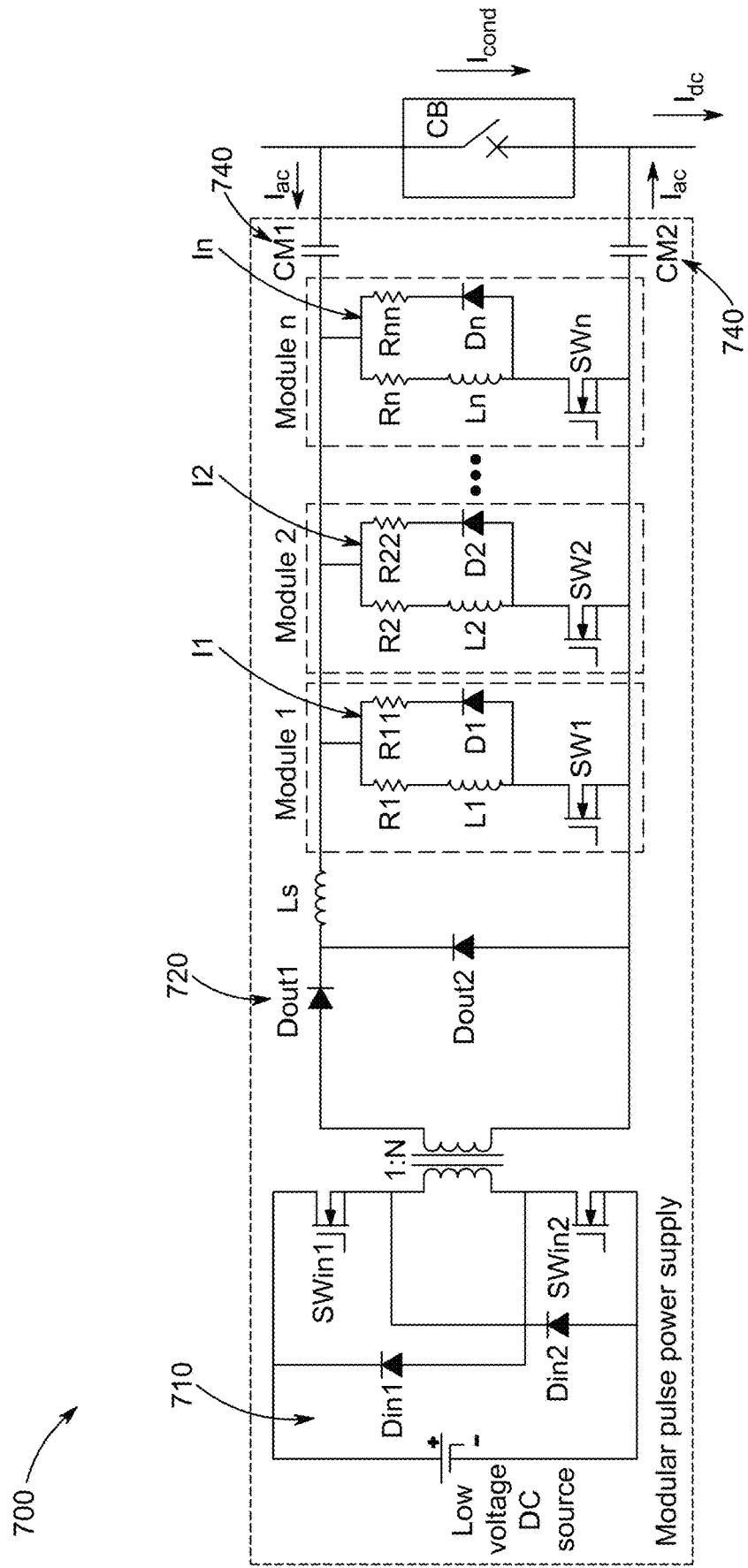
FIG. 7 shows a proposed modular current pulse power supply.

FIG. 7 displays the proposed modular current PPS topology. The circuit 700 is connected in parallel to the main conduction branch (from FIG. 2, reference number 240) through the coupling capacitors 220a, 220b. The topology includes three parts: 1) an input circuitry 710 to provide initial voltage on coupling capacitors from a low voltage DC source, 2) a modular structure 720 to obtain different pulse current levels, 3) coupling capacitors 740 employed for storing electrical energy. Note that the circuit breaker CB is connected to the circuit 700.

To charge the coupling capacitors 740 to provide desired initial voltage, a two-switch (SWin1, SWin2 with diodes Din1, Din2) forward converter is used in the input. This topology can convert input DC voltage to higher or lower level, negative or positive voltage. In this circuit, the voltage stress on input semiconductor switches is independent of output voltage, making the topology electrically scalable for higher output voltage. To achieve the ability of generating different current pulse levels, a modular structure 720 includes one or more modules that include inductor (I1, I2, In), a freewheeling diode (D1, D2, Dn), and a semiconductor switch (SW1, SW3, SWn). For N modules in the circuit, the proposed structure can generate $2^N-1$ different pulse current levels. The value of generated current pulse or the number of current levels can be extended by adding desired modules in the future without manipulating other parts of the circuit. Therefore, flexibility and scalability are obtained for generated current pulse values. In addition to the advantages of coupling capacitors mentioned in the previous section, the coupling capacitors are used as the main source of storing energy required at the time of generating the current pulse.

1.1.4.2. Analytical Expressions

Figure 8:
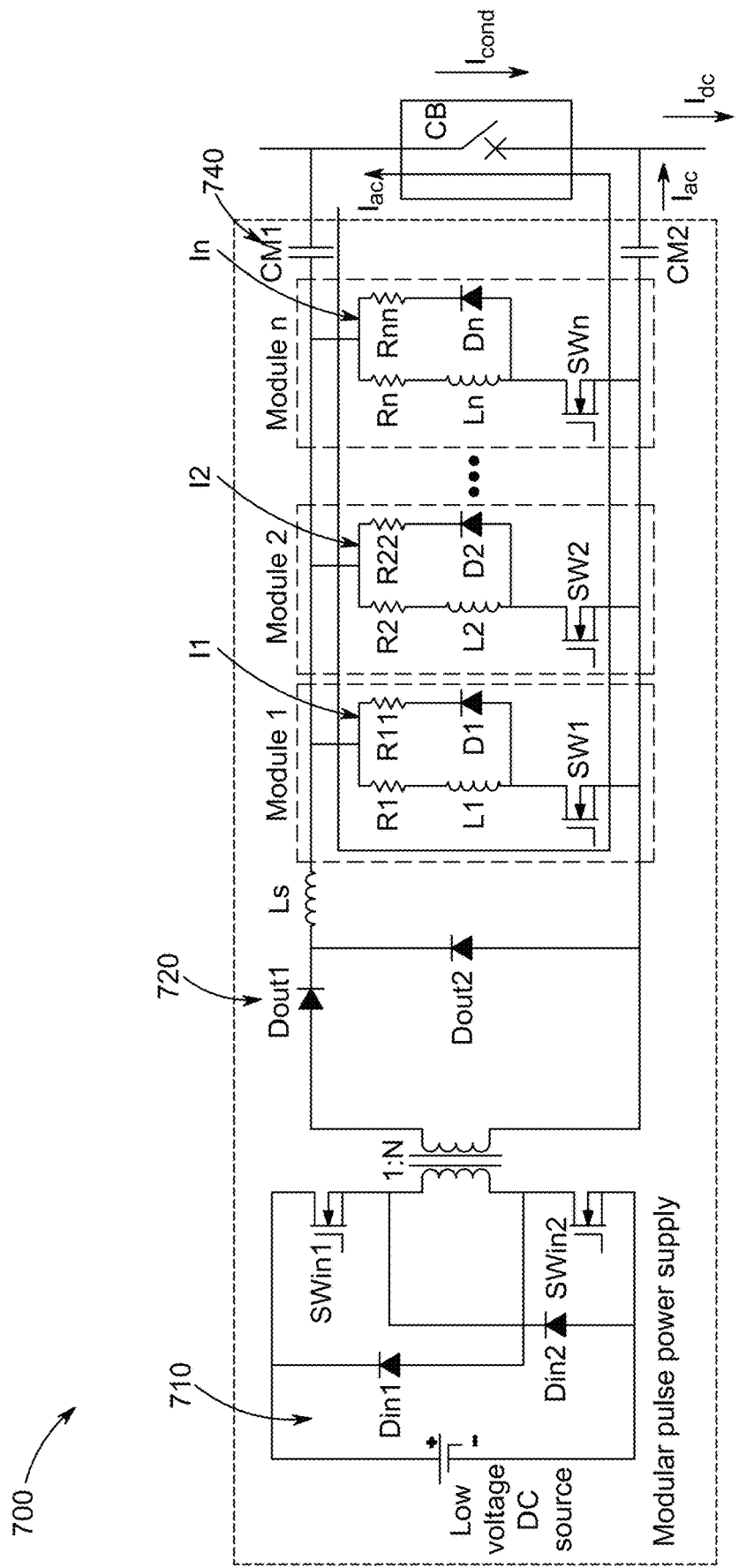
FIG. 8 is a proposed current pulse power supply considering module 1 activated in circuit.

The analytical expressions of the proposed topology by assuming one module in the circuit are illustrated in the following. FIG. 8 shows the proposed topology which module 1 is activated and other modules are deactivated. Based on the initial conditions of the inductor $L_1$ and coupling capacitor $C_M$ as $i_{L1}(0^+)=0$, $V_{C_M}(0^+)=V_0$, following expressions for current waveform $I_{ac}$ flowing through module 1 and circuit breaker (given by the liger grey line marked as $I_{ac}$ in FIG. 8) can be extracted. It is assumed that the switch SW1 is turned on at time t=0.

$$i(t) = \frac{\frac{V_0}{L_1}}{\sqrt{\omega_0^2 - \alpha^2}} e^{-\alpha t} \sin\left(\left(\sqrt{\omega_0^2 - \alpha^2}\right)t\right) \text{ where} \qquad (3)$$

$$\omega_0 = \frac{1}{\sqrt{L_1 C_M}}, \alpha = \frac{R}{2L_1}, \text{ and } C_M = \frac{CM_1 \times CM_2}{CM_1 + CM_2}. \qquad (3.1)$$

Where R is the sum of semiconductor switches' on-resistance, inductor's resistance, and coupling capacitors' resistance. Considering the fast response time of solid-state circuit breaker, it is assumed that the circuit breaker opens the circuit at the first generated electrical cycle of current pulse waveform. In this case, the maximum peak value of the generated current by the proposed topology occurs at the first cycle with the value given in equation (4) as follows:

$$i_{peak,1st} = \frac{\frac{V_0}{L_1}}{\sqrt{\omega_0^2 - \alpha^2}} e^{-\alpha \frac{\pi}{2\sqrt{\omega_0^2 - \alpha^2}}} \qquad (4)$$

Figure 9:
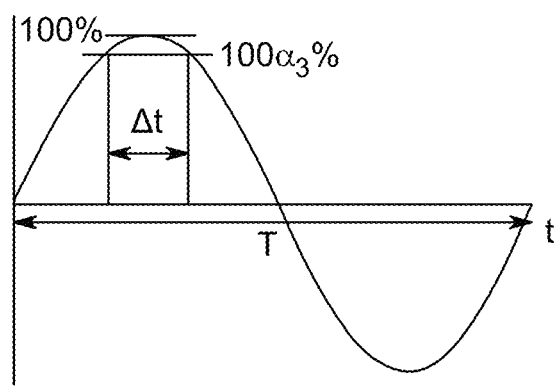
FIG. 9 shows a graph defining flat time period for the first cycle of a current waveform.

Another point is finding the flat current period $\Delta t$ of the first generated electrical cycle of modular current PPS. This is the whole time period required by control circuits and power stages of PPS and main conduction branch to operate correctly and reliably, considering all the practical time delays. In this time period, all the steps of triggering signal, generating proper AC current pulse, and operating of circuit breaker should be involved. FIG. 9 shows the flat time current period of Δt for the first cycle of current waveform. The value of Δt is calculated based on the coefficient $\alpha_0$:

$$\Delta t = \frac{\pi - 2\arcsin(\alpha_0)}{\sqrt{\omega_0^2 - \alpha^2}} \quad (5)$$

where $0<\alpha_0<1$. The parameter of $\alpha_0$ is defined based on the circuit breaker specifications. In the proposed system, the value of $\alpha_0$ is considered as 0.8 for reliable operation. Therefore, it is necessary to define the value of $\Delta t_{min}$ for maximum fault current level.

1.1.4.3. Component Selection Procedure

To meet the requirements of a typical solid-state DC breaker system, component values of proposed topology must be determined. The first step is to clearly define the minimum load current $I_{dc,min}$ and maximum fault current $I_{dc,max}$ levels. Secondly, the number of modules in the circuit must be determined. If the number of modules increases, the flexibility of the modular current PPS to generate different current levels is enhanced. Next, the values of coupling capacitor and equivalent inductor of all modules will be determined in a way that following statements are satisfied. The values of $i_{peak,1st}$ and Δt can be calculated regarding equations (4) and (5).

$$i_{peak,1st} > \frac{I_{dc,max}}{\alpha_0} \quad (6)$$

$$\Delta t > \Delta t_{min}$$

Figure 10:
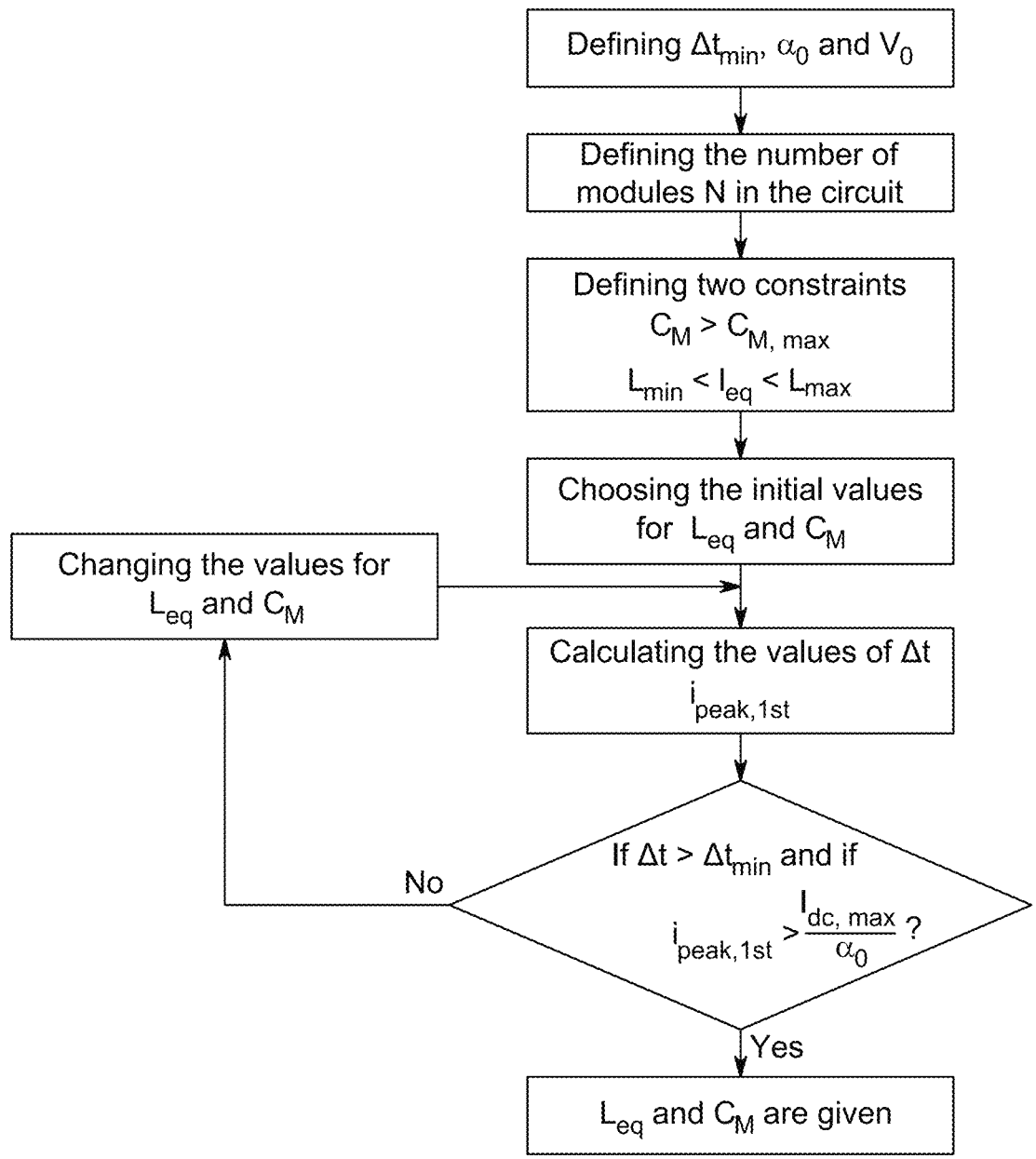
FIG. 10 is a proposed flowchart for determining $L_{eq}$ and $C_M$.

The flowchart of previous steps is shown in FIG. 10. As it can be shown in FIG. 10, there should be defined the lower and upper bounds of the equivalent inductance and coupling capacitor. To find the optimum values for $L_{eq}$ and $C_M$, the proposed strategy is employing Particle Swarm Optimization (PSO) algorithm with following Objective Function (OF):

$$OF = K_1|\Delta t - \Delta t_{min}| + K_2\left|i_{peak,1st} - \frac{I_{dc}}{\alpha_0}\right| \quad (7)$$

where $K_1$ and $K_2$ are two controlling constant coefficients. In final step, the values of inductors in each module are determined; that is, the value of the inductor in the first module is given based on the minimum value of load current $I_{dc,min}$. Considering given $L_{eq}$, $C_M$, and $L_1$, the values of the inductors $L_2$ to $L_n$ (which $L_{eq}=(L_1^{-1}+L_2^{-1}\ldots+L_n^{-1})^{-1}$) can be found in a way that a normal distribution of current levels in the proposed topology will be achieved. The flowchart of determining the values of $L_1$ to $L_n$ is displayed in FIG. 11.

Figure 12:
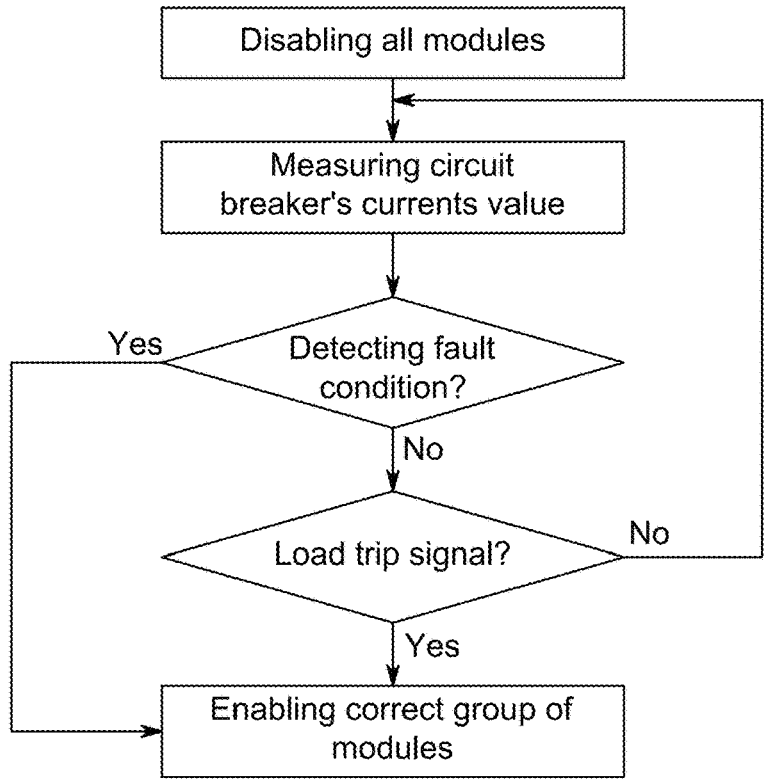
FIG. 12 is the flowchart of the control unit.

In this case, the proposed method to find the optimum values of inductors in each module is employing PSO algorithm with following OF:

$$OF = K_3(L_{eq} - L_{eq,calculated}) + K_4\left(\sum_{i=2}^{m-1}(|\Delta L_{(i-1)i} - \Delta L_{i(i+1)}|)\right) \quad (8)$$

where $L_{eq,calculated}$ is the calculated equivalent inductor for each iteration, m is the number of modules in the circuit, $\Delta L_{(i-1)i}=L_{i-1}-L_i$, $\Delta L_{i(i+1)}=L_i-L_{i+1}$, and coefficients $K_4$ determines the inductors' values distribution accuracy. For given inductors values, the control algorithm can benefit from a look-up table such as that Indicated in FIG. 58, Table 1 for four modules in-used. To open the circuit by solid-state circuit breaker, the modules are controlled in a way that proper current level will be produced by the modular current PPS. The simple control strategy of the proposed modular current PPS is shown in FIG. 12.

1.1.4.4. A Design Example of Modular Pulse Power Supply

Figure 11:
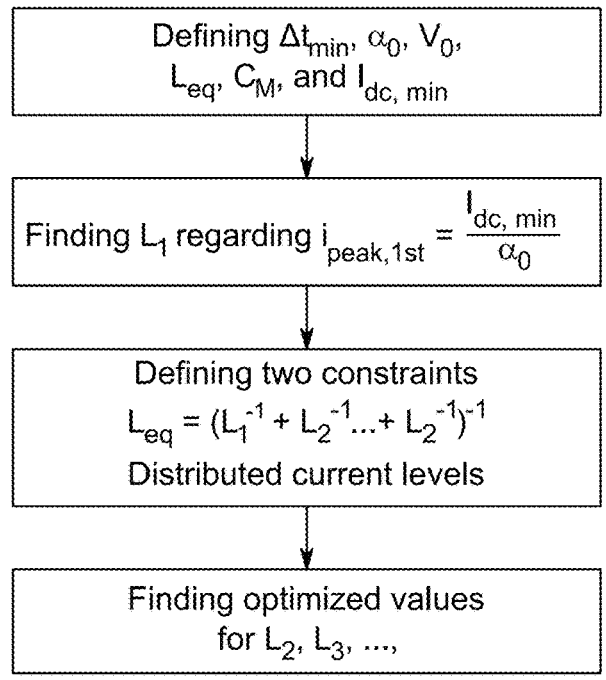
FIG. 11 is a proposed flowchart for determining the values of inductors for each module.
Figure 13:
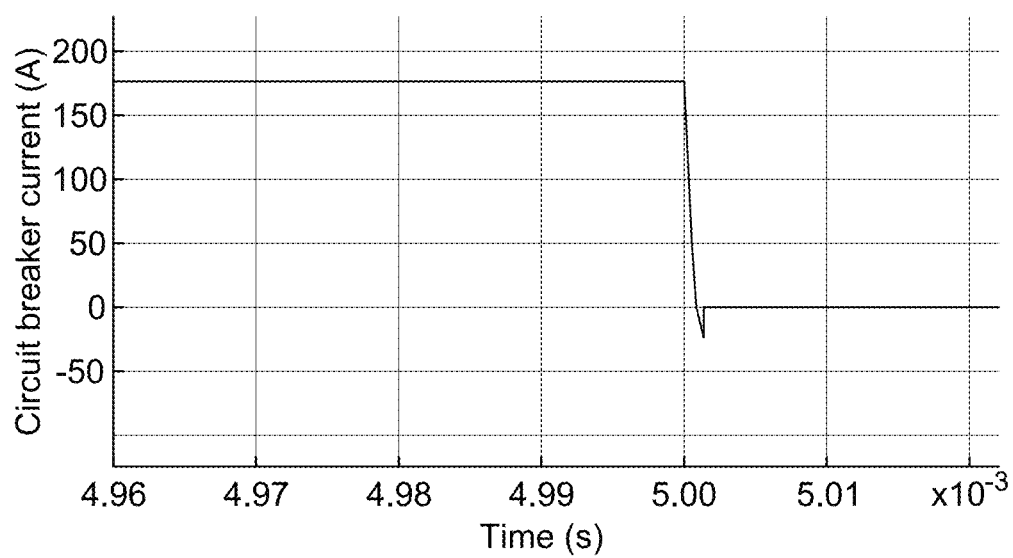
FIG. 13 is the current waveform of the main conduction branch for a 175 A fault current.

In this section, an example of designing procedure of a 200 A modular current PPS is presented. FIG. 59, Table 2 shows the initial values, load current values' boundaries, and implementation limitations. The four modules are considered for this design (N=4). The algorithmic flowcharts given in FIGS. 10 and 11 are executed to find the optimum values of $C_M L_{eq}$, and $L_1$ through $L_4$. The controlling parameters of PSO algorithm and the constant coefficients of OFs of equations (7) and (8) are presented in FIG. 60, Table 3. The results of the algorithms execution are shown in FIG. 61, Table 4. FIG. 13 shows the current waveform of the main conduction branch for 175 A fault current which proves the effectiveness of the proposed solid state circuit breaker.

2. Ultrafast Solid-State Circuit Breaker with Modular Active Injection Circuits 2.1. Introduction.

Due to a lack of natural zero-crossing current in DC systems, interrupting currents leads to high voltage surges. Therefore, implementing SiC solid-state circuit breakers (SSCBs) in DC systems may require using energy absorbing devices such as metal-oxide varistors (MOVs), snubbers circuits, or a combination of both.

Figure 14A:
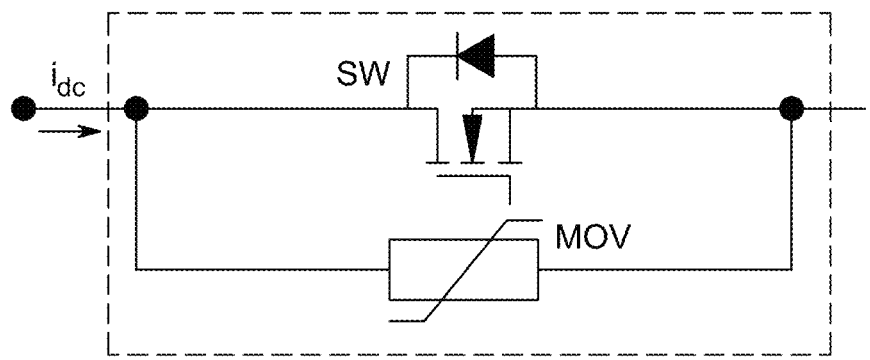
FIGS. 14(a) and (b) show a basic topology and a basic AIC topology of an SSCB.

However, the SSCB represented in FIG. 14(a) faces difficulties in practice with parasitic capacitances and inductances included in the MOSFETs packaging, printed circuit boards, and busbars. These parasitic components cause high di/dt and dv/dt problems especially during turn-off process which may lead to high voltage overshoot on the drain-source terminals and voltage oscillations on the gate of the power switch. One of the main concerns is the false turn-on issue during DC current interruption which reduces the reliability of the SSCBs.

To reduce the parasitic components, extensive work has been done, however, their values cannot be further reduced beyond a certain point. To lessen the effects of the parasitic components, especially on the gate of semiconductor switches, strategies including using ferrite beads in the gate loop, increasing the gate's resistance and capacitance, applying passive and active gate voltage control, and employing negative biased turn-off voltage have been proposed, but they are not completely effective as the off-state gate loop impedance presents contrary requirements. Adding snubber circuits in parallel to the MOV can mitigate the voltage oscillations across the switch by reducing dv/dt; on the other hand, they cannot solve the problems of common impedance coupling.

Figure 14B:
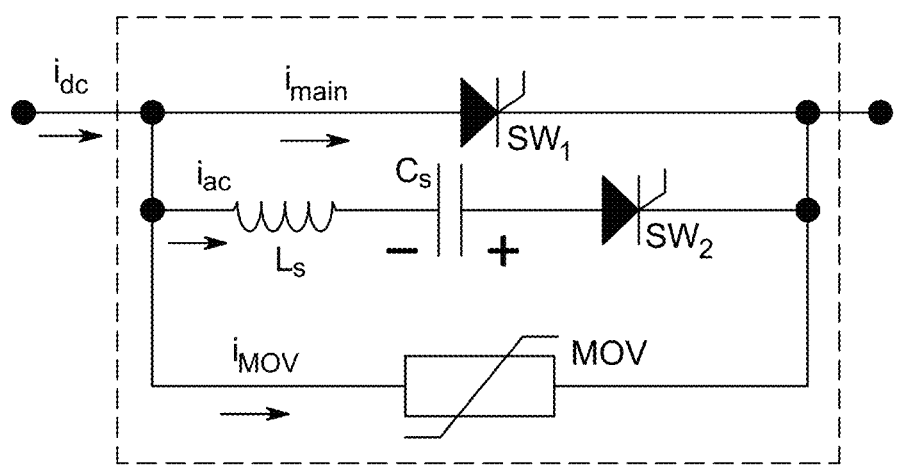

This section and disclosure propose a soft switching turn-off to eliminate the effects of the parasitic components in SSCBs effectively. To achieve this, the DC current is reduced to zero during DC current breaking by optimized auxiliary circuits. The strategy is based on active injection circuits (AICs) having been developed for CBs. FIG. 14(b) indicates the basic AICs SSCB. There are usually three branches in parallel including main (top), transfer (middle), and MOV (lower). The main branch includes silicon-controlled rectifiers (SCRs) to conduct the load currents. The transfer branch includes an LC injection circuit in series with an injection SCR switch. During DC current interruption, the stored energy of the pre-charged capacitor is resonating with the inductor to generate a resonant current cancelling the current in the main branch.

Figure 15:
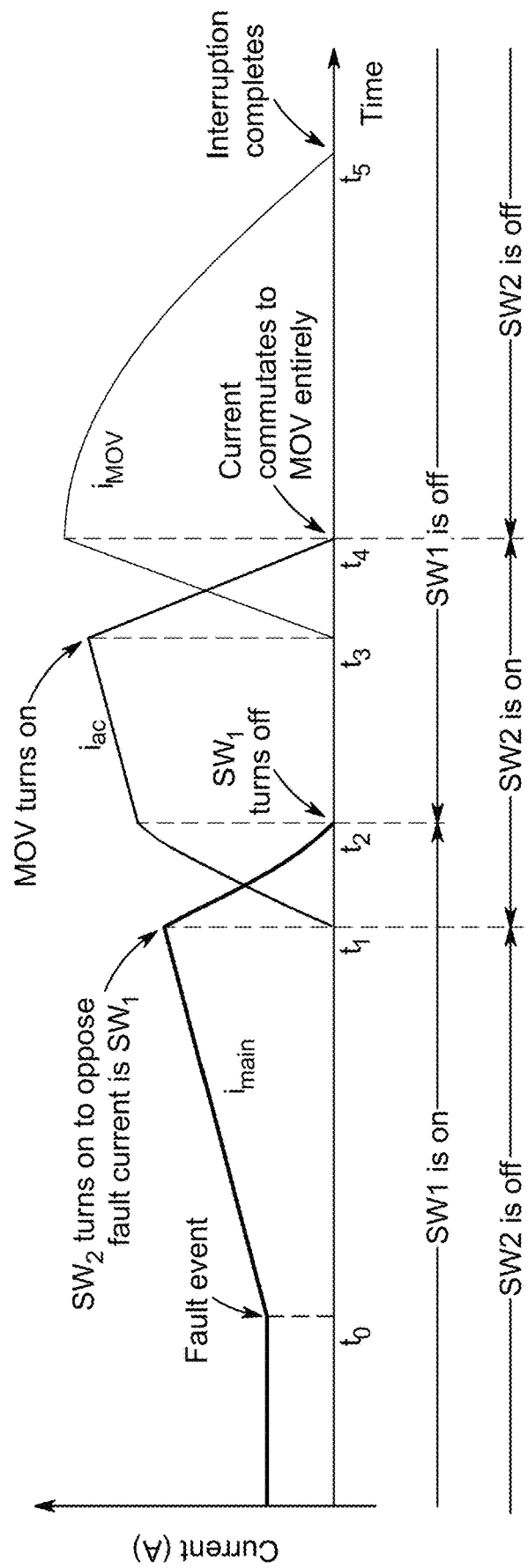
FIG. 15 illustrates the electrical waveforms and working principles of the SSCB of FIG. 14(b).

FIG. 15 illustrates the electrical waveforms and working principles of the SSCB of FIG. 14(b).

2.2. Problem Statement and Parasitic Components Analysis

Figure 16A:
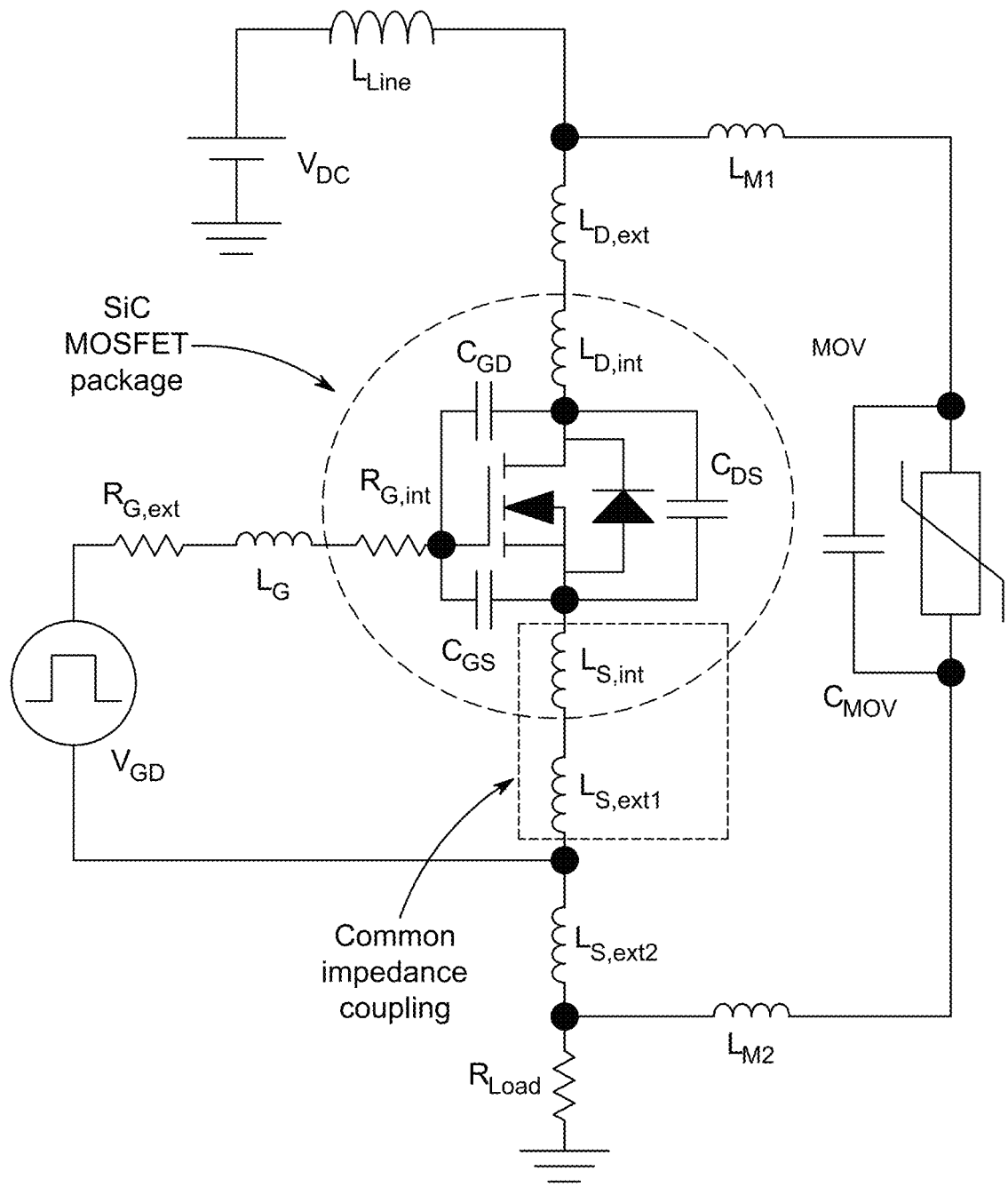
FIGS. 16(a) and (b) show the SiC SSCB, (a) Representing parasitic components, and (b) Experimental results in interrupting 20 A DC current including drain-source voltage VDS waveform (blue) and gate-source voltage VGS waveform (red).

FIG. 16(a) indicates the SiC SSCB of FIG. 14(a) with parasitic components in the SiC MOSFET package, connections, and the MOV element. VDC, LLine, and RLoad show the DC system voltage, current limiter inductor, and load resistance, respectively.

Figure 16B:
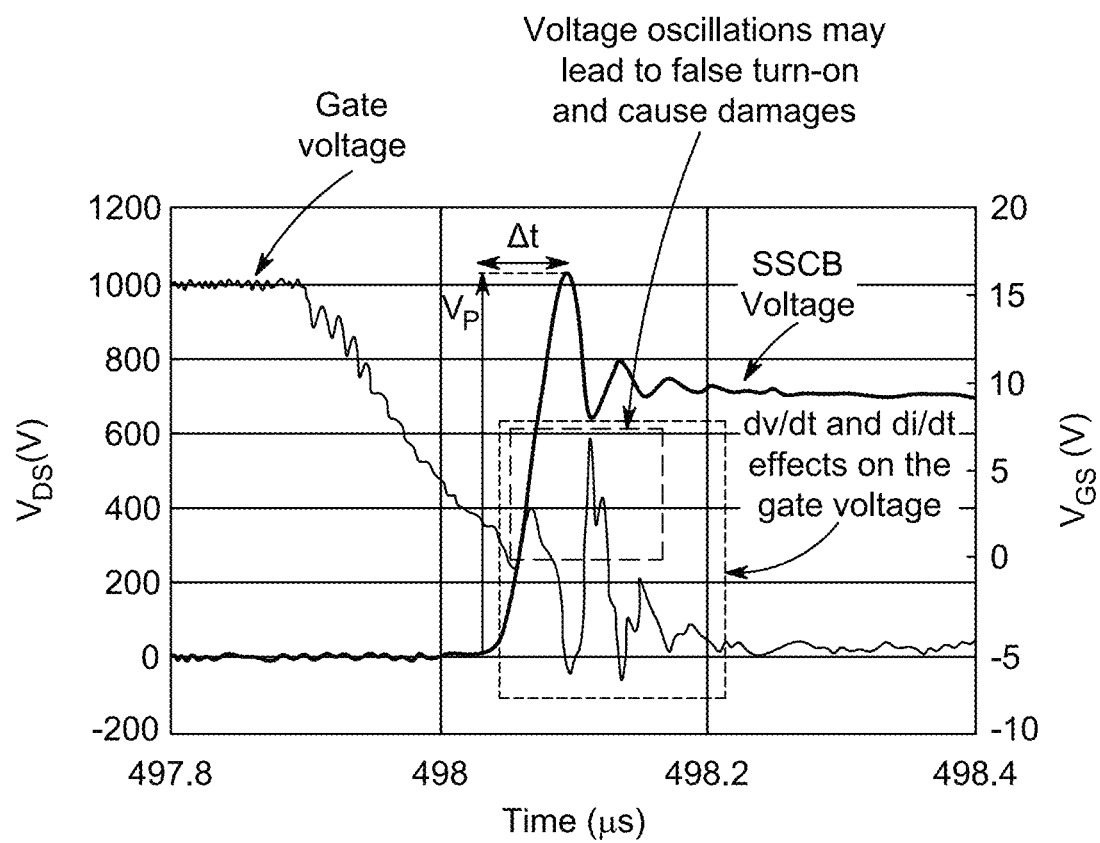

FIG. 16(b) represents the experimental results of SiC SSCB shown in FIG. 16(a) in interrupting 20 A load current. C3M0016120D SiC MOSFET, V320LA20 AP MOV, and 300 µH line inductor are employed as the test setup parameters. To mitigate the voltage oscillations on the gate, RG,ext=7.5Ω, BLM21PG300SZ1D 30Ω ferrite bead, and 19.8 nF external gate-source capacitance were used in the experiment. The effects of the parasitic components on the gate voltage are clearly shown in FIG. 16(b).

Regarding the ac analysis of SiC MOSFET during the turn-off, the voltage on the gate of the MOSFET can be derived as Eq. (9):

$$V_{GS,\infty} = V_{GS,C} + V_{GS,M} - Z_G I_G \quad (9)$$

where IG is the gate loop current, ZG is the gate impedance including gate inductance (LG) and resistance (RG=RG,int+RG,ext), VGS,C is the produced voltage due to the common impedance coupling LCLC. Considering the load current idc:

$$V_{GS,C} = L_{CLC}(di_{dc}/dt) \quad (10)$$

where LCLC=LS,int+LS,ext1. Besides, VGS,M is the induced voltage due to the dv/dt across the SSCB through the parasitic Miller capacitance (CGD) of the MOSFET. To mathematically describe the VGS,M, following first-order differential equation can be developed for the SiC MOSFET:

$$\frac{dV_{GS,M}(t)}{dt} + \frac{V_{GS,M}(t)}{R_G(C_{GS}+C_{GD})} = \frac{C_{GD}}{C_{GS}+C_{GD}}\frac{dV_{DS}(t)}{dt} \quad (11)$$

where VDS is the drain-source voltage. VDS can be described in two separate intervals: 1) In the first interval Δt, VDS changes from zero to the overshoot value VP as indicated in FIG. 3(a). In this case, considering Eq. (11), VGS,M1 can be formulated as Eq. (12):

$$V_{GS,M1}(t) = R_G C_{GD}(V_P/\Delta t)\left(1 - e^{\frac{-t}{R_G(C_{GD}+C_{GS})}}\right) \quad (12)$$

In the second interval, VDS consists of sinusoidal voltage oscillations as shown in FIG. 16(b). By considering Lm as the total parasitic inductance in the main branch, VDS voltage oscillations resulted from di/dt is approximated as Eq. (13):

$$V_{DS}(t) \approx -L_m t_{dc}\omega_s e^{-\alpha_r t}\sin(\omega_s t) \quad (13)$$

$$\alpha_r = R_m/(2L_m), \omega_r = 1/\sqrt{L_m C_{DS}}, \omega_s = \sqrt{\omega_z^2 - \alpha_r}$$

where Rm is the total ac resistor in the loop of the main switch and the MOV. With respect to Eqs. (11) and (13), VGS,M2 can be calculated as Eq. (14):

$$V_{GS,M2}(t) \approx -t_k\sqrt{\frac{L_m}{C_{DS}}}\frac{C_{GD}}{C_{GS}+C_{GD}}e^{-\alpha_r t}\sin(\omega_2 t) \quad (14)$$

Eqs. (10), (12), and (14) clearly demonstrate the effects of the parasitic components in creating voltage oscillations on the gate of the main switch. Considering Eqs. (10) and (14), reducing idc to zero during DC current interruption can effectively eliminate the effect of the parasitic inductances, which is obtained by implementing soft switching turn-off in this proposed device and system. Also, reducing VP can help to reduce the oscillations voltage of Eq. (12). The proposed AICs help to reduce VP by commutating DC current to the transfer branch as explained in next sections.

2.3 Proposed Modular AICs SSCB

The proposed modular AICs SSCB achieves soft switching during DC current interruption to eliminate di/dt problems and slows down dv/dt to reduce the voltage peak magnitude on the SSCB. The details are explained as follows.

2.3.1. Improved AIC Structure

Figure 17A:
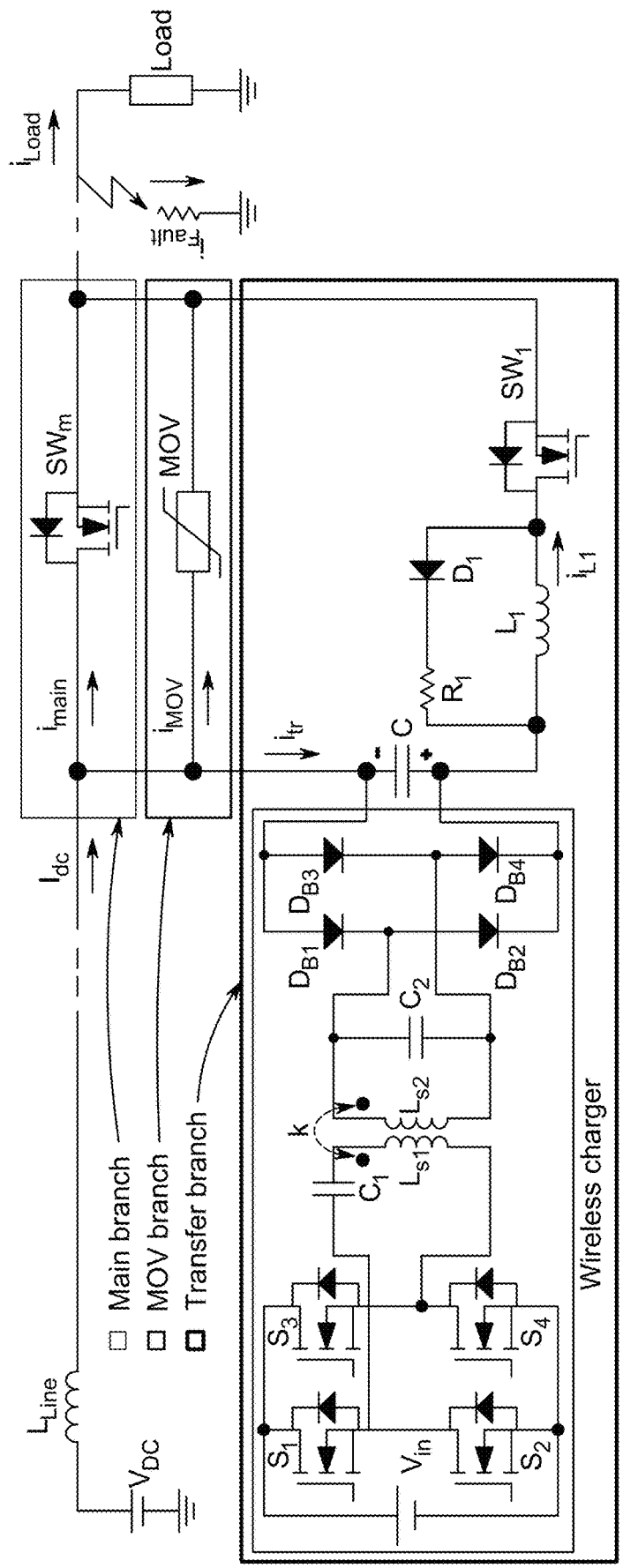
FIGS. 17(a) and 17(b) show The SSCB with improved AIC: 17 (a) Circuit topology, and 17(b) Working principles and operational modes.
Figure 17B:
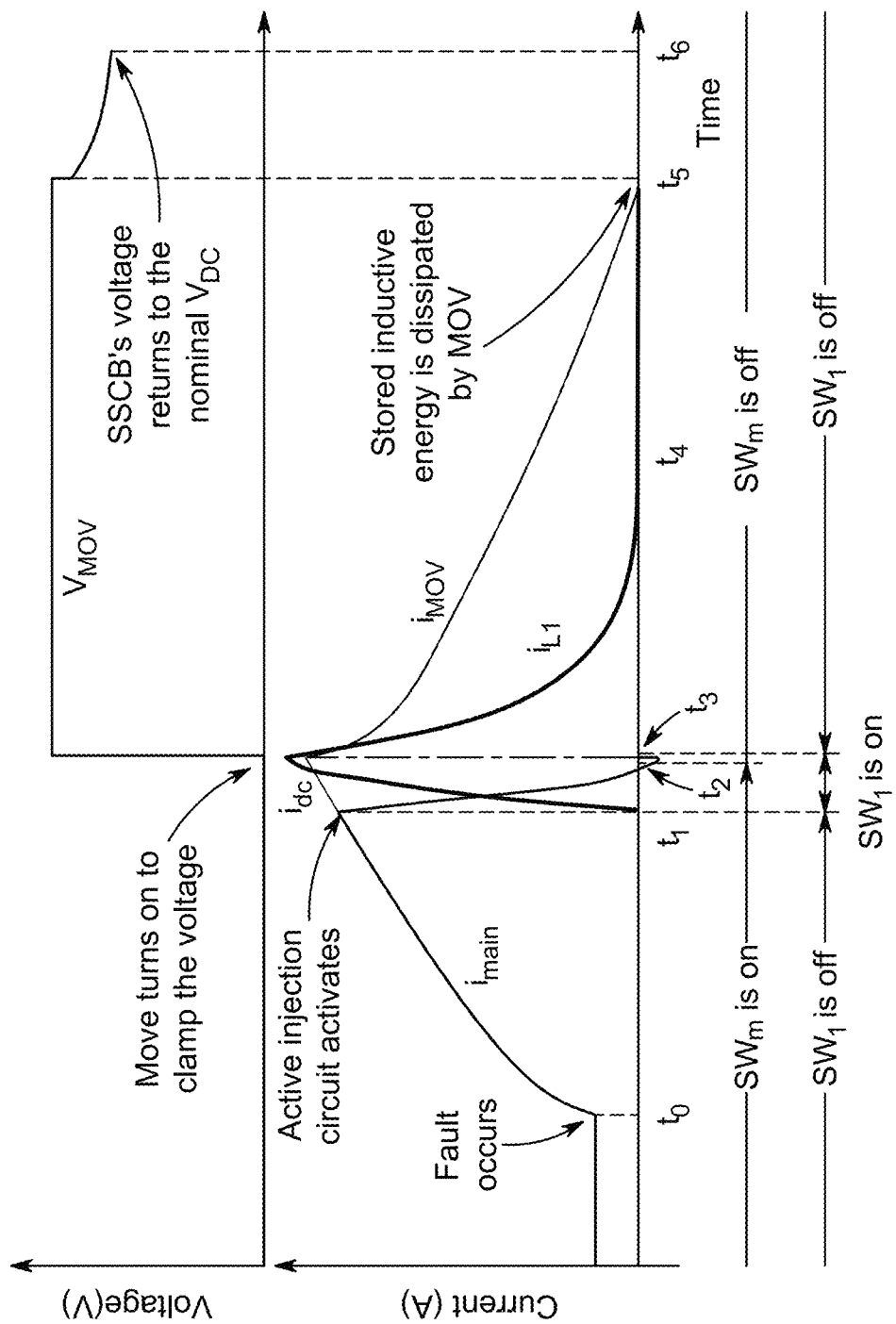

In FIG. 17(a), SiC MOSFETs are used in the main and transfer branches to achieve a high-speed operation. The freewheeling diode branch is connected in parallel to L1 to bypass the resonant current after turning SW1 off. An inductive series-parallel wireless converter is designed to charge the capacitor C and keep its voltage constant. The wireless charger works in burst mode to minimize the switching and conductive losses. Soft switching is also achieved in the inverter to further increase the efficiency. The waveforms and working principles of the proposed SSCB are shown in FIG. 17(b), which shows:

1) Before t=t0. SSCB works in normal operating mode (imain=idc). Capacitor C is charged to the initial voltage of V0 with polarity of FIG. 17(a).

2) At t=t0. The fault occurs, and the current rises rapidly.

3) At t=t1. SW1 turns on to generate a resonant current itr in the opposite direction of the fault current idc, getting soft-switching turn-off in SWm. Capacitor C begins to discharge.

4) At t=t2. SWm turns off reliably in nearly zero current (imain≤0). itr continues to flow through the body diode of SWm.

5) At t=t3. SW1 turns off to interrupt itr (itr=0). The response time of the SSCB is t3-t1. idc commutates to the MOV branch immediately (imain=iMOV). As MOV turns on, the voltage across the SSCB is clamped to VMOV-on. iL1 continues to flow through the freewheeling branch.

6) At t=t4. iL1 decays to zero.

7) At t=t5. iMOV reduces to zero, meaning idc=iMOV=0, and the voltage across the SSCB begins to return to the system voltage.

8) At t=t6. The voltage across the SSCB finally reaches the nominal value, meaning VMOV=VDC.

Compared to FIG. 14(b), the proposed transfer branch in FIG. 17(a) is fully controlled by the SiC devices and the freewheeling branch. After interrupting itr (t>t3), wireless converter quickly charges the capacitor C to its initial voltage in 10 s of ms. In this case, no discharge circuits are required, reclosing process needs no circuit control in the transfer branch, and the proposed AICs is ready for the next current interruptions.

2.3.2. Modular AICs: Topology and Operation

Figure 18A:
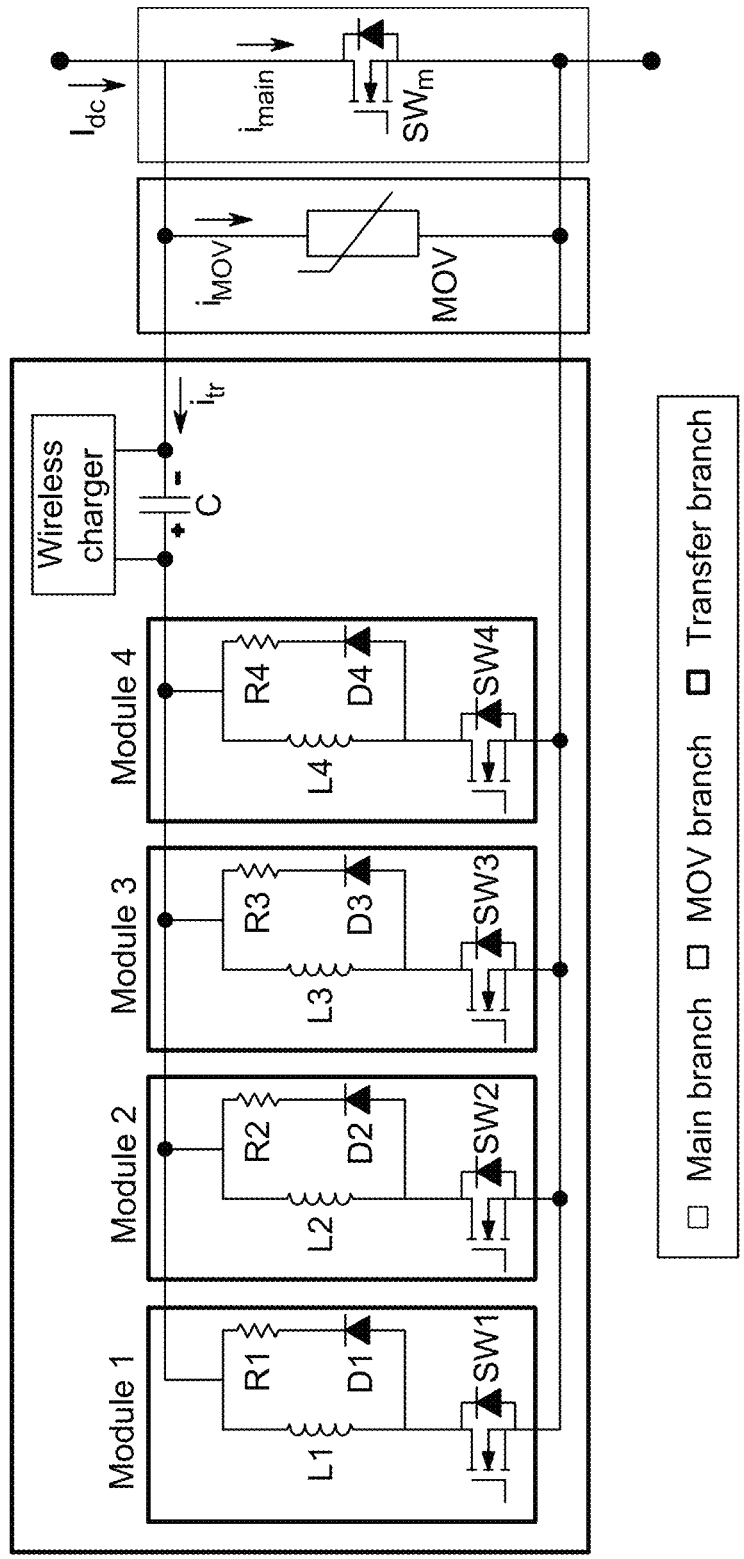
FIGS. 18(a) and 18(b) show the modular AICs SSCB: (a) 4 modules in use topology, and (b) Working principle of activating modules 1 and 3 according to FIG. 18(b).
Figure 18B:
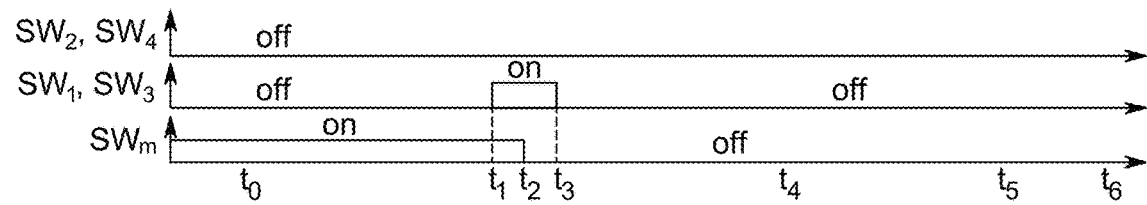

The proposed AICs of FIG. 17(*a*) also has remarkable scalability. When multiple modules are combined, it has the flexibility to produce different resonant currents in terms of amplitude and frequency. A modular AICs SSCB with 4 modules in use is shown in FIG. 18(*a*).

In an N-module topology, by controlling the connection of modules, it can provide (2N−1) selectable resonant currents. For the presented circuit of FIG. 18(*a*), the control unit determines the proper connection of different modules to accurately generate the resonant currents to compensate imain and achieve soft switching in SWm. For example, when modules 1 and 3 are activated, the control signals are shown in FIG. 18(*b*).

2.3.3. Analytical Investigation of Mathematical Expressions

In this section, analytical expressions of the current waveform generated by the injection circuit are developed. To simplify the calculation, it is assumed that only module 1 is activated. By turning SW1 on, the resonant current follows the waveform in FIG. 6. The current expression is shown below.

$$i(t) = \frac{V_0}{L_1 \omega_d} e^{-\alpha t} \sin(\omega_d t) \tag{15}$$

$$\omega_0 = \frac{1}{\sqrt{L_1 C}}, \alpha = \frac{R}{2L_1}, \omega_d = \sqrt{\omega_0^2 - \alpha^2}, T = \frac{2\pi}{\omega_0}$$

where R stands for the on-state resistance of MOSFETs and parasitic resistance of L1, and T is the time period of the resonant current. This current is injected to SWm to achieve soft switching during turn-off state. It needs to be clarified that only the first half cycle is used during interruption process.

Regarding FIG. 19, which shows the first two cycles waveform of the generated resonant current related to module 1, ipeak,1st is then calculated as below.

$$i_{peak,1st} = \frac{V_0}{L_1 \omega_d} e^{-\frac{\alpha \pi}{2\omega_d}} \tag{16}$$

Figure 19:
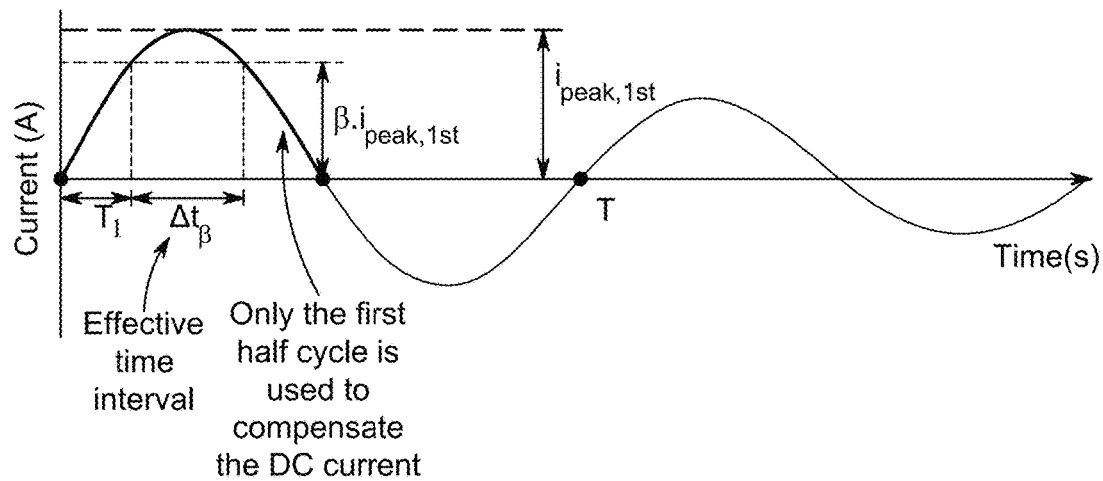
FIG. 19 shows the first two cycles waveform of the generated resonant current related to module 1.

In FIG. 19, Δtβ is defined as effective time interval in which SWm can be turned off reliably in zero current. It is important to identify the minimum value of Δtβ as Δtβ,min in practice due to the hardware delay time of the control circuits, gate drivers, and the turn-off delay time of SiC MOSFETs. According to FIG. 19, Δtβ is determined using a coefficient β(0<β<1) as Eq. (17).

$$\Delta t_\beta = \frac{\pi - 2\arcsin(\beta)}{\omega_d} \tag{17}$$

The value of β should guarantee β×ipeak,1st≥idc. It shows that reducing β helps to increase the effective time Δtβ, but it also increases the amplitude of the resonant current. Therefore, a tradeoff needs to be made in practice. The time duration T1 in FIG. 19 defines the response time of the injection circuit:

$$T_1 = \frac{\pi \sqrt{L_1 C} - \Delta t_\beta}{2} \tag{18}$$

2.3.4. Design Procedure of Passive Components

In this section, a design procedure is proposed to optimize passive components in the proposed modular AICs SSCB.

There may be two steps and a PSO algorithm applied twice in the calculation.

First, based on the requirement of the maximum fault current Idc,max and the minimum time interval Δtβ, min, non-linear Eqs. (16)-(17) are identified to find the total equivalent inductance Leq and capacitance C. The solving process is achieved by the PSO algorithm. Leq is defined as below.

$$L_{eq} = (L_1^{-1} + L_2^{-1}, \ldots, +L_n^{-1})^{-1} \tag{19}$$

Second, in order to achieve uniform distribution of (2N−1) resonant currents generated by N modules, using Leq and C from the previous step, the PSO method is further applied to calculate each inductance L1, L2, L3, . . . , LN.

Figure 20:
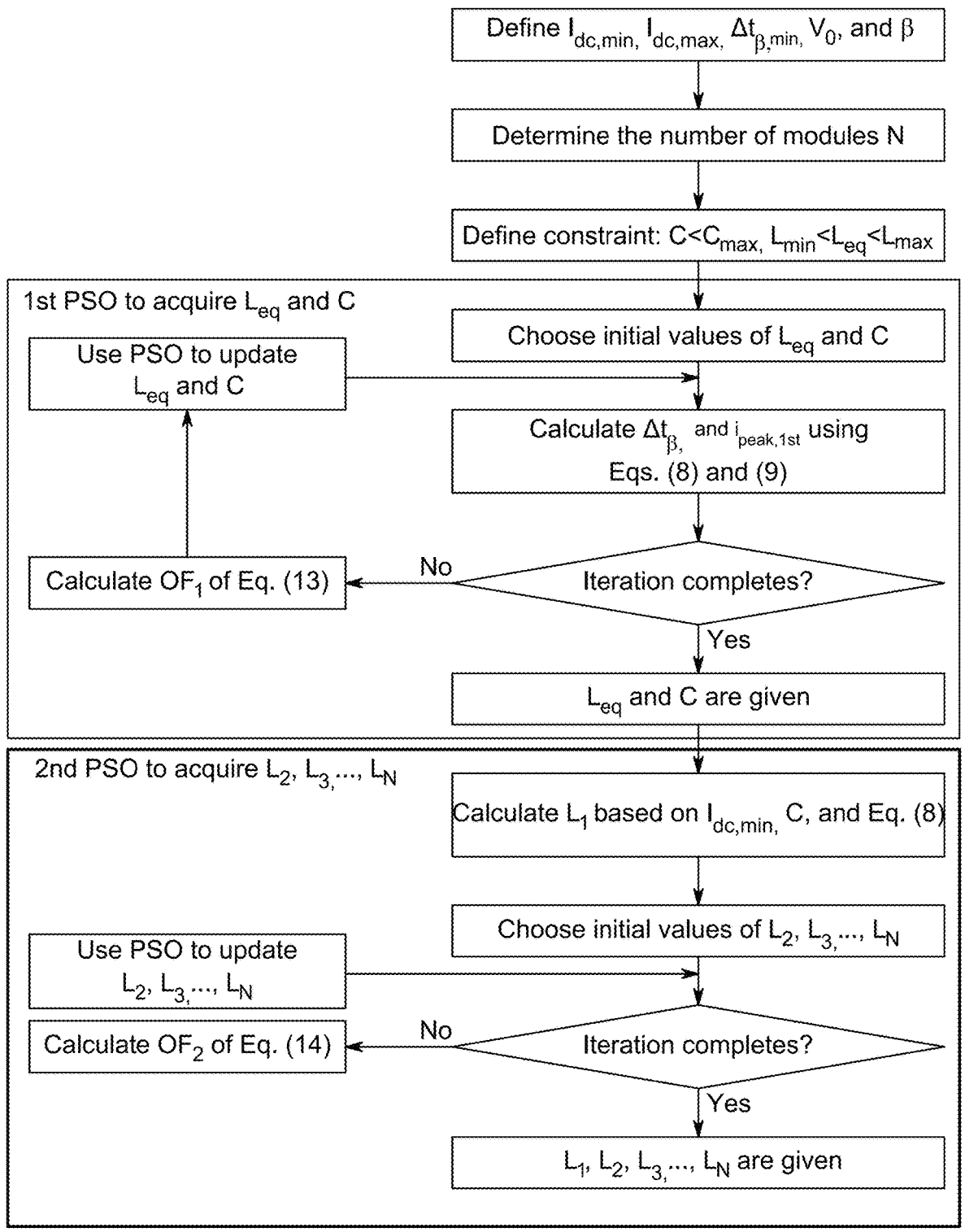
FIG. 20 shows a proposed flowchart to find optimal values of L1, L2, . . . , LN and C.

The flowchart of the proposed design procedure is presented in FIG. 20 for a general N-module topology. The process is explained as follows.

1) Identify the minimum load current Idc,min, the maximum fault current Idc,max, the initial voltage V0, the minimum effective time interval Δtβ,min, and the current ratio β.
2) Determine the number N of modules in the circuit.
3) Define the lower and upper boundaries of the capacitance C and inductances based on the physical limitations.
4) Apply the first PSO method to calculate the equivalent inductance Leq and the capacitance C. When all the modules are connected, following equation should be satisfied.

$$i_{peak,1st} > \frac{I_{dc,max}}{\beta} \text{ and } \Delta t_\beta > \Delta t_{\beta,min} \tag{20}$$

The OF1 is proposed as follows to achieve the desired Idc,max and Δtβ. K1 and K2 are two controlling constant coefficients.

$$OF_1 = K_1 |\Delta t_\beta - \Delta t_{\beta,min}| + K_2 \left| i_{peak,1st} - \frac{I_{dc,max}}{\beta} \right| \tag{21}$$

5) Apply the second PSO algorithm to find each inductance L1, L2, L3, . . . , LN in order to achieve the uniform distribution of resonant currents.

When only the first module L1 is connected, the minimum load current Idc,min is achieved. Then, L1 can be calculated using Eq. (16). When multiple modules are connected, it is expected to provide the current between Idc,min and Idc, max. In this design, we plan to have (2N−1) uniformly distributed resonant currents, following the binary form. For example, in a 4-module AICs circuit topology, when the switches are controlled as [SW4,SW3,SW2,SW1]="1001", the modules 1 and 4 are activated and the generated current is represented as 19.

Similarly, I1=Idc,min is found by activating the module 1, and $$I_{(2^N-1)} = I_{dc,max}: \tag{21.1}$$

is achieved by activating all the modules. The OF2 is defined as below.

$$OF_2 = K_3(|L_{eq} - L_{eq,new}|) + K_4 \left( \sum_{i=2}^{2^N-2} (|\Delta I_{(i-1)i} - \Delta I_{i(i+1)}|) \right) \quad (22)$$

where K3 and K4 are the controlling constant coefficients, Leq is calculated value from the previous step, Leq,new is the updated inductance value in each iteration, and $\Delta I(i-1)i = I_{i-1} - I_i$ is the updated current difference in each iteration. Eq. (22) aims to equalize the differences between adjacent resonant currents.

1.2.3. Experimental Validation

Figure 21:
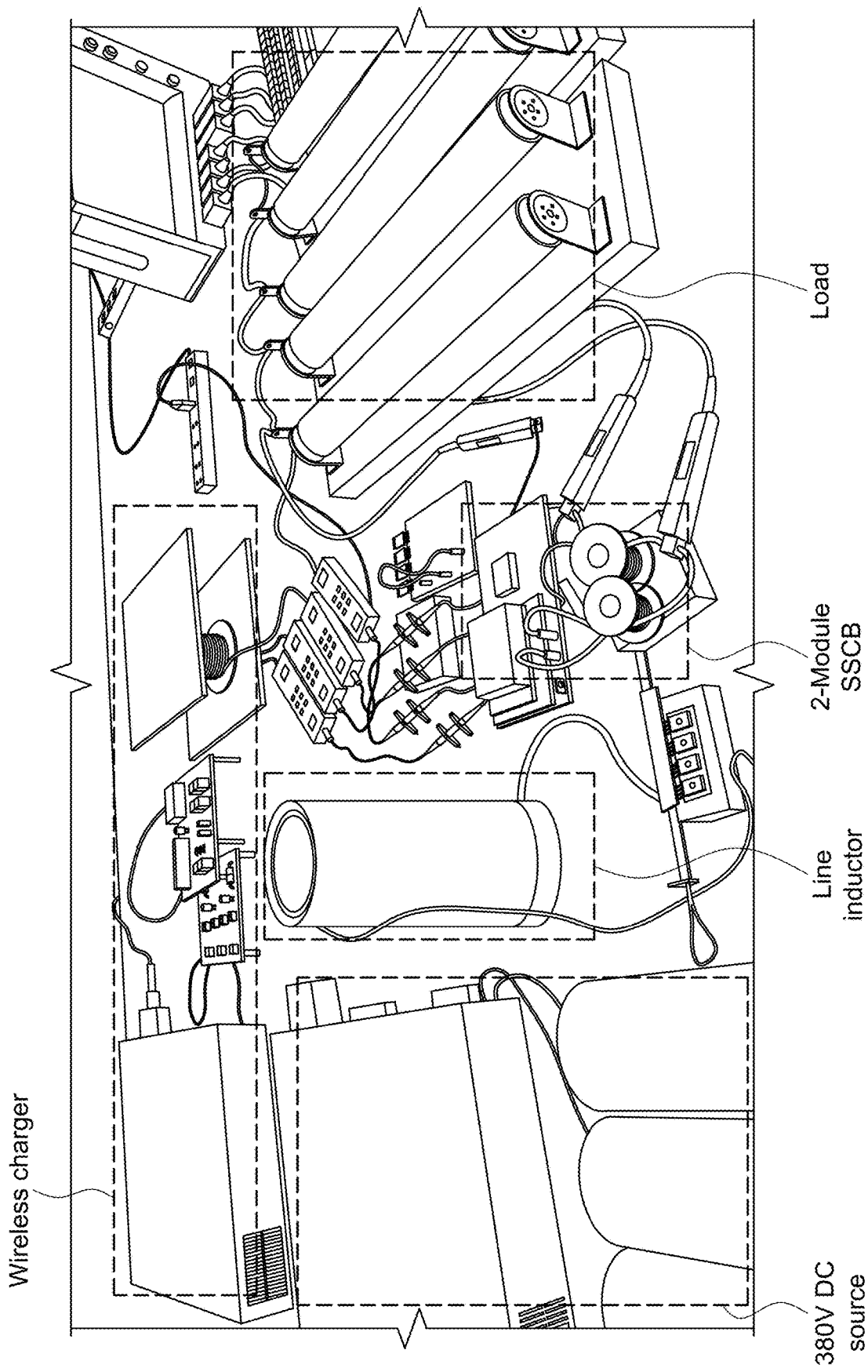
FIG. 21 shows an experimental setup.

To validate the effectiveness of the proposed SSCB in practice, a downsize prototype with 2 modules in use was implemented. The setup is shown in FIG. 21. Regarding FIGS. 16(a), 16(b), 17(a), and 17(b), the hardware parameters are listed in FIG. 62, Table 5. The value of β was considered as 0.8 in the experiments. The inductive wireless charger has been realized by series-parallel compensation networks to reduce the input DC voltage and switching losses. Besides, operating in burst mode with 85 kHz ZVS soft switching limits the switching and conductive losses.

Figure 22:
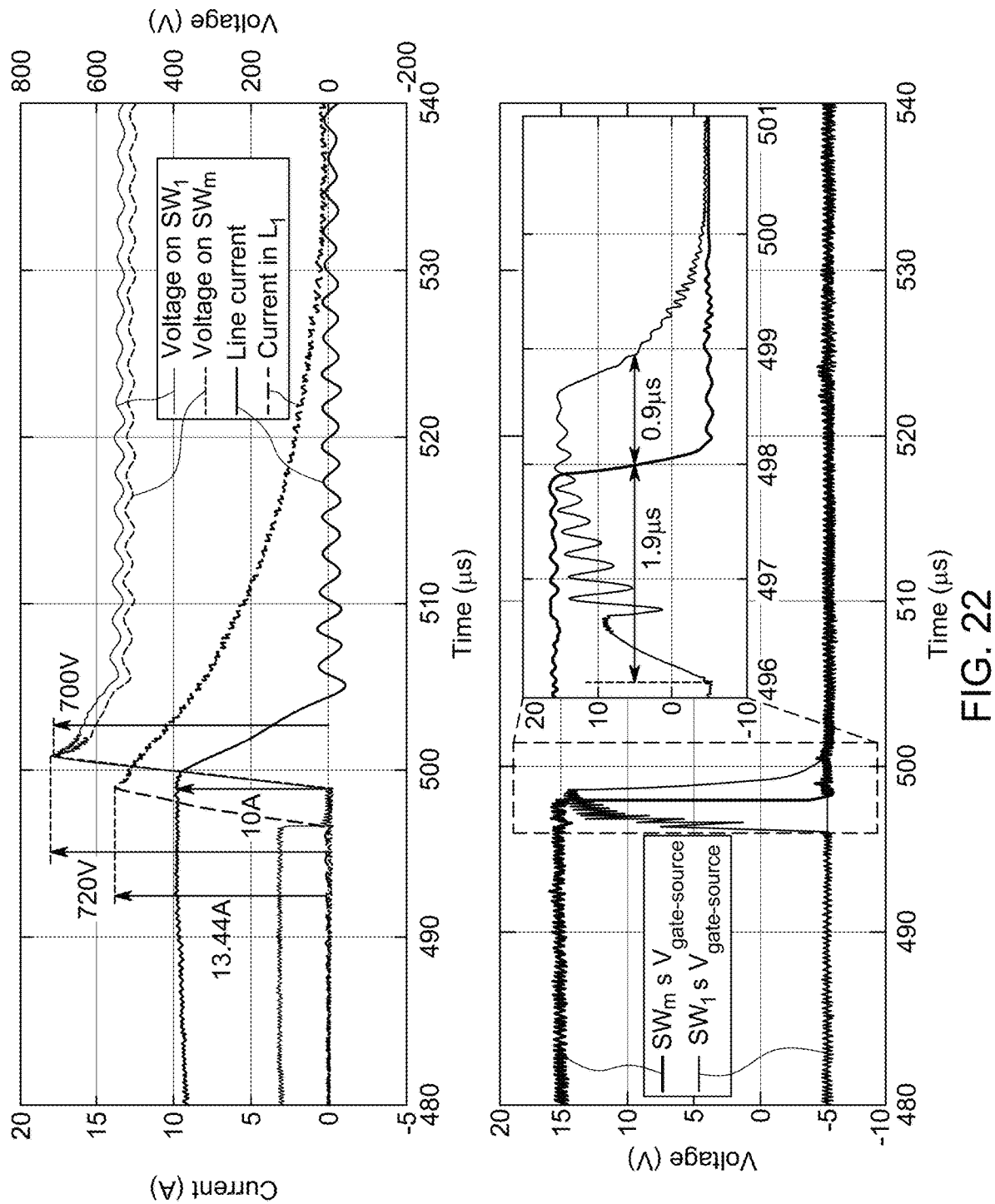
FIGS. 22-24 show the experimental results in a 380 V DC system for load currents of 10 A, 15 A, and 20 A, respectively.
Figure 23:
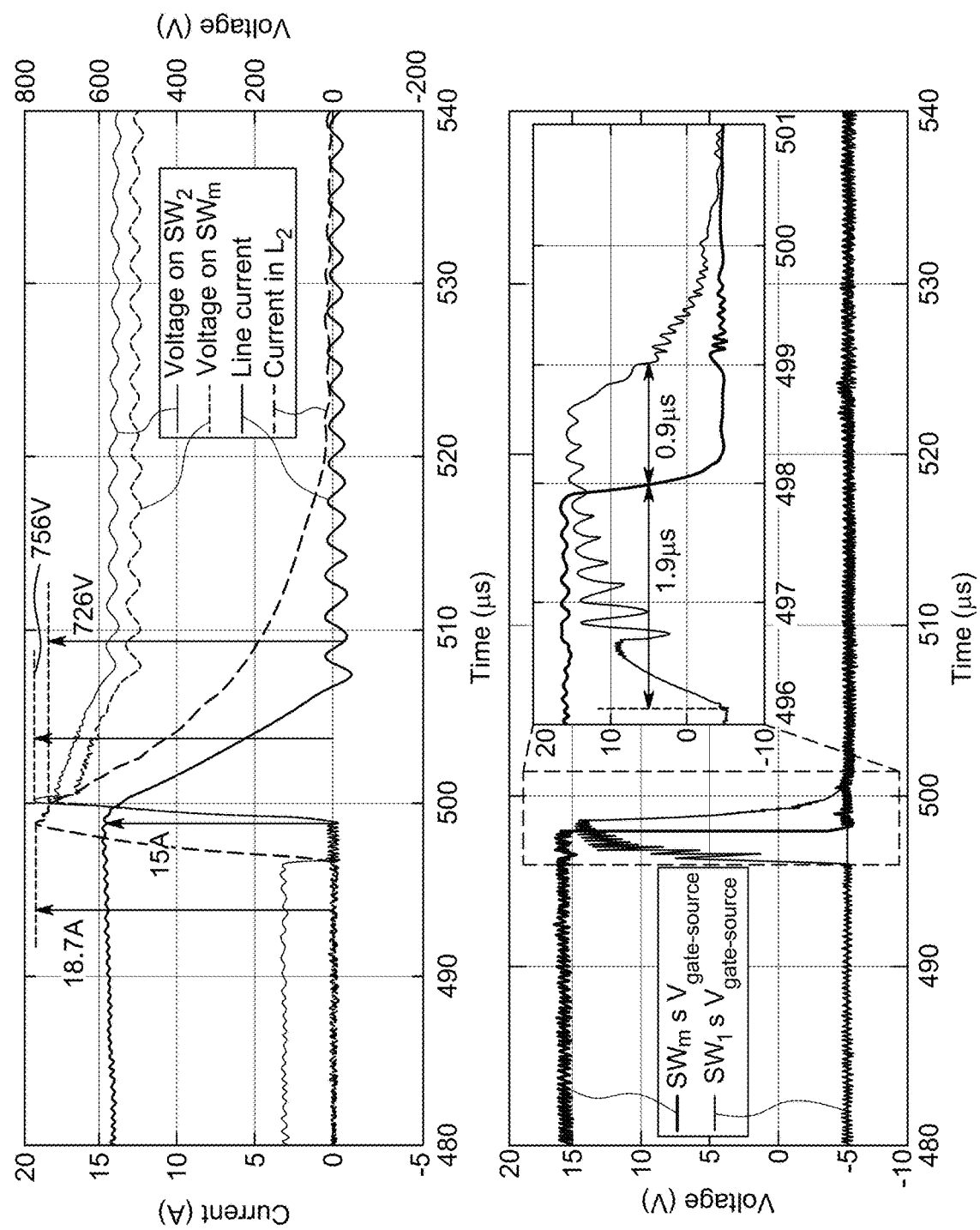
Figure 24:
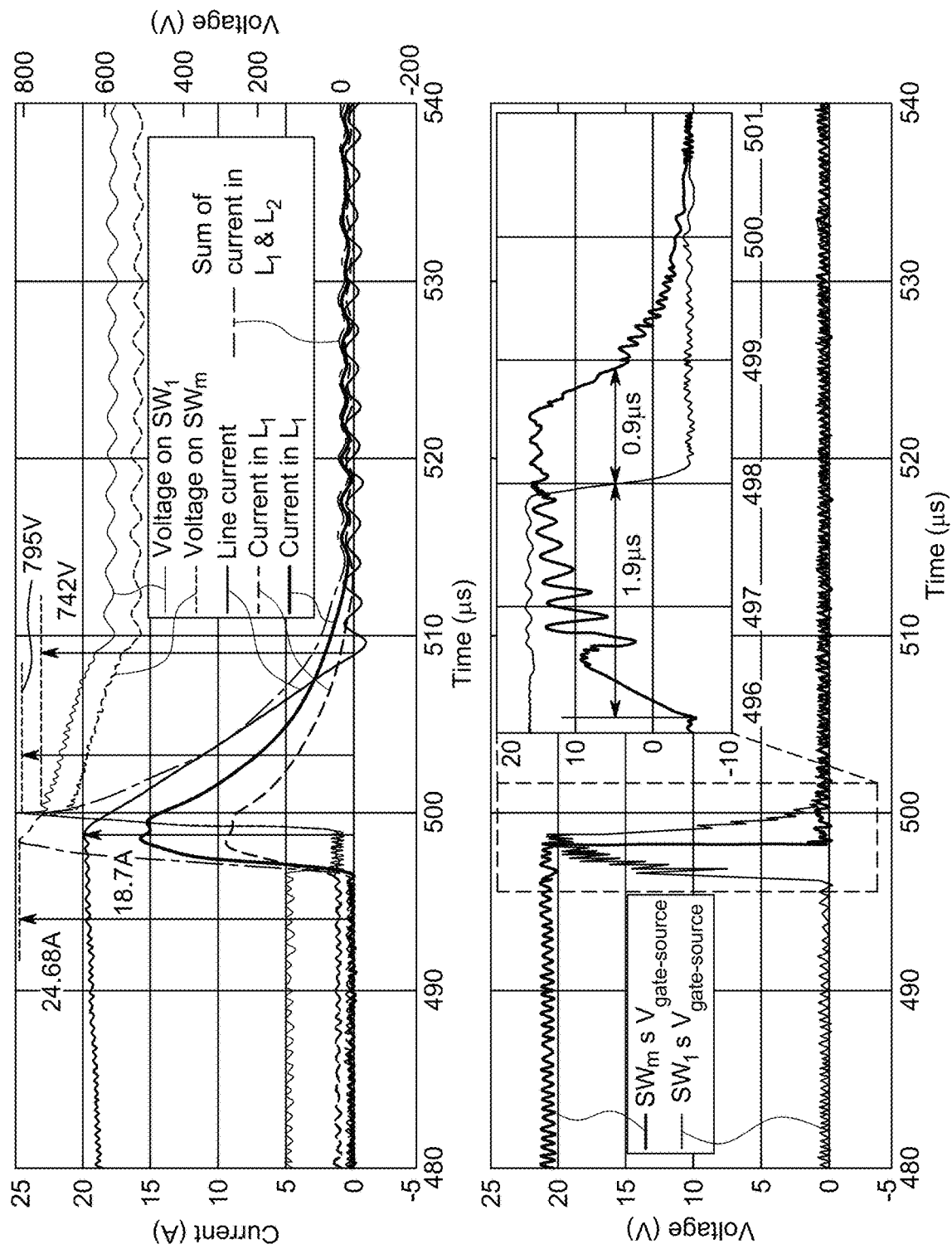

The gain voltage of the charger converter is 15. The SSCB is controlled using an STM32F103 microcontroller. FIGS. 22 through 24 show the experimental results in a 380 V DC system for load currents of 10 A, 15 A, and 20 A, respectively.

FIG. 22 shows interruption process of a 10 A DC load current. According to FIG. 62, Table 5, switches are set as [SW1,SW2]='10'. In this case, the magnitude of the resonant current reaches 13.44 A which is sufficient to realize soft switching in SWm. According to the gate-source voltages of SWm and SW1 in FIG. 22, the response time of the transfer branch is around 1.9 µs, and its total active time is limited to 2.8 µs. The SSCB voltage has been clamped to 700 V which is safe for 1.2 kV SiC MOSFETs.

Considering the gate-source voltage on SWm, it is clear that the proposed SSCB can successfully remove the effects of di/dt and dv/dt problems of parasitic components during DC current interruption. As shown in FIG. 22, the gate-source voltage on SW1 experiences voltage oscillations during turn on/off states due to parasitic components in the transfer branch. As the voltage on SW1 is equal to VCs=135 V during turn on process, pure capacitive snubber can be used to reduce the voltage oscillations on the gate of SW1. In the experiments, 22 nF snubber capacitor was employed for SW1 and SW2 individually.

FIG. 23 illustrates the experimental results for a 15 A DC current interruption. According to FIG. 62, Table 5, switches are set as [SW1,SW2]='01' to generate a resonant current with magnitude of 18.7 A to obtain soft switching in SWm. In this test, the SSCB voltage was clamped to 726 V. In addition, FIG. 24 shows the experimental results of interrupting 20 A DC load current by activating modules 1 and 2 in the SSCB. The peak of the resonant current in the transfer branch achieves 24.68 A which is enough for a reliable soft switching in SWm. FIG. 24 indicates also current sharing between two modules during operation.

The clamping voltage on SWm during DC current breaking was 742V, which is more than 250V reduction in the peak voltage on SSCB compared with pure MOV SSCB of FIGS. 14(a) and 14(b).

According to the experimental results that are consistent with mathematical and simulation investigations, modular AICs SSCB can effectively provide a soft-switching DC current interruption in the main branch. This obtains the possibility to utilize the full capabilities of SiC MOSFETs. The response time of the SSCB is ultrafast, and the control process does not need real-time detections of the DC current which simplifies the SSCB design. The SSCB does not need discharge circuits and additional reclosing process, leading to a compact and simple design of SSCB.

Figure 25:
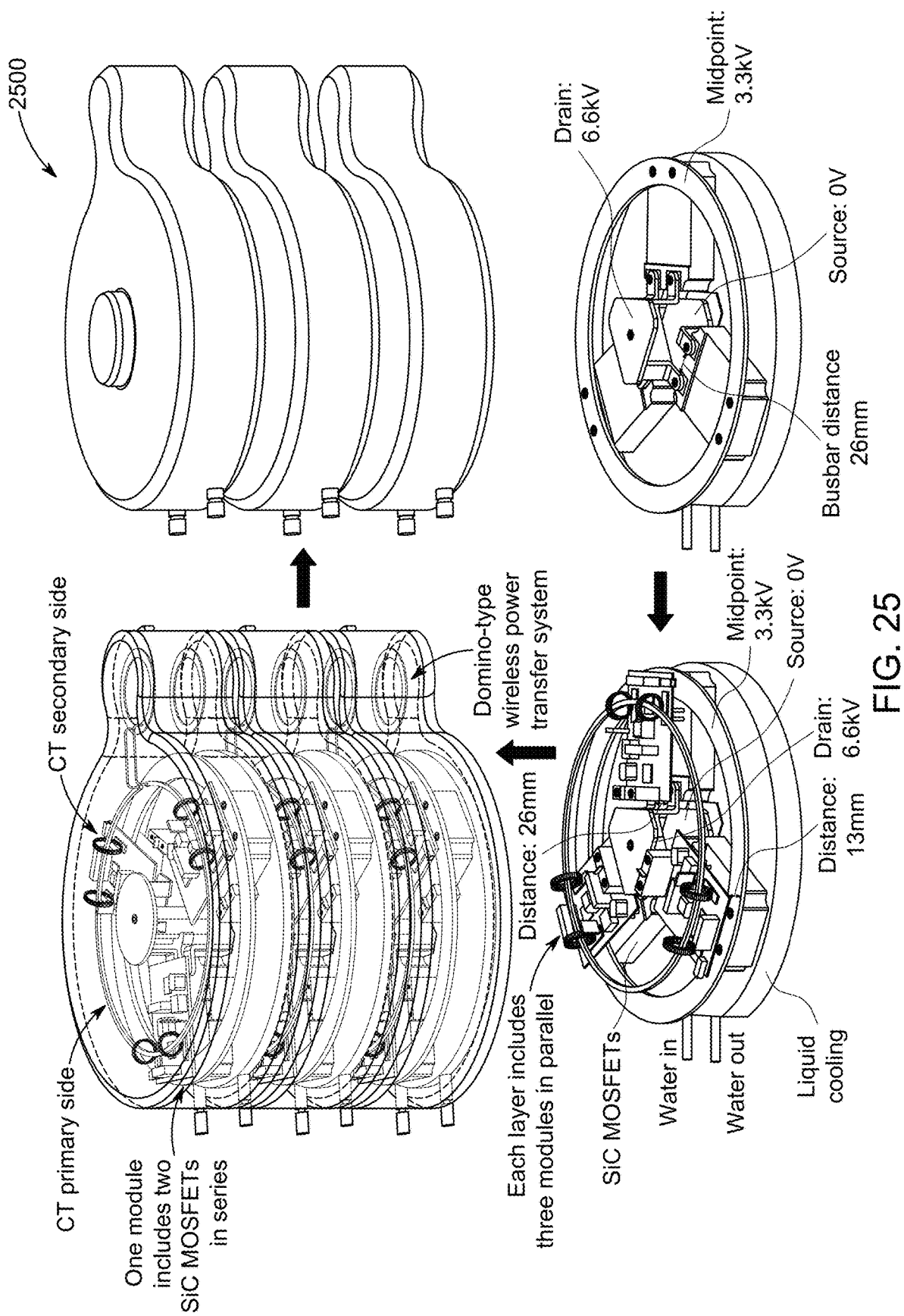
FIG. 25 shows a 3-D view of the proposed SSCB.
Figure 26:
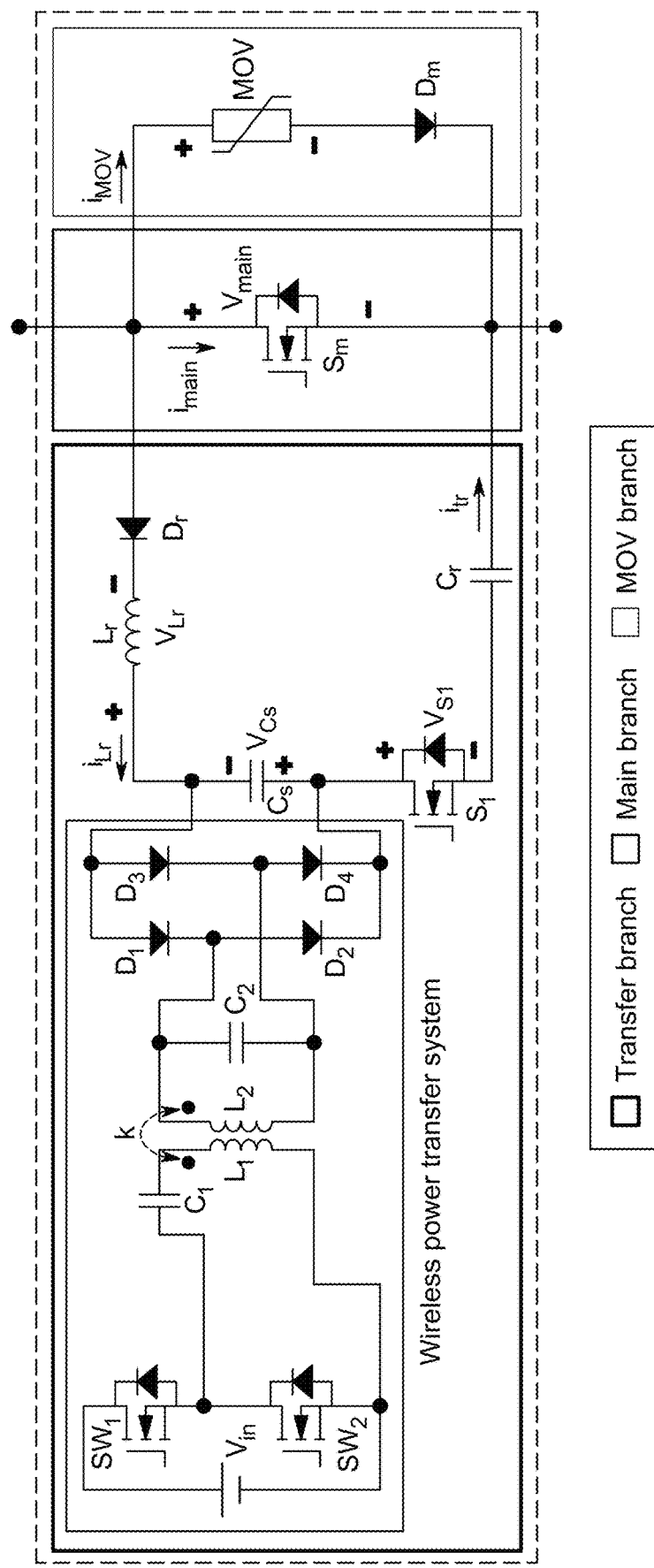
FIGS. 26-37 show the proposed possible structures to achieve ZCS for one SiC MOSFET in each module.
Figure 27:
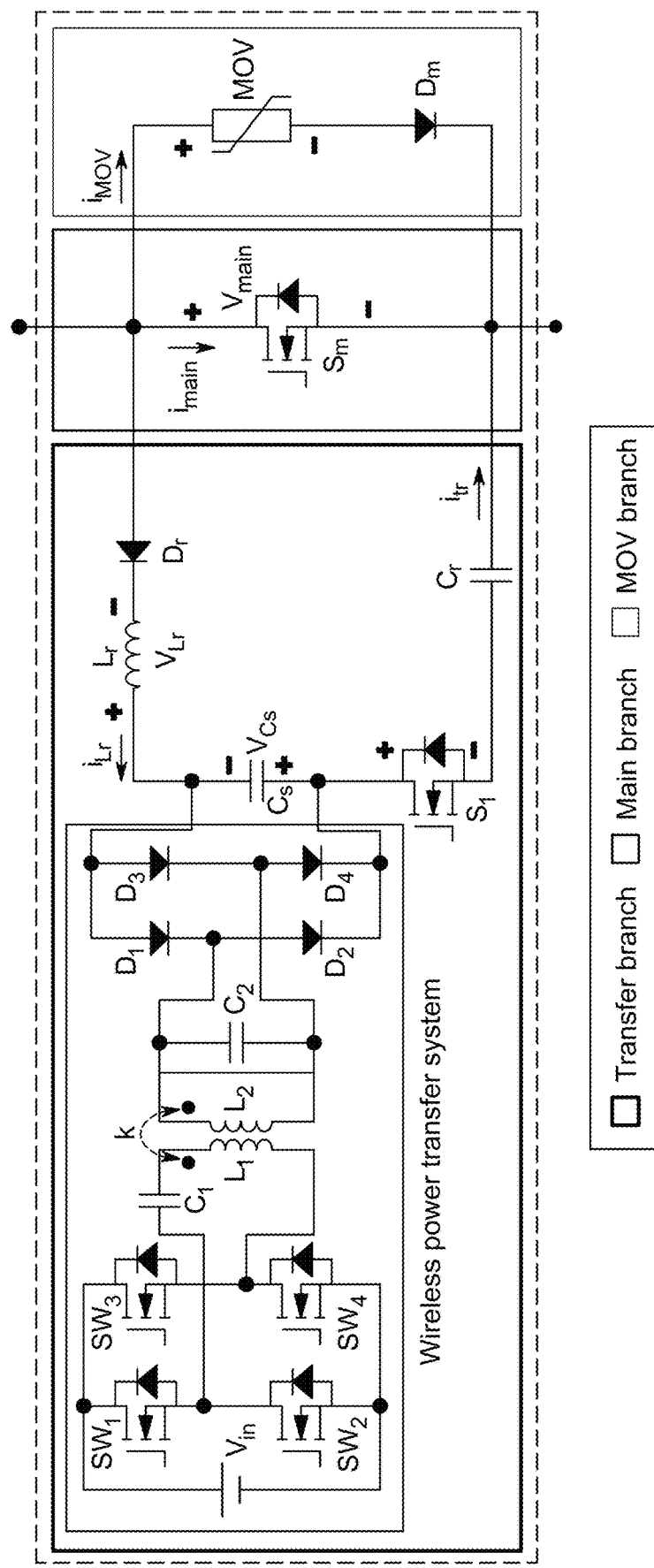

3. Modular Zero Current Switching Solid-State Circuit Breaker with High Isolation Wireless Gate-Drive Power Supply 3.1. Technique Approach 3.1.1. Proposed System Structure FIG. 25 shows a 3-D view of the proposed SSCB 2500. Three modules are connected in parallel in each layer to obtain current scalability, and three layers are connected in series to provide voltage scalability. Each module contains two SiC MOSFETs in series.

To provide a high isolation voltage between the modules, CT-based gate-drive power supplies in combination with Domino-type wireless power transfer system are used. The secondary sides of the CTs are designed by magnetic toroidal cores connected to the gate drivers through inductor-capacitor compensation networks, and the primary sides of the CTs are copper single-wire loops included in the Domino-type wireless system topology. The detailed topology of each part is discussed in next sections.

3.2. ZCS Achievement in Each Module 3.2.1. Circuit Topologies

Figure 28:
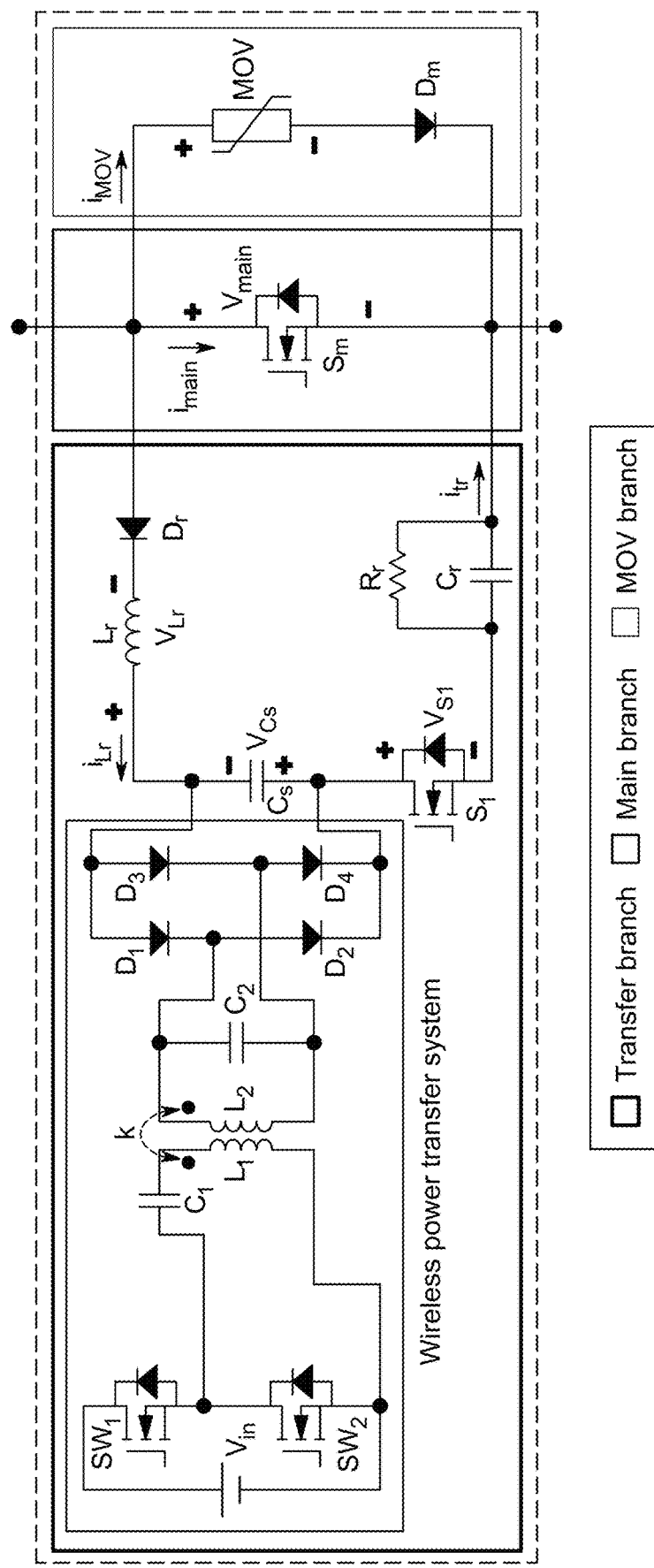
Figure 29:
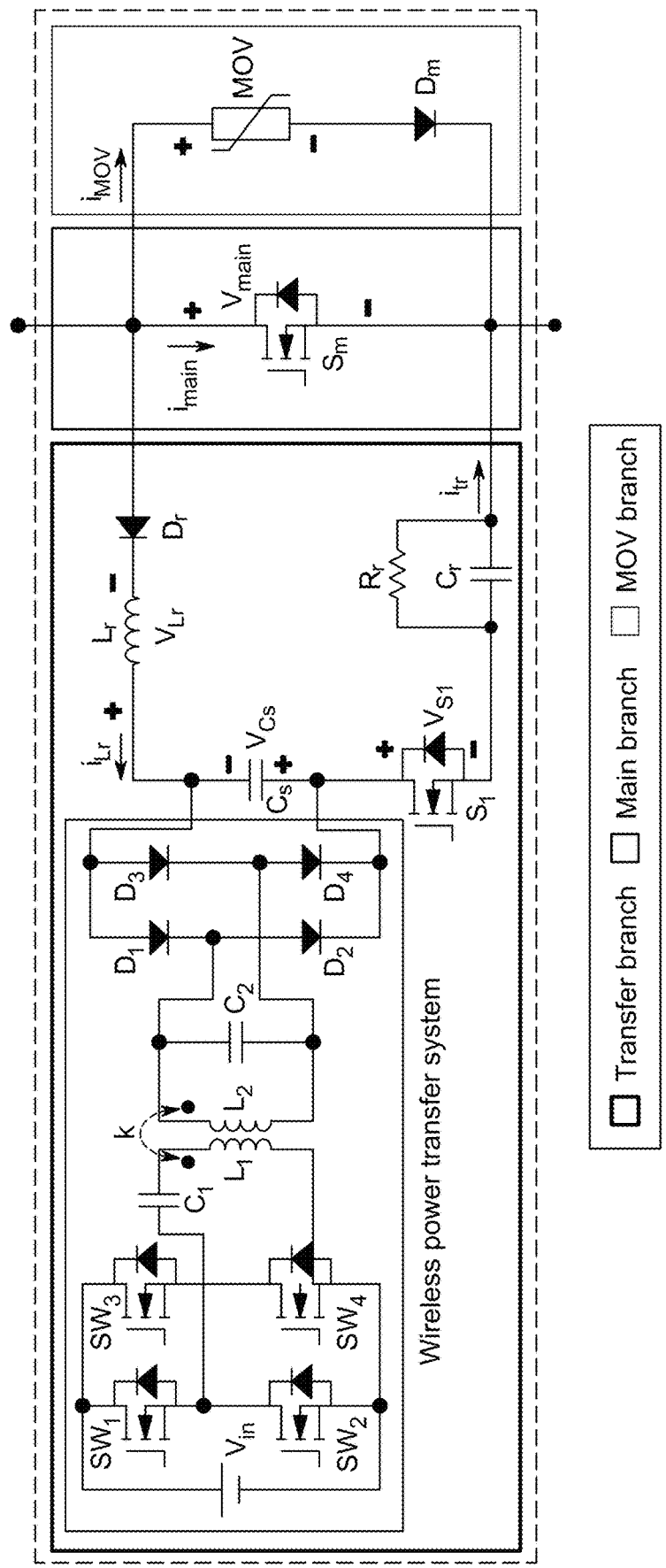
Figure 30:
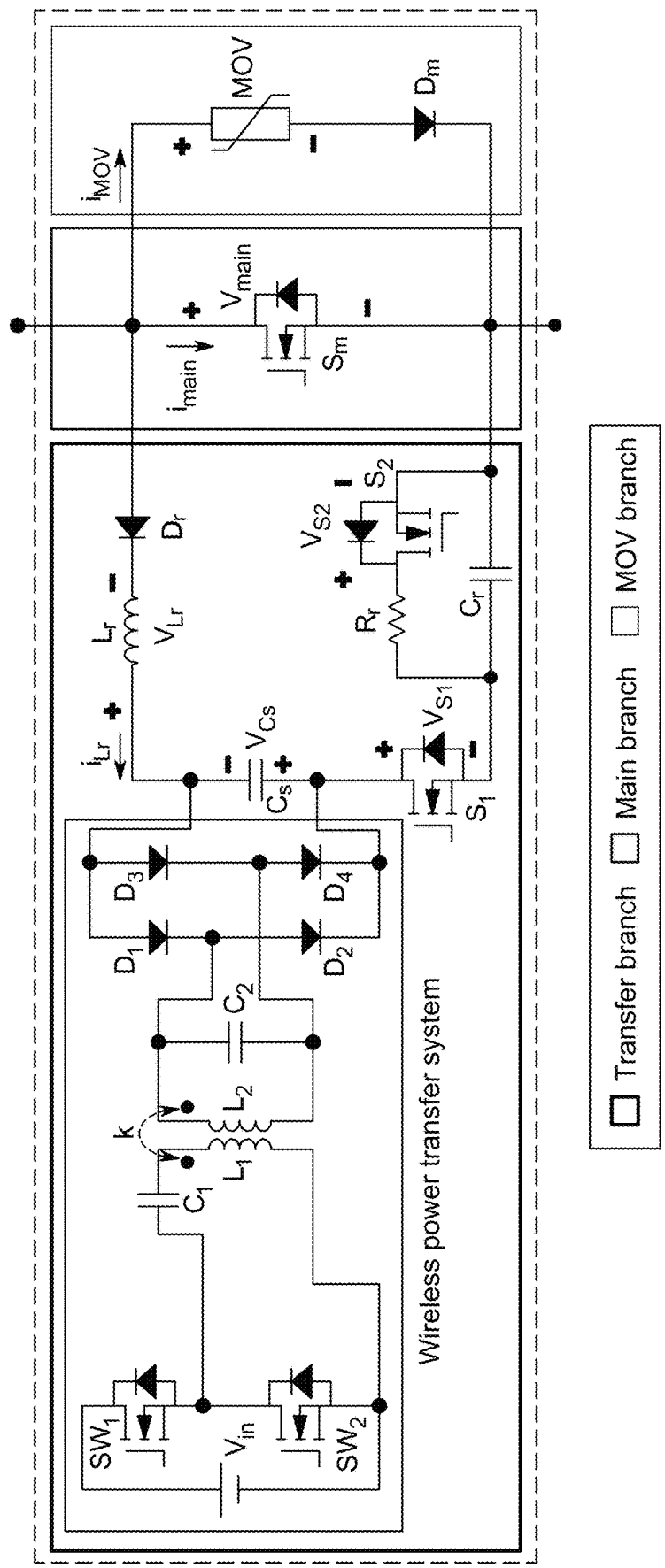
Figure 31:
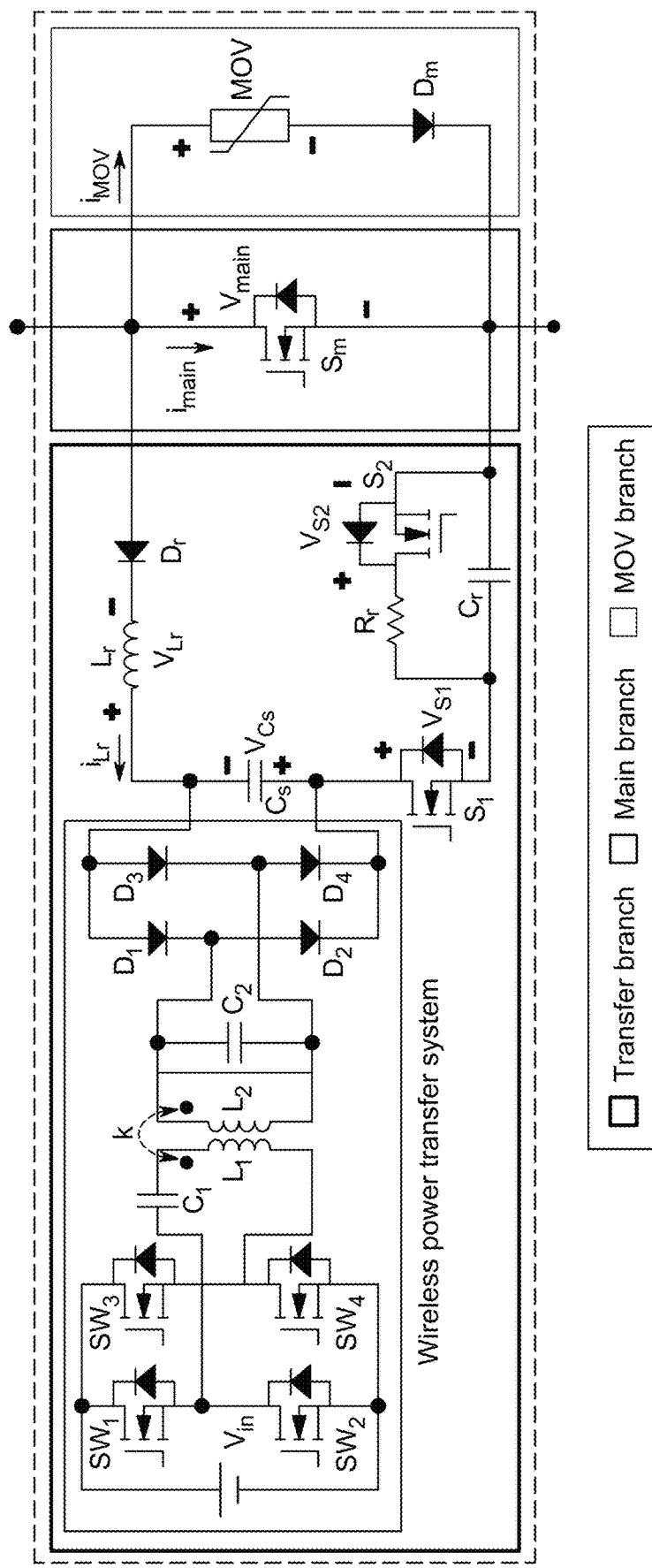
Figure 32:
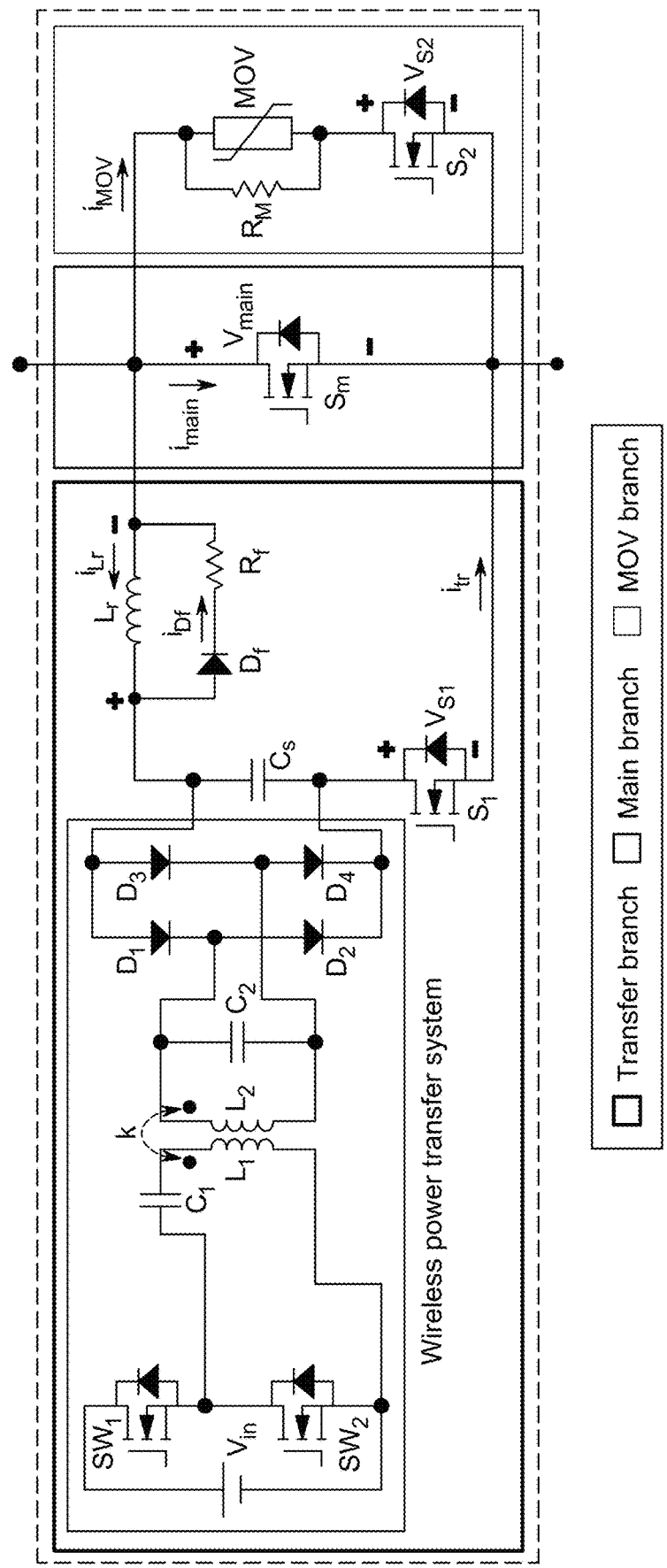
Figure 33:
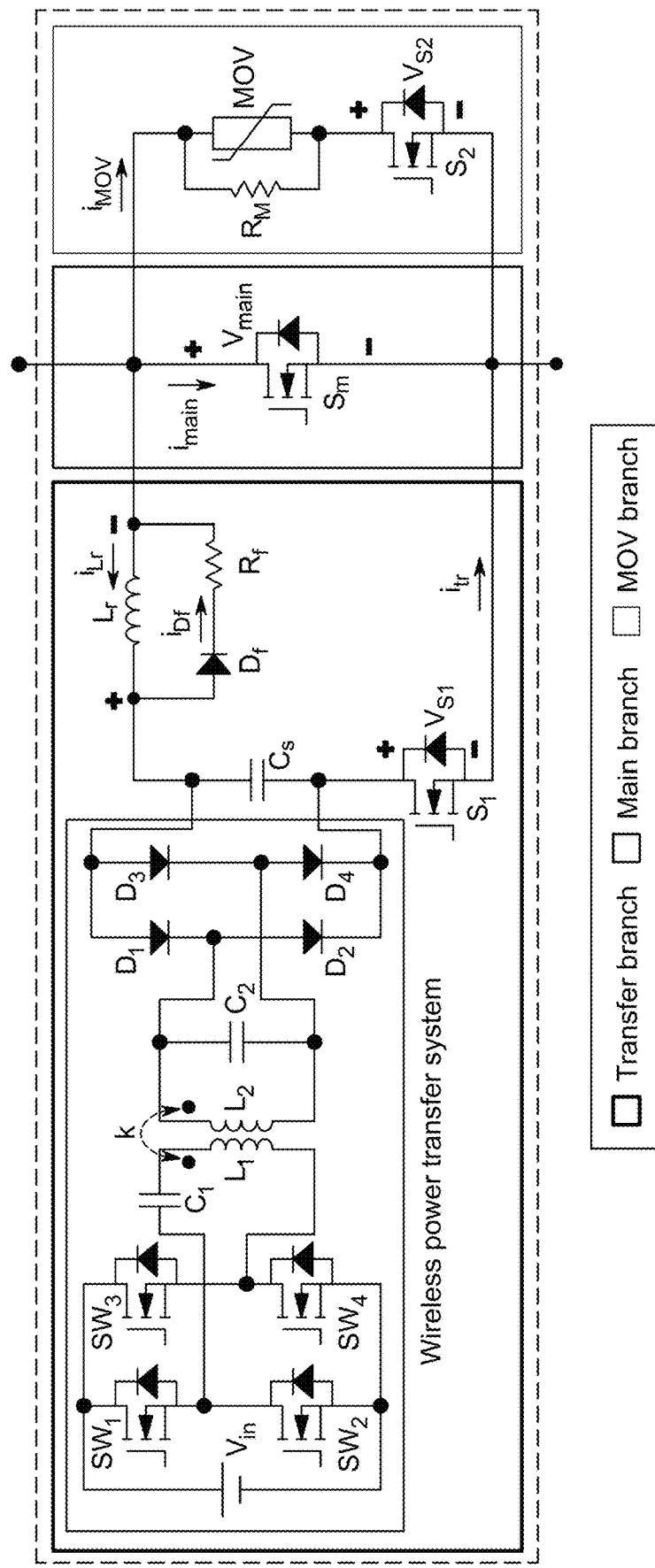
Figure 34:
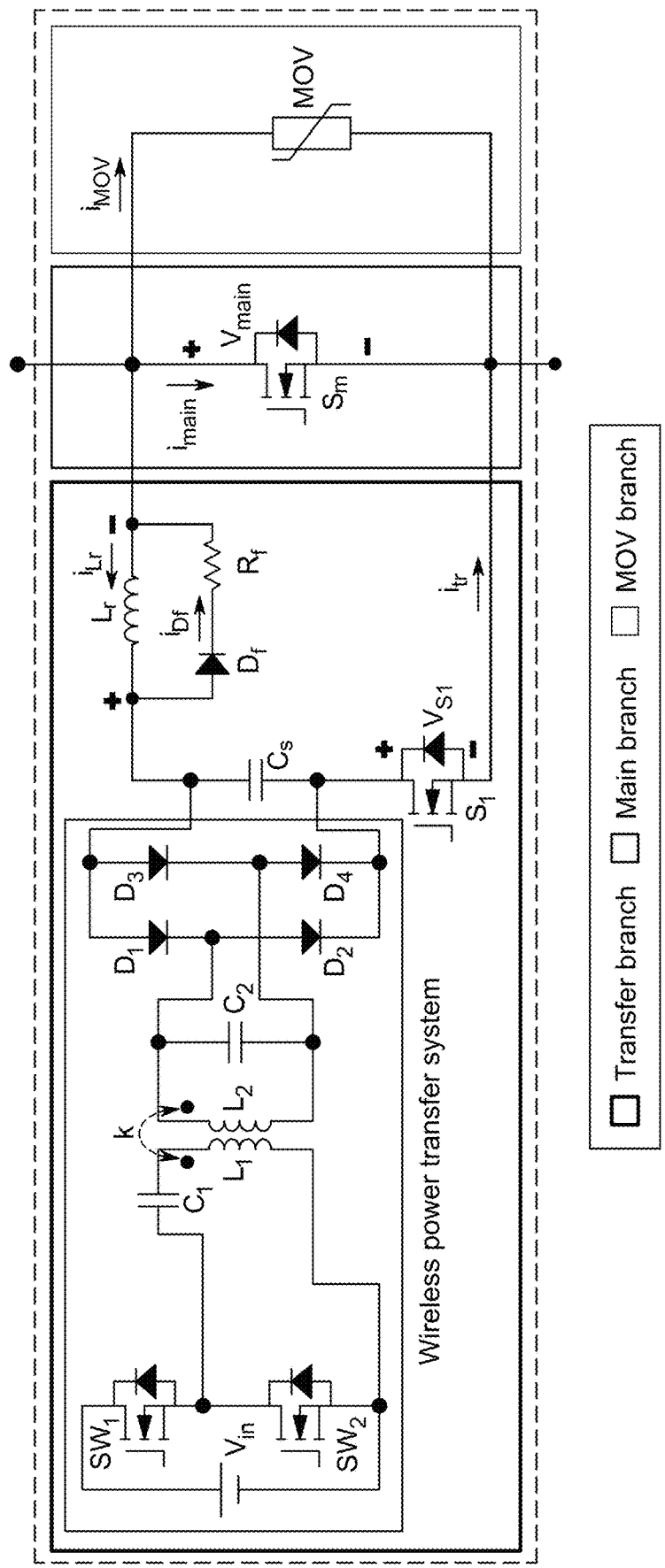
Figure 35:
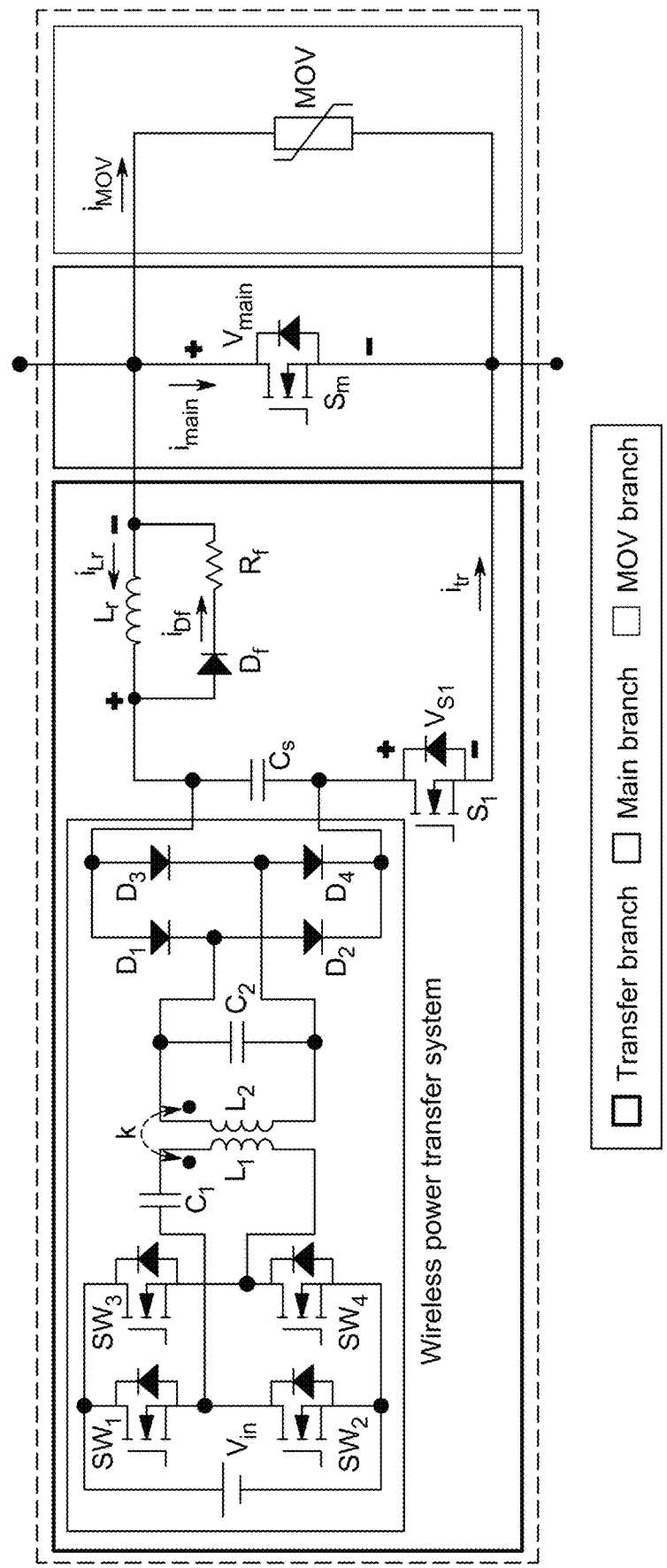
Figure 36:
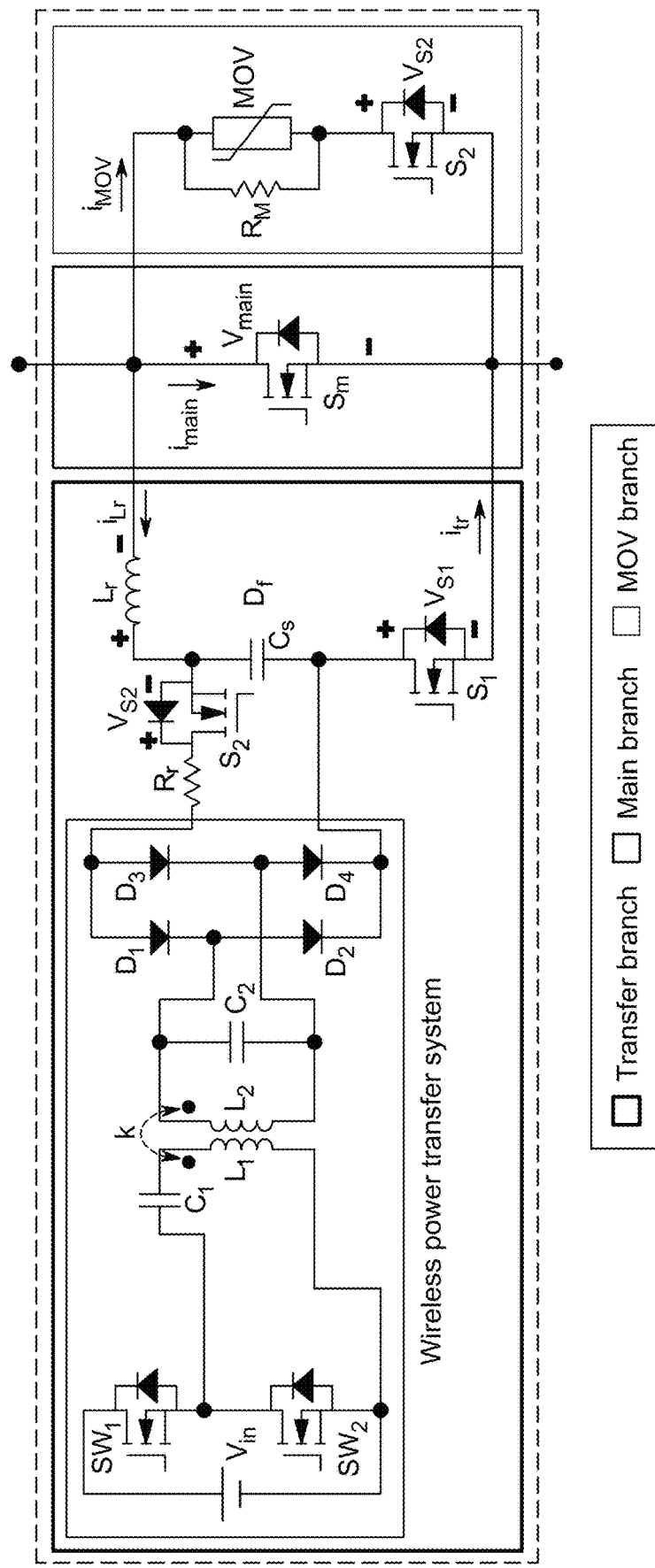
Figure 37:
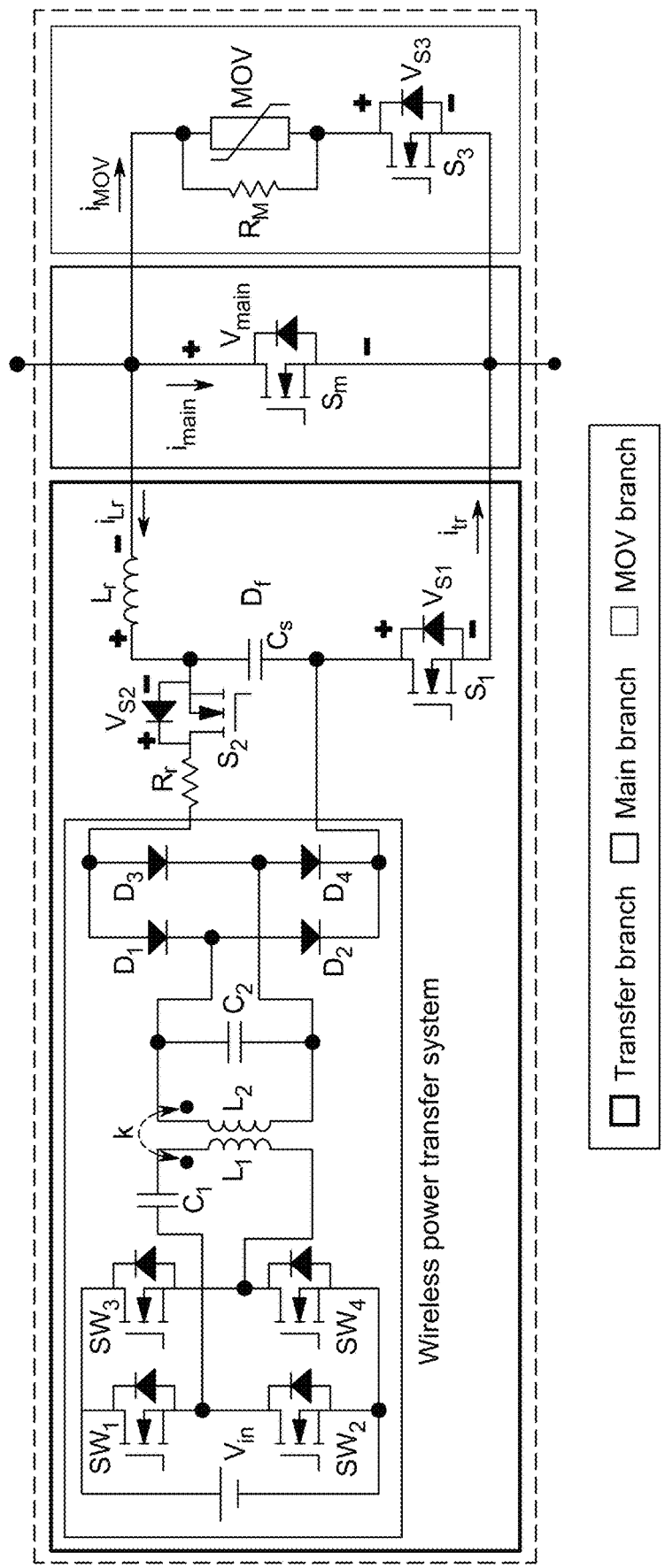

In each module represented in FIG. 25, there are two SiC MOSFETs in series. To achieve zero current switching (ZCS) during DC current interruption in each SiC MOSFET, the transfer branch and energy absorbing branch including metal-oxide-varistors (MOV) are connected in parallel to each MOSFET. FIGS. 26-37 show the proposed possible structures to achieve ZCS for one SiC MOSFET in each module. During DC current breaking, a reverse pulse current is generated by the transfer branch to cancel the current in the main switch (Sm) and achieve ZCS. The magnitude of the reverse pulse current and its duration time is controlled by the selected control scenario and the values of the passive components including Cs, Cr, and Lr in each structure. A series-parallel wireless power transfer system supplied by a half-bridge or full-bridge topologies is developed in the transfer branch to charge the capacitor Cs and keeps VCs constant. The working principle and parameters design procedure for two structures including FIG. 28 and FIG. 37 are discussed in the next sections by way of example and via which the other possible structures in the other FIGS. 26-37 can be understood. The working principle and parameters design of other topologies can be derived through the same process.

3.2.2. Working Principle of the 3rd Design Shown in FIG. 28

Figure 38:
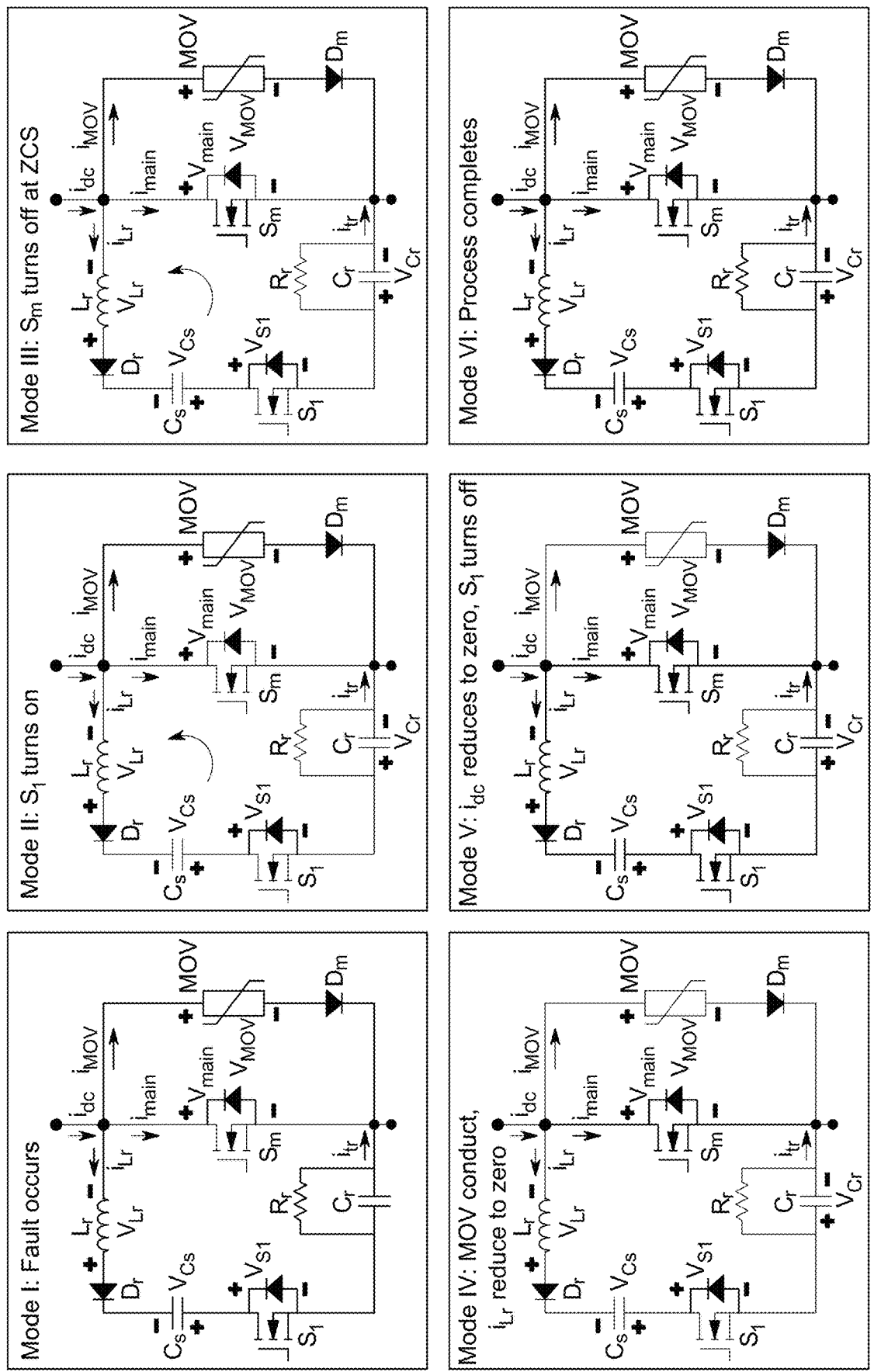
FIG. 38 shows operational modes of the proposed ZCS based SSCB for each MOSFET in each module related to the 3rd design in FIG. 28.

In this section, the working principle and operational modes of the circuit shown in FIG. 28 are shown in FIG. 38 and explained in the following.

1) Mode I. Short circuit fault occurs in the system. $S_m$ is on and conducts the DC current according to the current sharing between the modules. S1 is off, meaning itr=0. Wireless power transfer system charges Cs and keeps its voltage constant to VCs.

2) Mode II. To achieve ZCS in the main switch, S1 turns on, and a reverse pulse current is generated in the transfer branch to cancel the current in $S_m$.

3) Mode III. When imain≤0, $S_m$ turns off at ZCS. In this case, the transfer branch current continues to flow through the body diode of $S_m$. The current flowing through the transfer branch charges the capacitor Cr continuously.

4) Mode IV. As the voltage across the main branch exceeds the turn-on voltage of the MOV, the fault current begins to commutate to the MOV branch, and the fault current in the transfer branch reduces to zero.

5) Mode V. In this mode, the inductive storage energy of the DC system is dissipated by the MOV, and iMOV reduces to zero. As the current in the transfer branch is zero (itr=0), S1 turns off at zero current. After turning S1 off, $C_r$ discharges on Rr selected to a few kΩ. Since the parallel resistance of S1 is a few MΩ in the off-state, the voltage across S1 increases as the voltage across Cr decreases. In steady state, S1 holds following voltage:

$$V_{s1}=(V_{DC}/N)+V_{cs} \quad (23)$$

where N stands for the number of layers in FIG. 25 which is 3.

6) Mode VI. S1 holds the voltage determined in Eq. (23). The current in the MOV branch reduces to zero, and the interruption process completes.

3.2.3. Parameter Design Procedure of the 3rd Design in FIG. 28

This section proposes a design procedure to choose the optimized values for passive components in the transfer branch. The aim is to cancel the DC current of $S_m$, in the first half cycle of the generated pulse current indicated in FIG. 39. The generated current is described by the following expression with damping factor α, natural frequency $\omega_0$, and damped natural frequency $\omega_d$:

$$i_{tr}(t) = \frac{V_{Cs}}{L_r \omega_d} e^{-\alpha \pi} \sin(\omega_d t) \quad (24)$$

$$\omega_0 = \frac{1}{\sqrt{L_r C_{eq}}}, \alpha = \frac{R}{2L_r}, \omega_d = \sqrt{\omega_0^2 - \alpha^2}, T = \frac{2\pi}{\omega_0}, C_{eq} = \left(\frac{C_r \times C_z}{C_r + C_z}\right)$$

where resistor R stands for the resistances of the semiconductor devices and $L_r$. According to FIG. 39 and Eq. (24), the peak value of the first half cycle of the generated pulse current ip,1st is given as follows:

$$i_{p,1st} = \frac{V_0}{L_r \omega_d} e^{-\frac{\alpha \pi}{2\omega_d}} \quad (25)$$

To reliably cancel the current in $S_m$, there is a need to define an interval in which $S_m$ can be turned off in ZCS. Regarding FIG. 39, Δtβ introduces an effective time interval in which ZCS can be achieved. Considering a coefficient 0<β<1, this time interval is defined as follows:

$$\Delta t_\beta = \frac{\pi - 2\arcsin(\beta)}{\omega_d} \quad (26)$$

Figure 39:
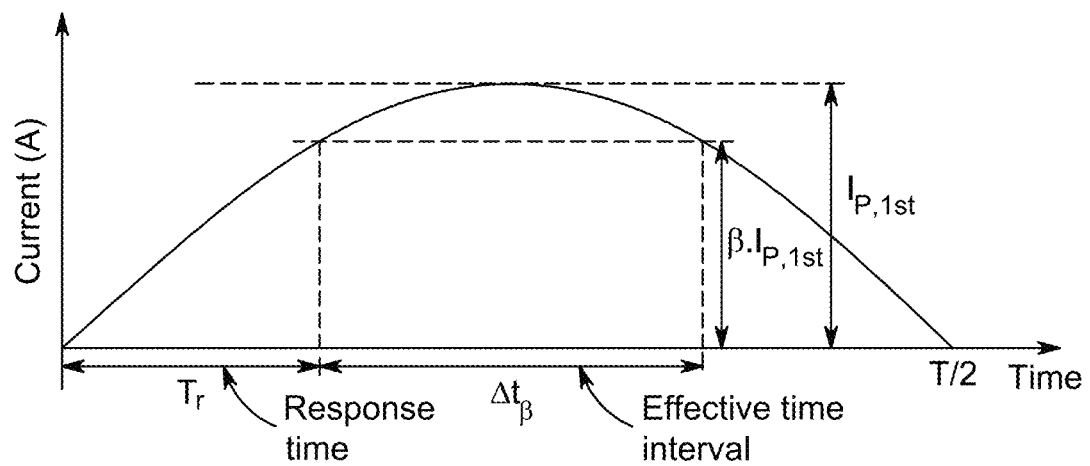
FIG. 39 shows the first half cycle of the generated pulse current in transfer branch.

The minimum value of Δtβ,min is determined based on practical limitations including the hardware delay time of control board, gate drivers, and MOSFETs. FIG. 39 also introduces $T_r$ as the response time of the active injection circuit. This parameter is given as below:

$$T_r = \frac{\pi \sqrt{L_r C_{eq}} - \Delta t_\beta}{2} \quad (27)$$

where iFault determines the maximum fault current in the MVDC system aimed to be realized by the SSCB.

3.2.4 Working Principle of the $12^{th}$ Design Shown in FIG. 37

Figure 40:
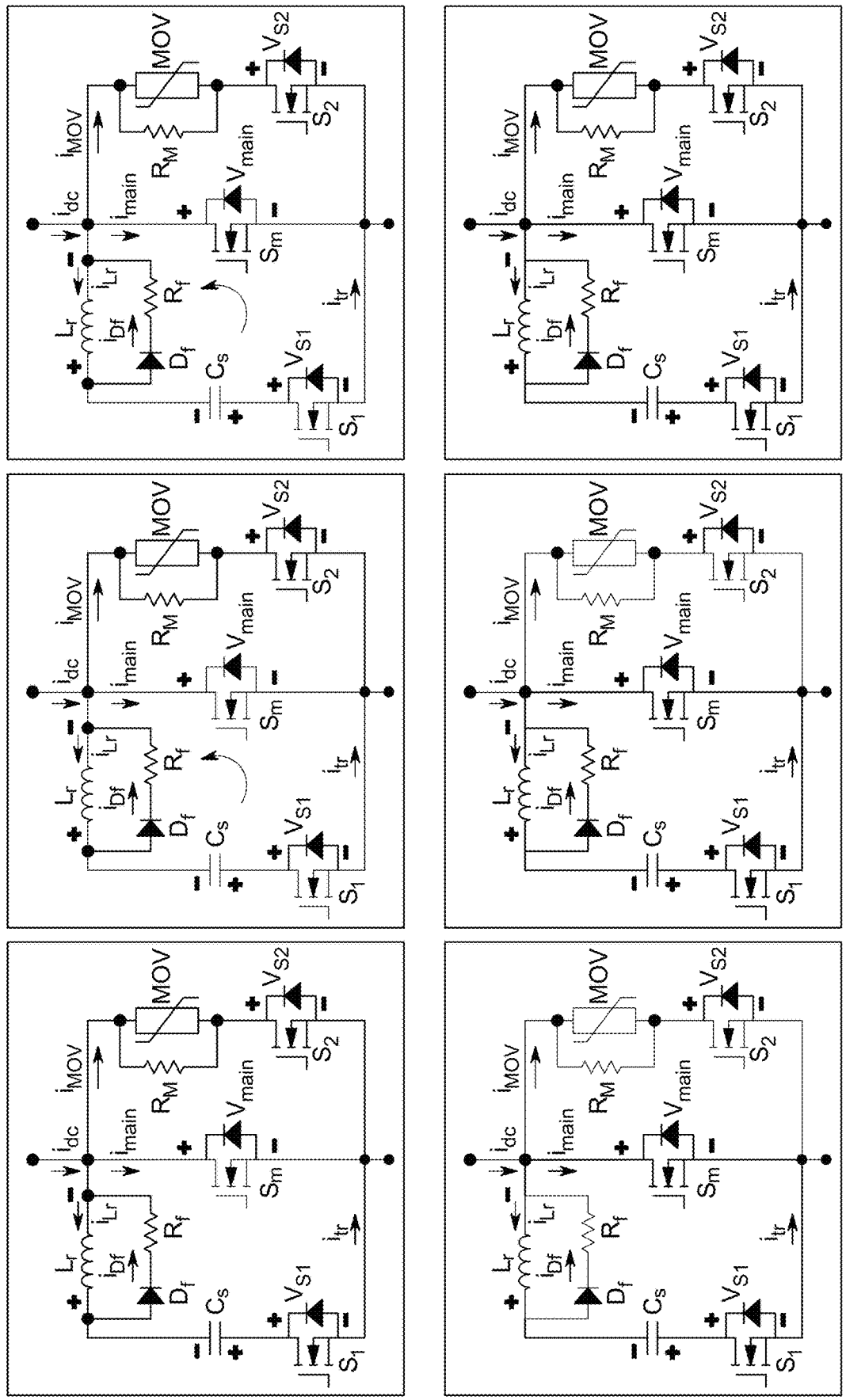
FIG. 40 shows operational modes of the proposed ZCS based SSCB for each MOSFET in each module related to the 3rd design related to the 12th design.

In this section, the working principle and operational modes of the circuit shown in FIG. 37 are shown in FIG. 40 and explained in the following.

1) Mode I. Sm is on and conducts the DC current (imain=idc). S1 is off (itr=0). Wireless converter efficiently charges the capacitor Cs and keeps VCs constant. S2 has been turned on, but its current is zero iMOV=0.

2) Mode II. After detecting a short-circuit fault, the current interruption process begins. S1 turns on at t=t1 to generate a pulse current iLr to cancel the main DC current imain. As iLr starts to increase, imain begins to decrease. Also, Vmain is zero, and VCs decreases slightly as the pulse current is generated.

3) Mode III. Sm turns off at ZCS condition when imain≤0. In this case, itr continues to flow through the body diode of Sm.

4) Mode IV. S1 turns off to interrupt the current in the transfer branch. iLr starts to flow through the freewheeling circuit. The voltages across S1 and Sm begin to increase. When Vmain exceeds the threshold voltage of MOV, the fault current commutates to the MOV branch. In this case, iMOV=idc, imain=0, itr=0, and the voltage Vmain is clamped by the MOV, meaning Vmain≤Vclamp.

5) Mode V. iLr reduces to zero. The residual energy in the DC system line-inductance is dissipated in MOV. The SSCB voltage returns to the nominal DC voltage. Due to the parallel resistance RM and MOV, iMOV≠0.

6) Mode VI. S2 turns off and holds the DC voltage in the MOV branch; the leakage current is eliminated iMOV=0.

3.2.5. Parameter Design Procedure of the 12th Design Shown in FIG. 37

A design procedure is presented to find the optimized values of passive components in the transfer branch for the 12th design shown in FIG. 37. To achieve this, FIG. 41 including the electrical current waveforms and operational modes for the 12th design is considered.

According to FIG. 40, at t=tβ, there are iLr=idc and imain=0. By ignoring the resistances of MOSFET and $L_r$, the current relationship is derived as below.

$$(V_{cs}/L_r) \times \Delta t_{\beta 1} = i_{dc} \quad (28)$$

where Δtβ1=tβ−t1. As indicated in FIG. 40, Δβ=t3−tβ defines the effective time interval in which $S_m$ can be turned off in ZCS. In practice, Δβ,mm is determined by the hardware delay time of the control platform, gate driver, and MOSFET. Therefore, the response time of the SSCB to interrupt the DCcurrent is determined as follows:

$$\Delta_{31}=\Delta_{\beta 1}+\Delta_\beta \quad (29)$$

Figure 41:
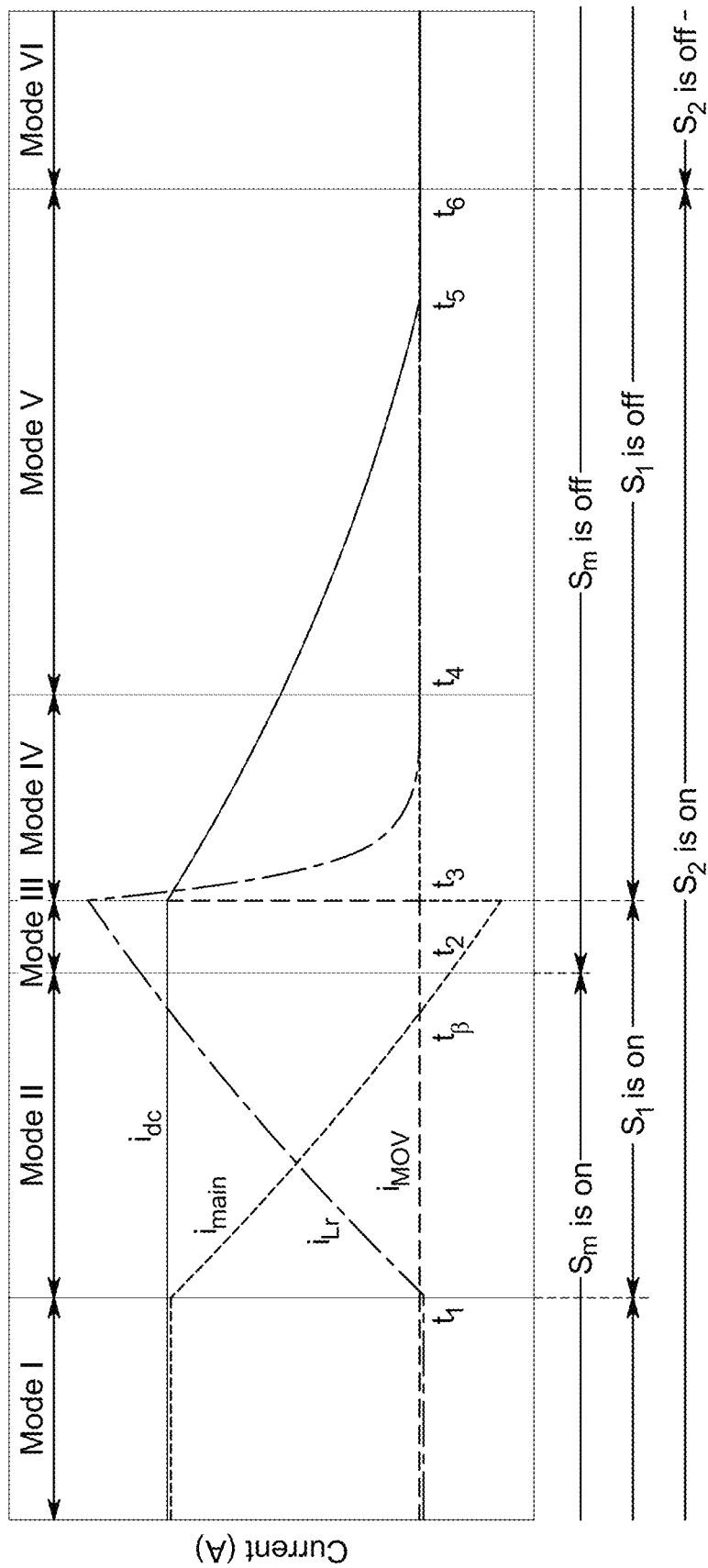
FIG. 41 shows the electrical current waveforms and operational modes for the 12th design.

Considering equations (28) and (29), Lr can be chosen. Because VCs is considered almost constant during current interruption, the optimized value of Cs is selected from equation (30).

$$C_s \geq (\Delta t_{31})^2/(2 \times \alpha \times L_r) \quad (30)$$

where α stands for an acceptable percentage reduction of VCs during modes II and III shown in FIG. 41.

3.3 CT-Based Gate-Drive Power Supply and Domino-Type System

Figure 42:
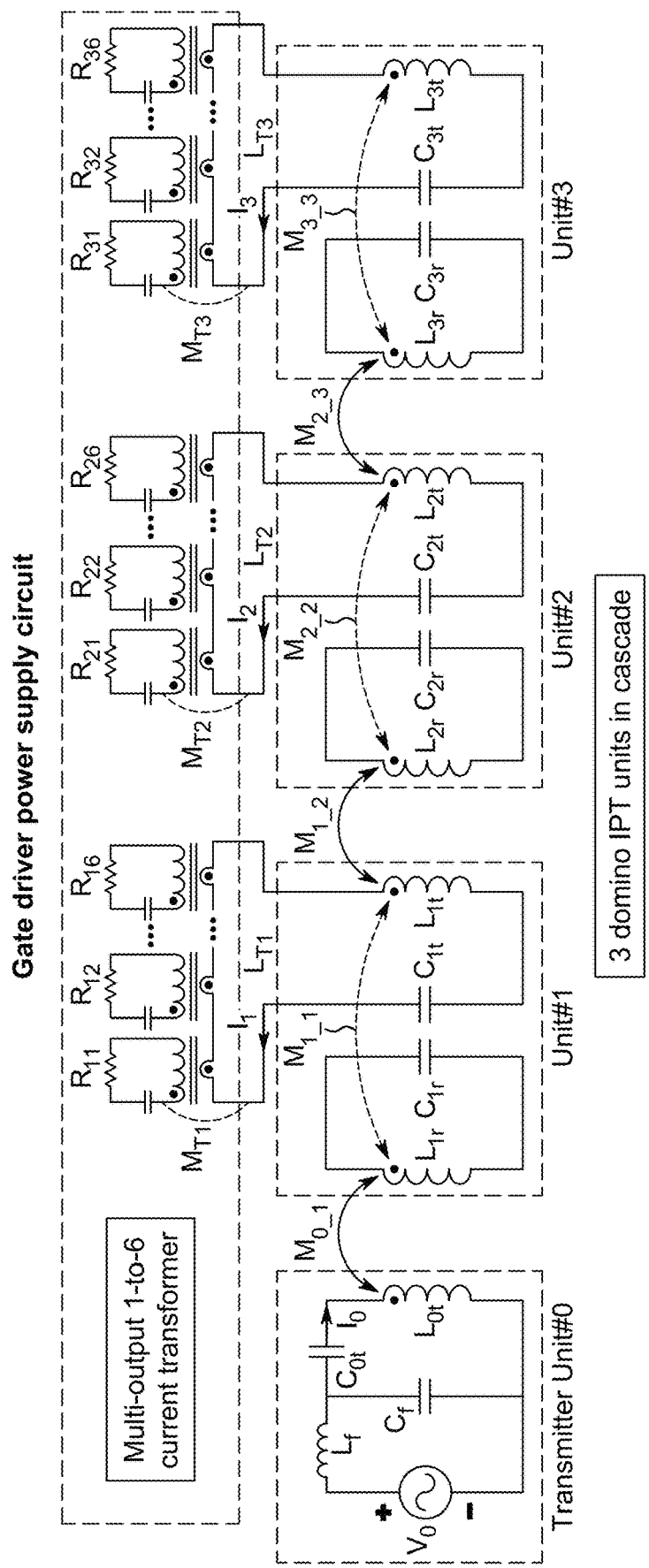
FIG. 42 shows a CT-based gate-drive power supply and domino-type system structure.

CT-based gate-drive power supply and domino-type system structure are represented in FIG. 42. In this section, the circuit topology and the mathematical investigation are presented.

3.3.1 System Structure and Circuit Topology

FIG. 42 presents the system structure and circuit topology of the proposed CT-based gate-drive power supply with domino-type wireless power transfer system. With constant-voltage excitation V0, the LCC compensated Transmitter Unit #0 will generate a constant current I0 flowing through L0t. The following 3 domino units are compensated by series capacitors and magnetically coupled with each other in cascade. The mutual inductance between coils is represented in this figure. Each unit will respectively connect to a multi-out 1-to-6 current transformer and the load resistors are connected to the secondary sides. With such a circuit topology, constant current I1, I2, and I3 are expected generated, which will respectively flow through the primary sides of the current transformer, LT1, LT2, and LT3. Then, constant load voltages will be generated.

Figure 43:
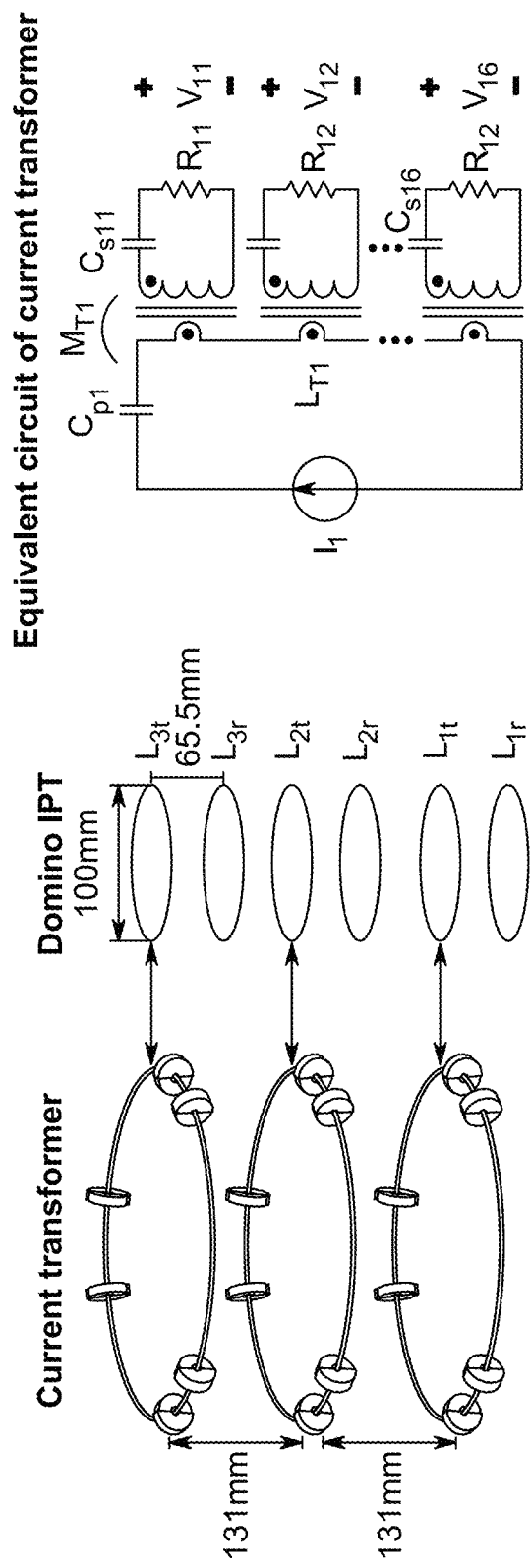
FIG. 43 shows the 3D configuration of gate-drive supply and equivalent circuit for the current transformer in each layer.

The 3D configuration of the proposed gate-drive supply is shown in FIG. 43. A circular air-core coil structure is chosen to develop the domino-type wireless system. The single-turn coil is used as the primary side of the current transformer in each layer. Six toroidal cores are employed as the secondary sides the current transformer. These secondary side coils are connected to the gate-drive circuits through series capacitors to provide a secondary series LC compensation network. The equivalent circuit for current transformer in each layer is also shown in FIG. 43.

3.3.2. Working Principles and Mathematical Investigations

According to FIG. 42 the circuit parameters are designed to achieve a load-independent design. In this case, the resonant frequency is described by equation (31).

$$\omega = \frac{1}{\sqrt{L_f C_f}} = \frac{1}{\sqrt{(L_{0t} - L_f)C_{0t}}} = \frac{1}{\sqrt{L_{1r} C_{1r}}} = \frac{1}{\sqrt{(L_{1t} + L_{T1})C_{1t}}} \quad (31)$$
$$= \frac{1}{\sqrt{L_{2r} C_{2r}}} = \frac{1}{\sqrt{(L_{2t} + L_{T2})C_{2t}}} = \frac{1}{\sqrt{L_{3r} C_{3r}}} = \frac{1}{\sqrt{(L_{3t} + L_{T3})C_{3t}}}$$

When the system works with at resonant frequency specified in (31), current $I_0$, $I_1$, $I_2$, and $I_3$ are given by (32).

$$|I_0| = \frac{V_0}{\omega L_f} \cdot |I_1| = |I_0|\frac{M_{0-1}}{M_{1-1}}, |I_2| = |I_1|\frac{M_{1-2}}{M_{2-2}}, |I_3| = |I_2|\frac{M_{2-3}}{M_{3-3}} \quad (32)$$

Equation (32) indicates that transformer primary current I1, I2, and I3 are load-independent, in which secondary side output voltage are also load-independent and given as (34).

$$\begin{cases} |V_1| = |V_{11}| = |V_{12}| = \ldots = |V_{16}| = \omega M_{T1}|I_1| \\ |V_2| = |V_{21}| = |V_{22}| = \ldots = |V_{26}| = \omega M_{T2}|I_2| \\ |V_3| = |V_{31}| = |V_{32}| = \ldots = |V_{36}| = \omega M_{T3}|I_3| \end{cases} \quad (34)$$

3.4 A Design Example of the Proposed SSCB

Figure 45:
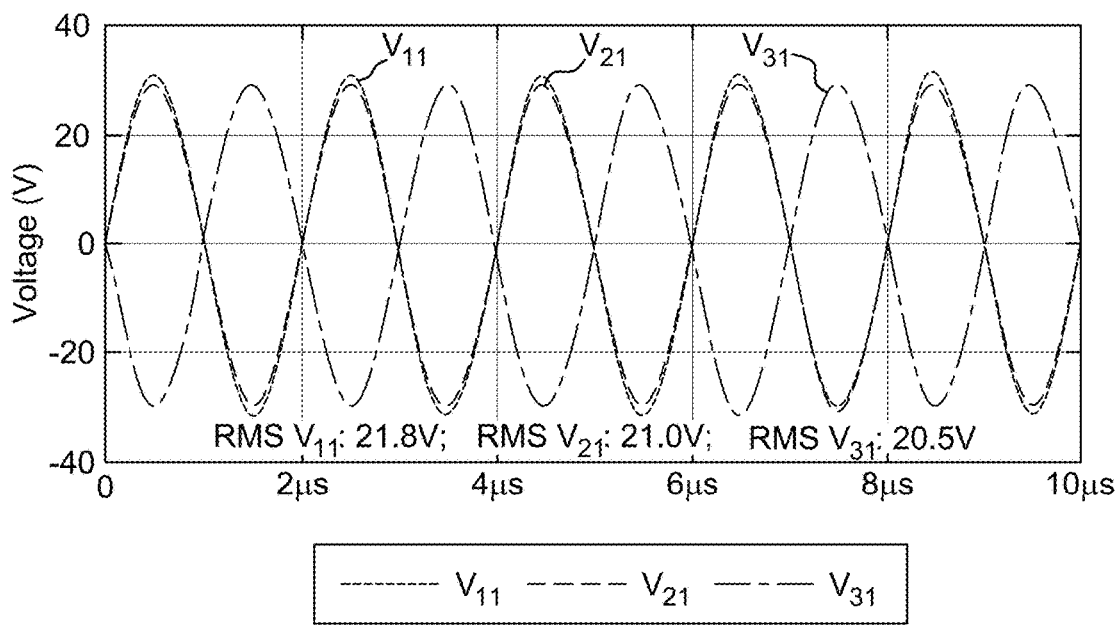
FIG. 45 shows a current transformer secondary side voltage waveforms.
Figure 46:
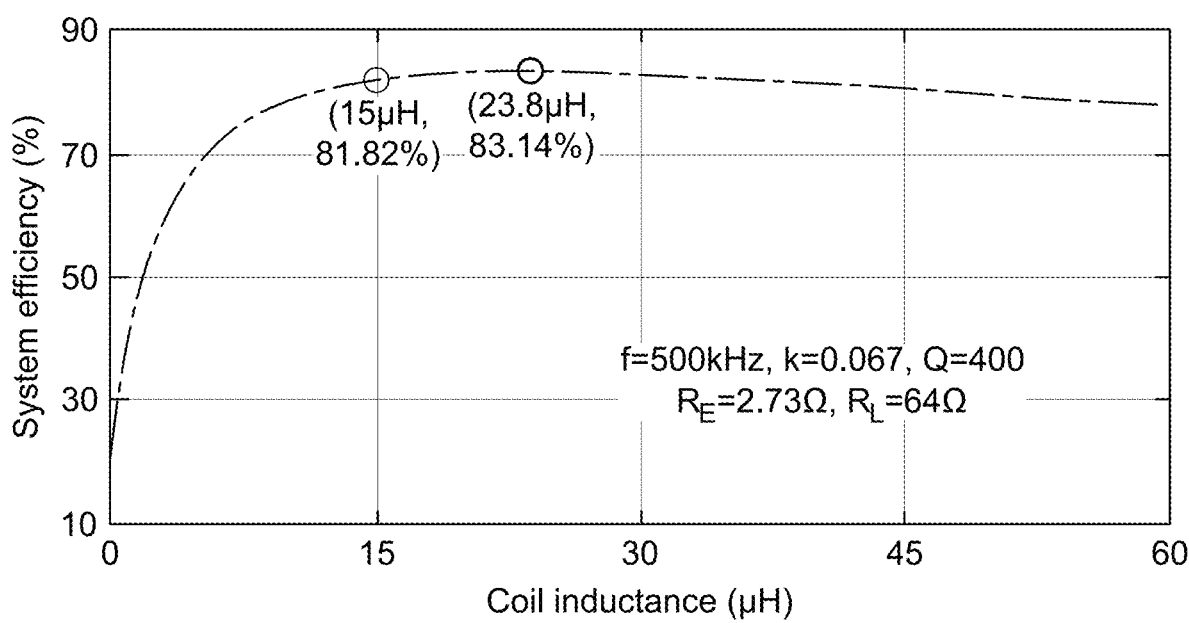
FIG. 46 shows system efficiency versus coil inductance.

3.4.1. CT-Based Gate-Drive Power Supply Design Parameters and Simulation Results FIG. 63, Table 6 shows the design parameters of the Domino wireless power transfer system. Also, FIG. 64, Table 7 indicates the design parameters of the primary and secondary sides of the current transformer. Simulation results of the CT-based gate-drive power supply with the Domino wireless power transfer system are shown in FIGS. 44-46.

Figure 44:
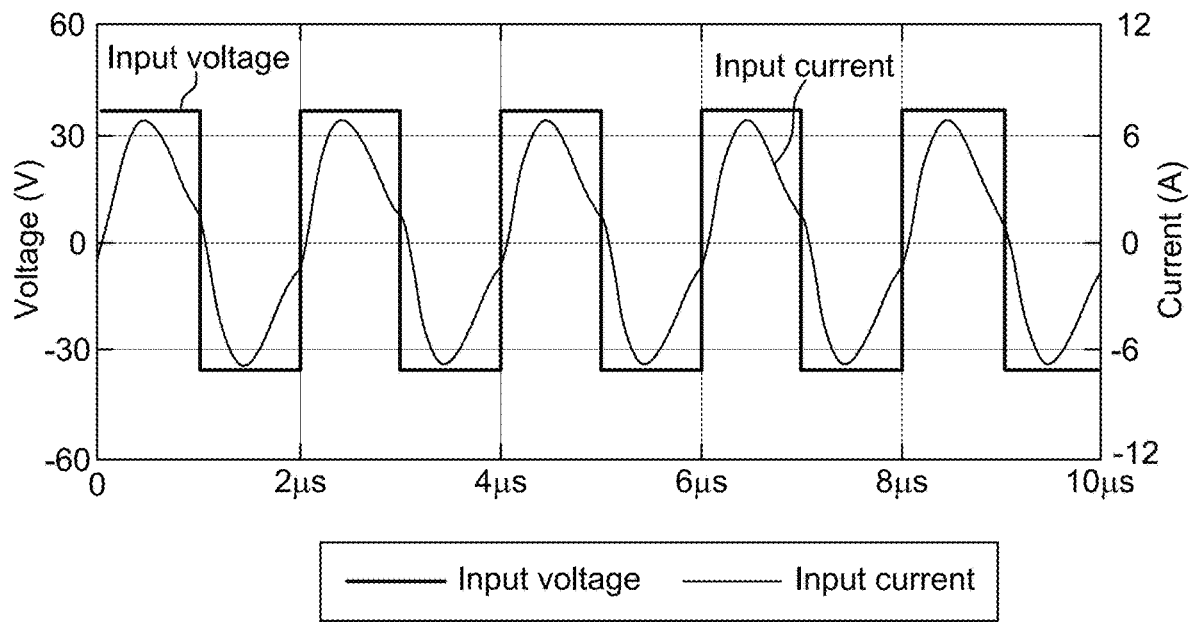
FIG. 44 shows an input voltage and current waveforms of the Domino wireless system.

FIG. 44 indicates the input current and voltage of the Domino wireless power transfer system. The input DC link voltage is 36V, and zero-voltage-switching (ZVS) along with zero-phase-angle (ZPA) are achieved to minimize switching loss in the input inverter. FIG. 45 shows the current transformer's secondary side voltages. Also, FIG. 46 represents system efficiency versus Domino wireless system coil inductance. As it can be seen, by choosing 23.8 µH for coils' inductance, the system efficiency of 83.14% is achieved.

3.4.2. Design Parameters and Simulation Results for the Proposed SSCB Related to the FIG. 28

In this section, the designed parameters and simulation results of the proposed SSCB shown in FIG. 25 are represented for 10 kV/500 A example by considering FIG. 28 as the chosen topology for transfer and MOV branches. The proposed SSCB is tested in a DC system with a line inductor Lime and a resistive load RLoad to simulate the dynamic and steady state features of real DC networks. According to the modular structure of SSCB, the electrical ratings for each SiC MOSFET in each module is 1.67 kV/166.67 A. By taking the design procedure of the 3rd design into account, the optimized design parameters are presented in FIG. 65, Table 8.

In the circuit topology of FIG. 28, two MOVs V661DB40 from Little fuse with the maximum rated DC voltage of 850V and the maximum clamping voltage of 1720V are connected in series. Regarding the inductive series-parallel wireless transfer system as the Cs charger in FIG. 28, the input voltage is 24V, and by employing the optimized values for the passive components, the output voltage of 400V is achieved.

Figure 47:
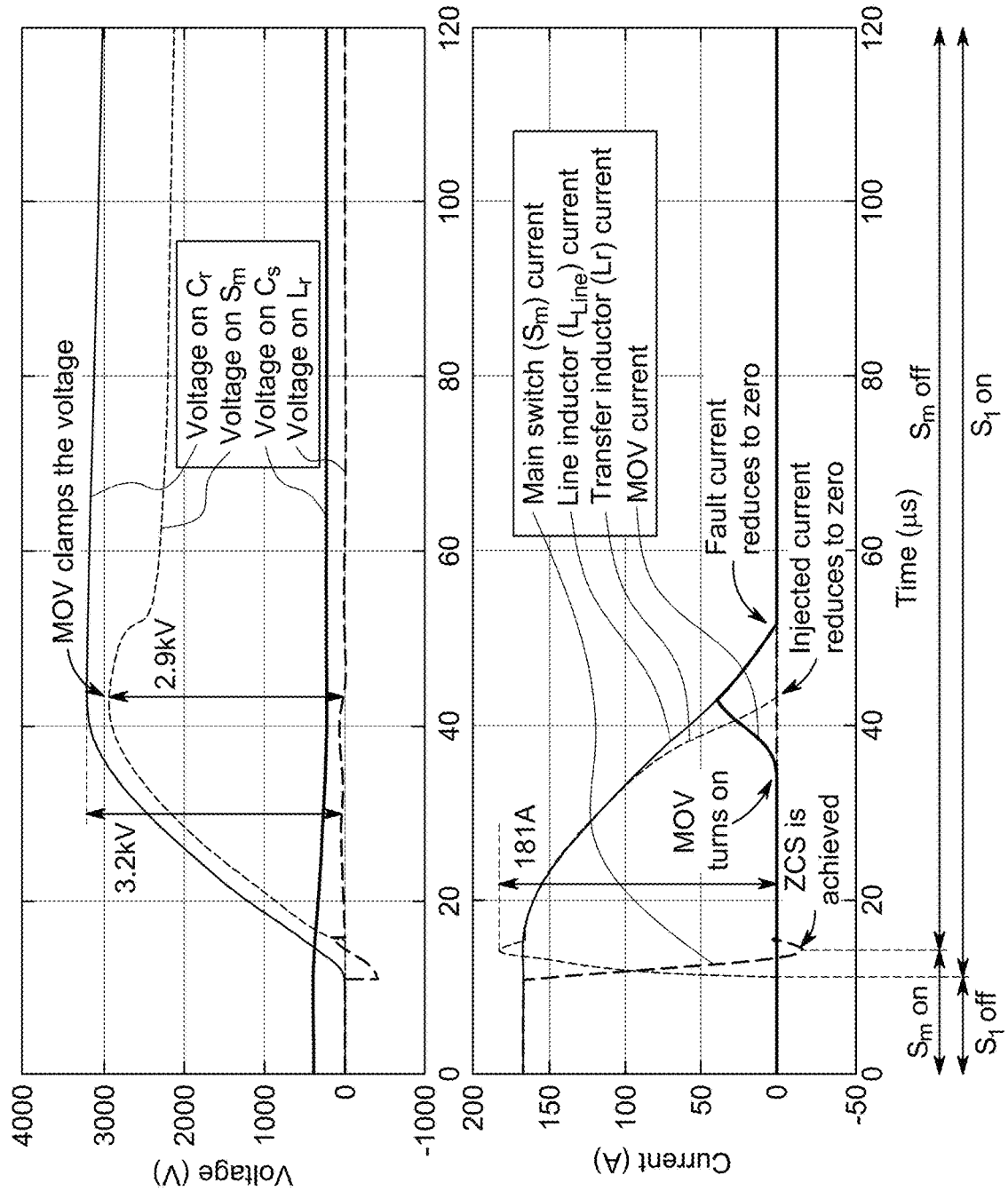
FIG. 47 shows simulation results of the circuit topology of FIG. 28.

According to the selected parameters of the passive components in the transfer branch of FIG. 28, simulation results are given in FIG. 47.

Considering FIG. 47, the switching states of $S_m$ and $S_1$ switches are represented. By using the proper values for the passive components (Cs, Cr, and Lr) and the VCs voltage on Cs, the maximum value of the generated current in the transfer branch reaches 181 A during DC current interruption. This current provides ZCS in the main branch which is indicated in FIG. 47.

According to the chosen MOVs in the MOV branch, the maximum clamping voltage reaches 2.9 kV and the maximum voltage on the coupling capacitor reaches 3.2 kV. This peak voltage across the MOSFET places in the safe range of the electrical voltage rating of the SiC MOSFET which id 3.3 kV. As it is shown in FIG. 47, the response time of the selected SiC MOSFET (in one module) to interrupt the fault current of 166.67 A is 32 µs, and because all the SiC MOSFETs of all the modules receive interruption signals simultaneously, the response time of the whole SSCB system is the same.

3.4.3. Design Parameters and Simulation Results for the Proposed SSCB Related to the FIG. 37

In this section, the designed parameters and simulation results of the proposed SSCB shown in FIG. 25 are represented for 10 kV/250 A example. Proposed SSCB with the transfer and MOV branches topology indicated in FIG. 37 is employed to achieve ZCS in the main branch. The DC test system is the same as what has been described in the previous section with a line inductor $L_{line}$ and a resistive load $R_{Load}$.

According to the modular topology of the SSCB, the electrical ratings for each SiC MOSFET in each module is 1.67 kV/83.33 A. Considering the design procedure introduced for the proposed circuit of FIG. 37, the optimized values of the passive components are represented in FIG. 66, Table 9. The simulation results of the 12th SSCB design of FIG. 37 are shown in FIG. 48.

In the circuit topology of FIG. 37, two MOVs V661DB40 from Little fuse are placed in series to clamp the voltage on the main switch. With respect to the CT-based gate-drive power supply, the input voltage of the inverter is 24V and the output voltage on Cs is 85V. The parameters of the wireless system are also represented in FIG. 66, Table 9.

Figure 48:
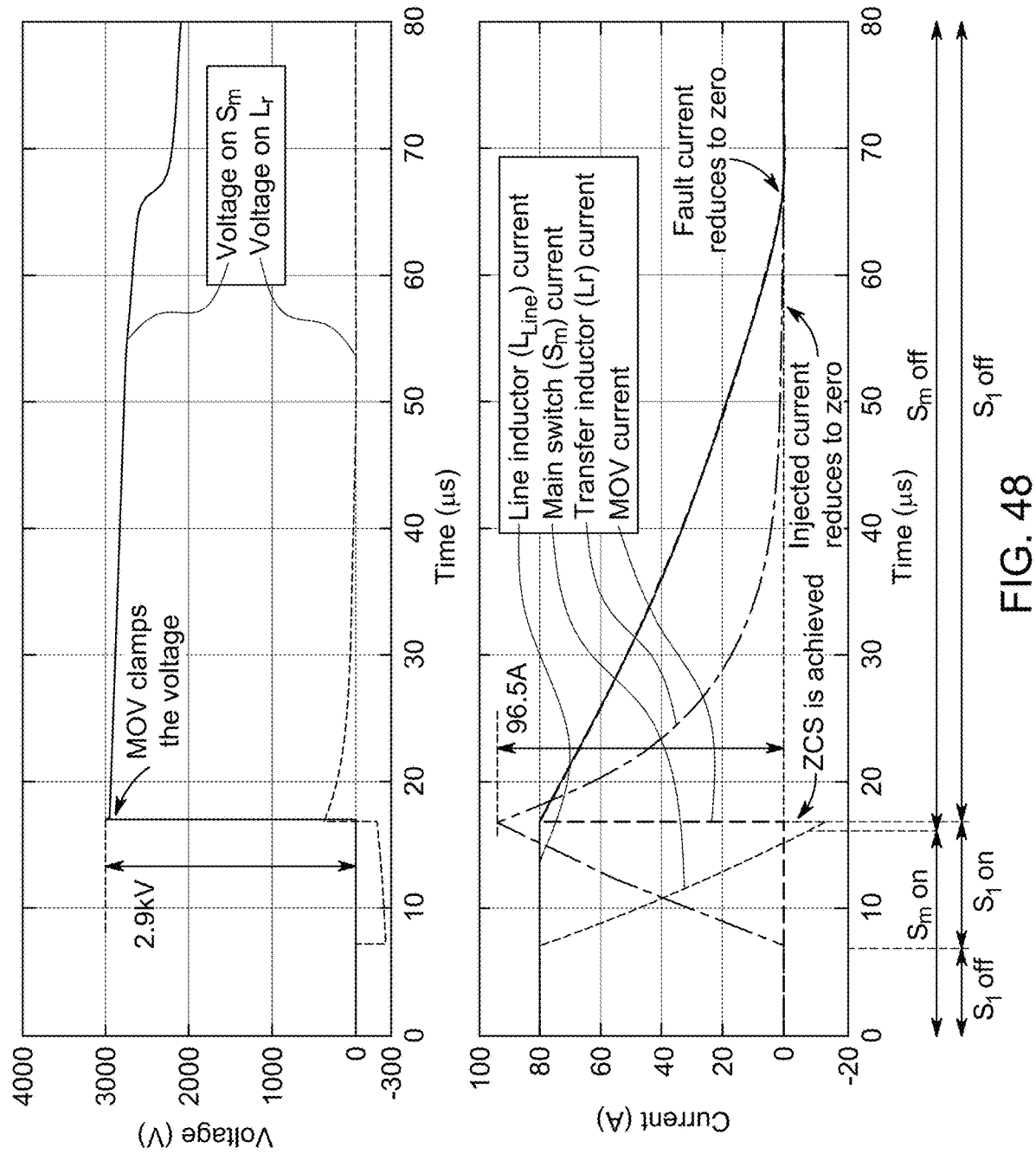
FIG. 48 shows the simulation results of the circuit topology of FIG. 37.

As it can be seen in FIG. 48, the maximum generated current in the transfer branch reaches 96.5 A and the MOV clamps the voltage to 2.9 kV. According to the maximum operating voltage rating of the used SiC as 3.3 kV, this peak voltage is placed in the safe range. The main switch is turned off in ZCS condition and the response time of the transfer branch to generate 83.33 A is 7.2 μs. The total time interval of the proposed SSCB to interrupt 83.33 A is 9.4 μs.

4. 380 V/80 A/9.4MS Ultrafast Soft-Switched Sic Solid-State Circuit Breaker with Active Injection Circuits This section proposes a soft-switched turn-off solid-state circuit breaker (SSCBs) based on active injection circuits (AICs) to eliminate the effects of parasitic components and reduce the peak voltage during the DC current breaking. Passive components of the AICs are optimized to maintain compactness. A series-parallel wireless system is developed to charge the capacitor of the AICs, working in a burst soft-switching mode with a low input voltage to reduce power losses. The proposed AICs require no discharge circuits which enhances the power-density and facilitates reclosing process. The presented SSCB employs a time-sequence control and needs no real-time detections of the current which simplify the design. Also, a new structure is proposed in the energy-absorbing varistor to eliminate leakage currents and shorten the reclosing interval. In addition to simulations, experiments of a 380 V/80 A prototype validate the effectiveness of the proposed SSCB in practice where the voltage on the SSCB is clamped to 721V with the response time of 9.4 μs.

Figure 49A:
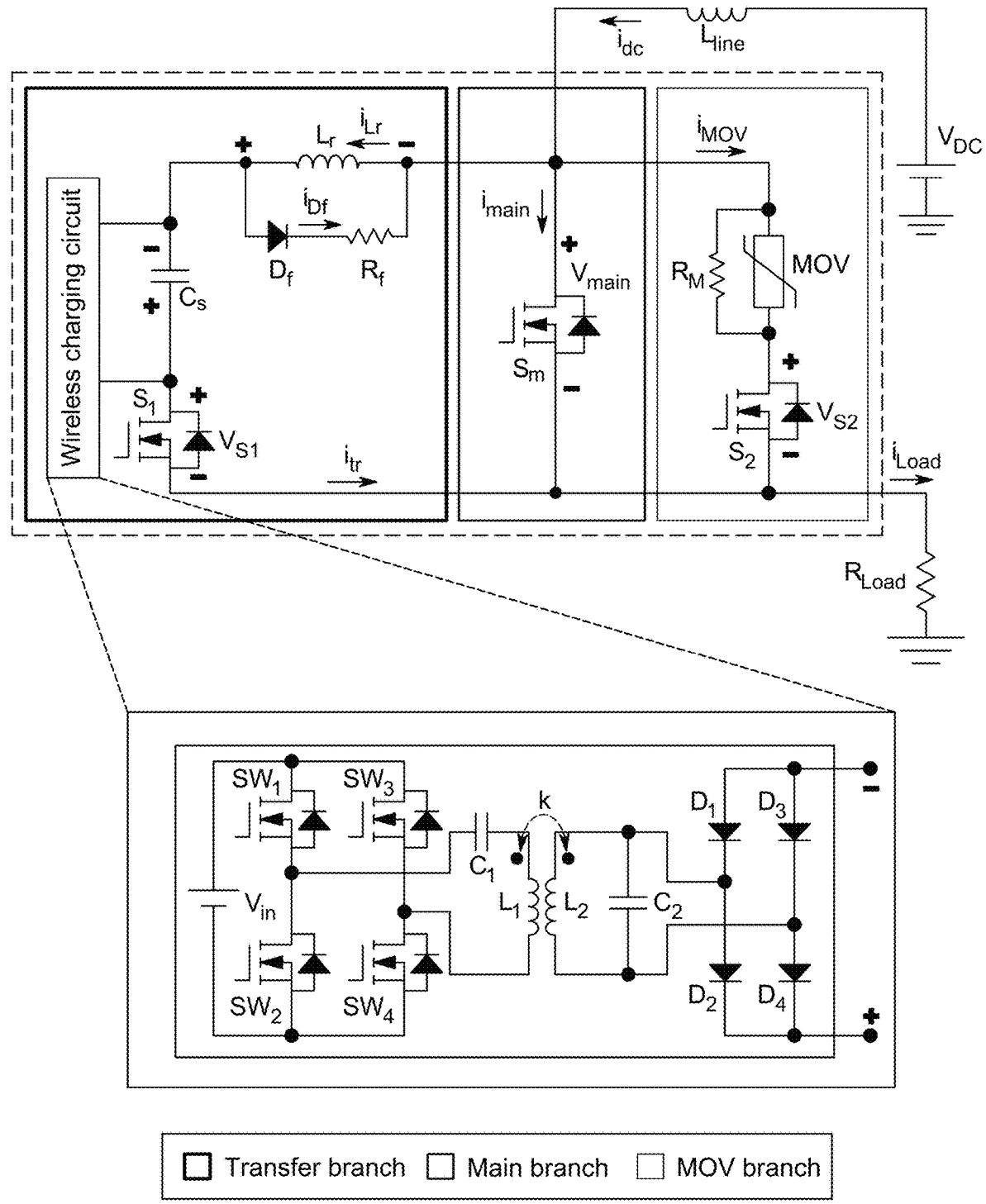
FIGS. 49(a) and 49(b) show the proposed SSCB circuit topology and working principle respectively.

4.1. Proposed SSCB Circuit Working Principle 4.1.1. Proposed Topology and Innovations FIG. 49(a) shows the proposed SSCB circuit, including three parts: main branch, transfer branch, and MOV branch. In the transfer branch, a pulse current is generated by a low voltage pre-charged capacitor Cs and an inductor Lr, and it is injected into the main branch during DC current interruption to achieve a soft-switching turn-off.

To obtain a fast speed operation in the AIC: 1) the current rising time is short to achieve a fast response, and its duration can be tuned effectively for different DC current levels, 2) benefiting from a freewheeling branch connected in parallel with Lr and the SiC injection switch S1, the transfer branch current can be quickly interrupted after achieving soft switching turn-off in the main branch, which minimizes the total active time of the AIC.

Cs is charged by the wireless converter from a low-voltage input DC source operating in a burst mode. It does not require additional discharge circuits, which leads to a compact and simple design and facilitates reclosing. In addition, it can provide high-voltage isolation and reduce the switching and conductive power losses. As compared to self-charging AICs, the proposed transfer branch provides: 1) increased flexibility in generating pulse currents with controlled magnitude and time duration, 2) more compactness by choosing optimized passive components and removing the need for discharge circuits.

A series SiC switch is connected with MOV to eliminate the leakage current in the turn-off status. Meanwhile, a parallel resistor is connected with MOV, which helps to accelerate the energy dissipation process and reduce the voltage oscillation. The new structure can effectively reduce the SSCB's reset time interval before reclosing.

4.1.2. Working Principles

FIG. 49(b) and FIGS. 50(a)-(c) indicate waveforms, switching states, and operation modes to show the detailed working principle. 1) Before t1 (Mode I). Sm is on and conducts the DC current (imain=idc). S1 is off (itr=0). Wireless converter efficiently charges the capacitor Cs and keeps VCs constant. S2 has been turned on, but its current is zero iMOV=0.

2) During t1≤t<t2 (Mode II). Current interruption process begins at the beginning of this mode. S1 turns on at t=t1 to generate a pulse current iLr to cancel the main DC current imain.

Figure 49B:
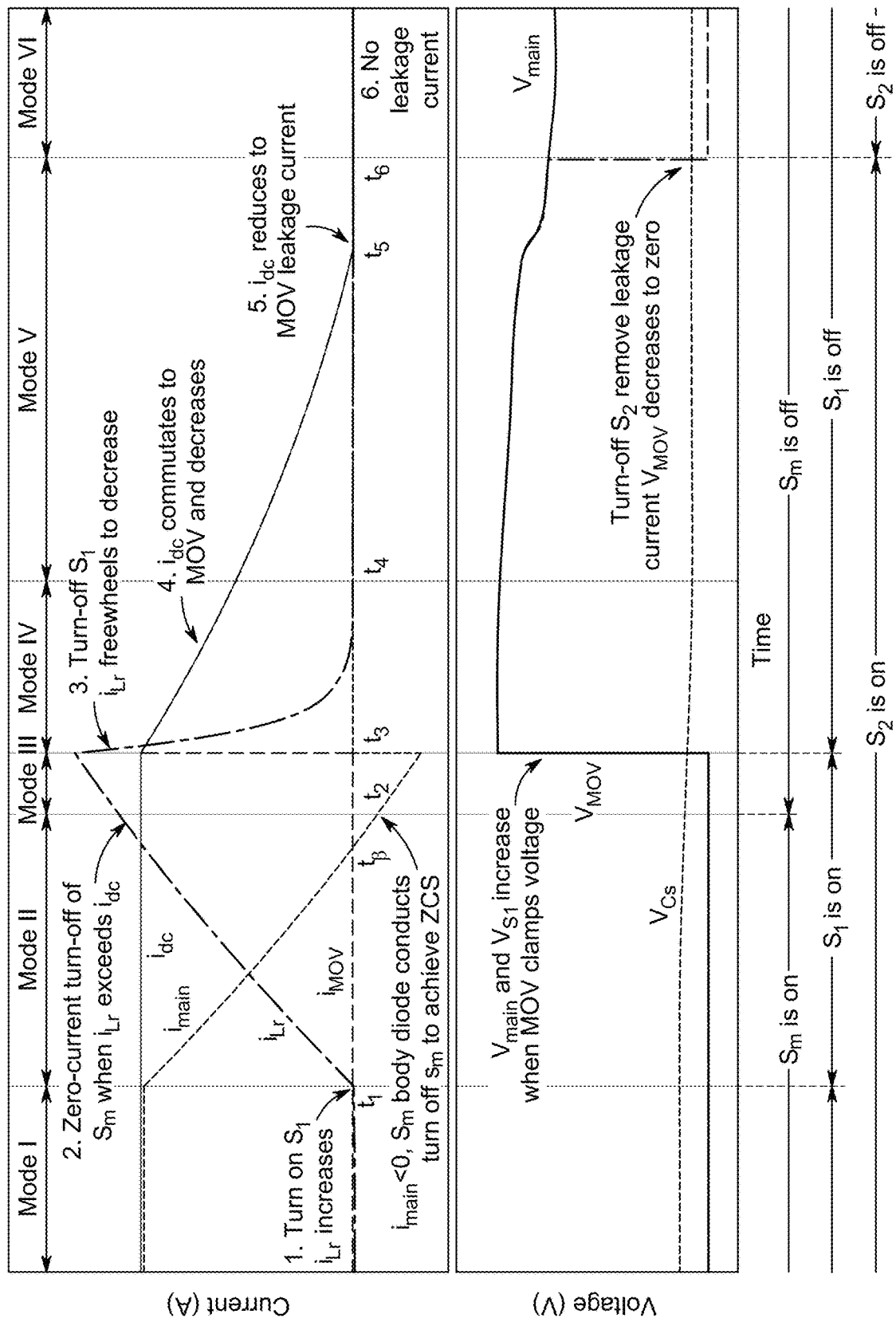

As iLr starts to increase, imain begins to decrease as represented in FIG. 49(b). Also, Vmain is zero, and VCs decreases slightly as the pulse current is generated. At the end, imain is realized entirely.

3) During t2≤t<t3 (Mode III). At t=t2, Sm turns off in a soft switching condition when imain≤0. In this case, itr continues to flow through the body diode of Sm.

4) During t3≤t<t4 (Mode IV). S1 turns off at t=t3 to interrupt the current in the transfer branch. iLr starts to flow through the freewheeling circuit. The voltages across S1 and Sm begin to increase. When Vmain exceeds the threshold voltage of MOV, the fault current commutates to the MOV branch. In this case, iMOV=idc, imain=0, itr=0, and the voltage Vmain is clamped by the MOV, meaning Vmain≤Vclamp.

5) During t4≤t<t6 (Mode V). iLr reduces to zero at t=t4. The residual energy in the DC system line-inductance is dissipated in MOV. At t=t5, the SSCB voltage begins to return to the nominal DC voltage. Due to the parallel resistance RM and MOV, iMOV=0.

6) After t6 (Mode VI). S2 turns off and holds the DC voltage in the MOV branch; the leakage current is eliminated iMOV=0.

4.1.3. Function of Parallel Resistor RM

The resistor RM mainly has two functions. First, when MOV is conducting during Modes IV and V, it contributes to reduce the voltage oscillations across the switch Sm. As RM also dissipates power, it can accelerate the transient process for the MOV voltage to decrease, especially shortening mode V. In this case, the SSCB voltage returns to the nominal value faster, which reduces the reset time of the SSCB before reclosing.

Second, RM helps to reduce the voltage on MOV to zero in the turn-off status at Mode VI. The MOV resistance is usually around 100s of MΩ which is much larger than the turn-off resistance of a MOSFET (e.g., S2). If there is no RM, the MOV voltage is close to the input DC source, which requires MOV to have high threshold and clamping voltages. However, with a parallel RM, the MOV voltage is reduced to zero in mode IV, meaning a MOV with a low voltage rating can be adopted to reduce the peak voltage during turn off. Also, according to the analysis in section II, lower peak voltage during turn-off decreases the voltage oscillations on the gate of the main switch. Meanwhile, the additional switch S2 is used to eliminate the leakage current.

4.1.4. Design Procedure

Figure 51:
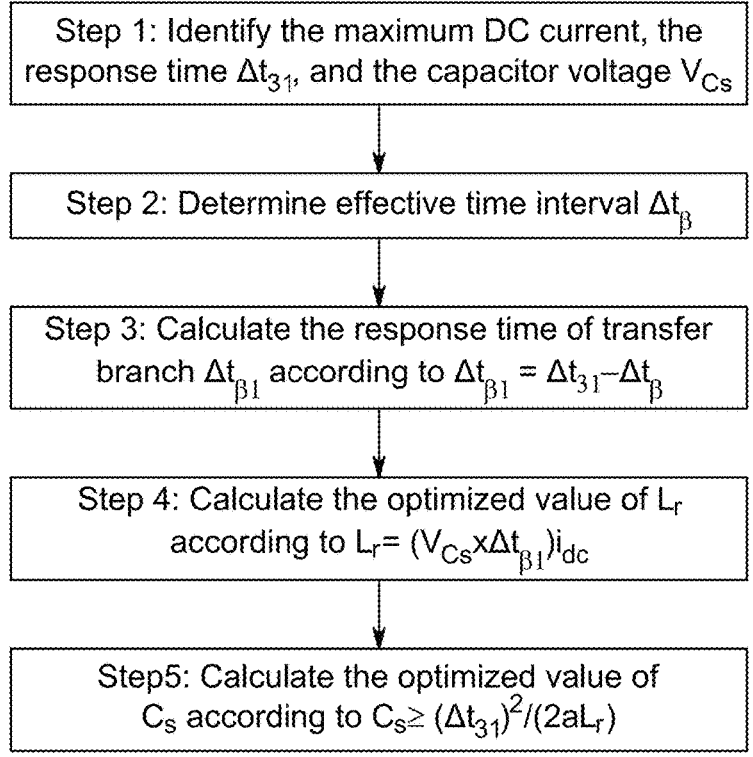
FIG. 51 shows the flowchart of the proposed design procedure.
Figure 52:
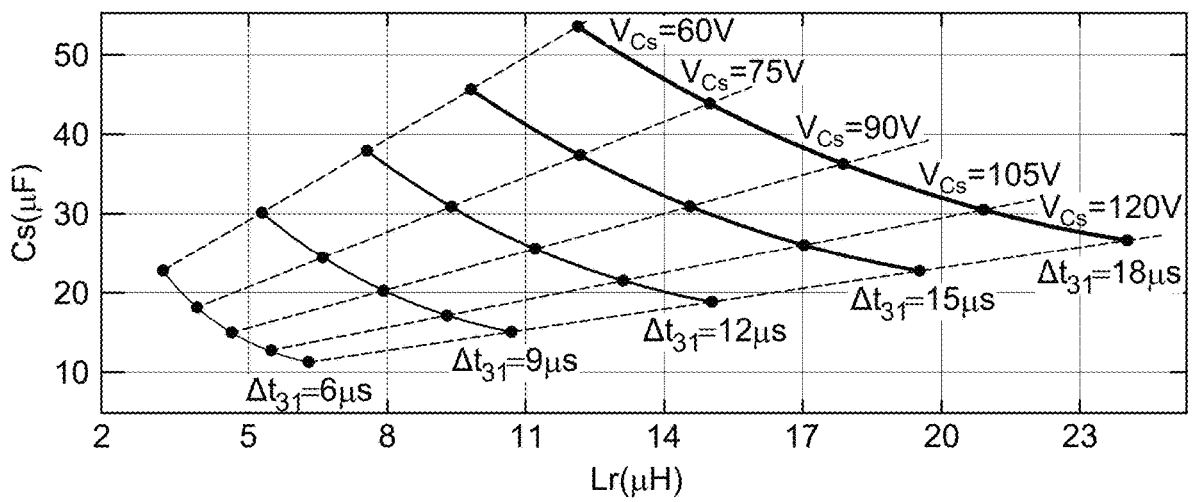
FIG. 52 shows optimized Cs and Lr for different values of the response time (Δt31) and VCs. The interruption current is 80 A, Δtβ=1.8 μs, and α=0.25.

According to FIG. 49(b), at t=t8, there are iLr=idc and imain=0. By ignoring the resistances of MOSFET and Lr, the current relationship is derived as below.

$$(V_\alpha/L_r) \times \Delta t_{\beta 1} = i_{dc} \quad (35)$$

where $\Delta t\beta 1 = t\beta - t1$ is the response time of the transfer branch. As indicated in FIG. 49(b), $\Delta t\beta = t3 - t\beta$ defines the effective time interval in which Sm can be turned off in a soft-switching condition. In practice, the minimum value of the effective time interval $\Delta t\beta$,min is determined by the hardware delay time of the control platform, gate driver, and MOSFET. Therefore, the response time of the SSCB to interrupt the DC current is determined as follows:

$$\Delta t_{31} = \Delta t_{\beta 1} + \Delta t_\beta \quad (36)$$

where α stands for an acceptable percentage reduction of VCs during modes II and III shown in FIG. 49(b). The flowchart of the proposed design procedure is indicated in FIG. 51. Also, for the proposed 80 A SSCB, the optimized values for Cs and Lr for different values of the response time ($\Delta t31$) and VCs are graphically shown in FIG. 52, where $\Delta t\beta$ is considered as 1.8 μs, and α=0.25.

4.2. Experimental Validation

Figure 53:
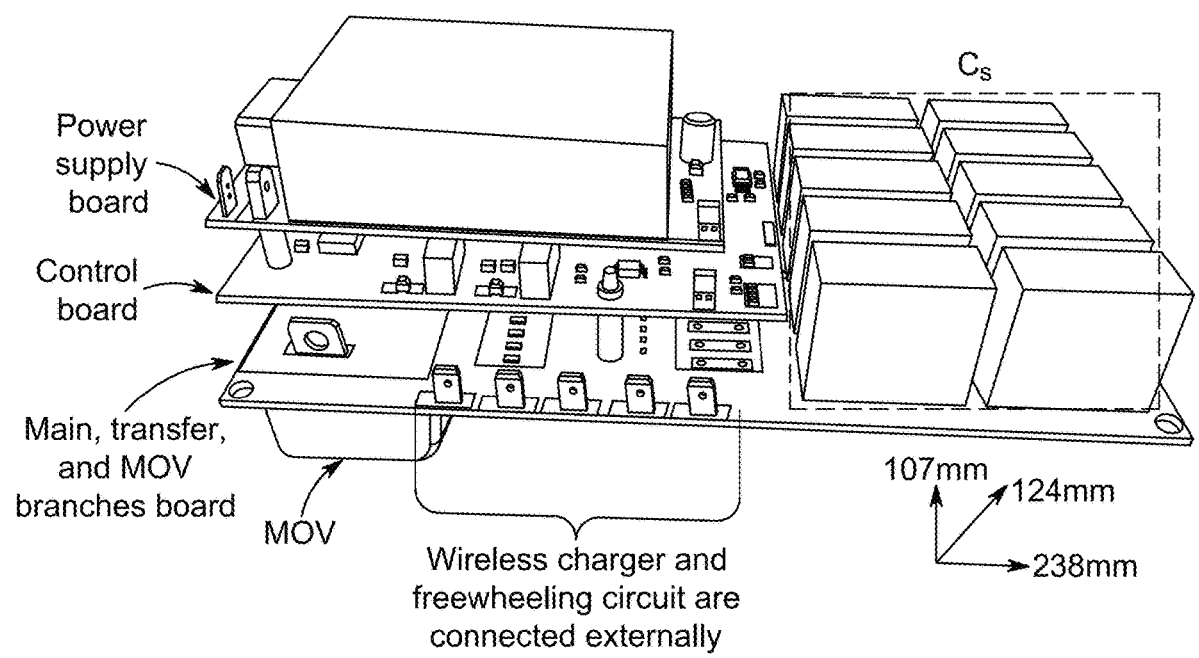
FIG. 53 shows a 380 V/80 A SSCB prototype.

FIG. 53 shows a 380 V/80 A SSCB prototype. The wireless charger and freewheeling circuit are connected externally.

4.2.1. Hardware Description

FIG. 67, Table 10 shows the circuit parameters. C3M0016120D from CREE is used in the main, transfer, and MOV branches. MSC030SDA120B diode from Microchip is used as Df. V321DB40 MOV from Little fuse with a rated voltage of 420V and a maximum clamping voltage of 830V is employed. RM is 1 kΩ, and its power rating can be minimized to enhance the compactness. The SSCB is controlled by STM32F103 microcontroller operating at 72 MHz.

Considering the design procedure of FIG. 51, VCs of 85V, the SSCB response time of 9.4 μs, the effective time interval of 1.8 μs, α=0.25, Lr=8 μH, and Cs=22 μF are selected for experiments. However, to compensate the capacitor voltage ripple and the voltage drop on parasitic resistances, VCs is increased to 104V in the hardware tests.

4.2.2. Experiment: Wireless Charging Realization

An inductive power transfer (IPT) system is designed to charge the capacitor Cs and maintain its voltage. During the working process, this wireless charger operates at a light load condition. There are two methods to limit its power loss. First, a series-parallel compensation circuit is adopted to reduce the input dc voltage and the switching loss. In this case, the voltage gain is 15, and the input dc voltage is only 6.8V. Second, the IPT system works in a burst mode control to limit the conductive loss. Besides, the circuit parameter values are designed to achieve soft-switching for the input-side inverter.

Figure 54:
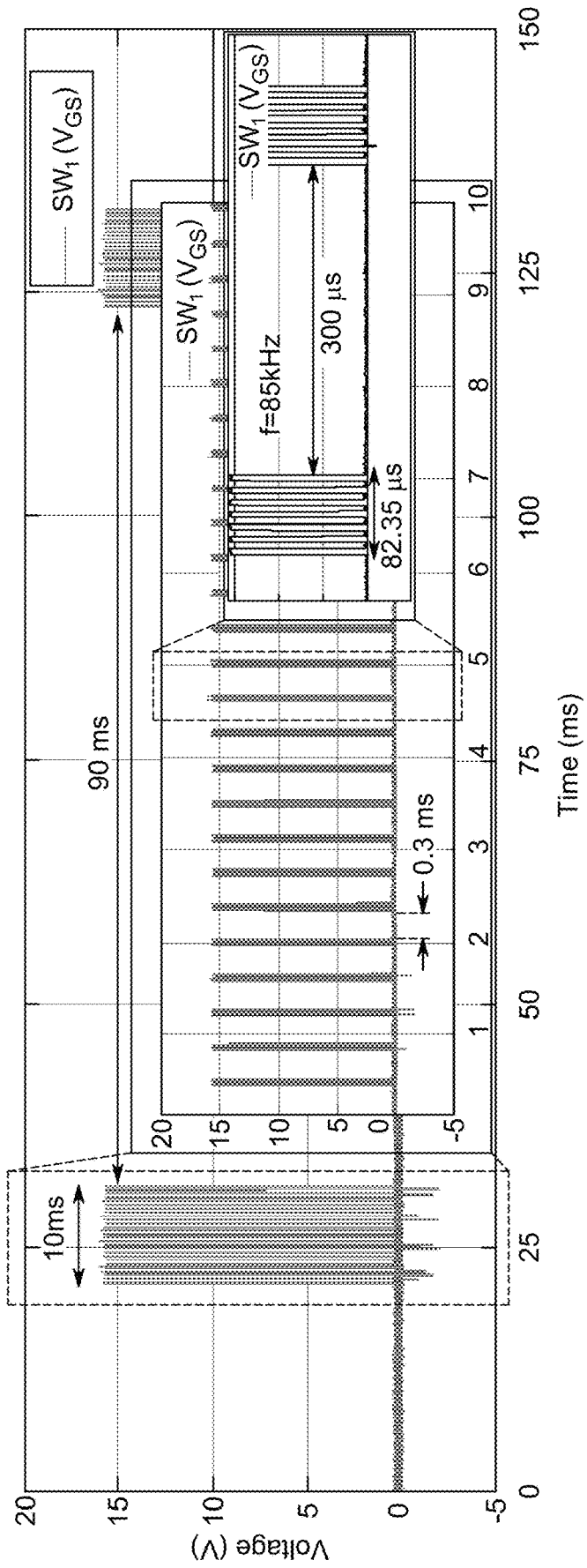
FIG. 54 shows experimental results: Burst mode switching pulse implemented to control inverter for the wireless charger.

FIG. 54 shows the gate signal in the inverter of the wireless charger, which clearly indicates the burst mode control.

4.2.3. Experiment: 380 V/80 A/9.4 μs DC Current Interruption

FIG. 54 shows the DC current (idc), transfer inductor current (iLr), and drain-source voltages on Sm (Vmain), S1 (VS1), and S2 (VS2). Before operation, the DC input voltage is set as Vmain=380 V, the capacitor Cs is charged to VCs=104V, the inductor voltage is VLr=0, and the voltage on S1 is VS1=484V, which is consistent with the SSCB topology as follows:

$$V_{main} = V_{31} - V_{Lr} - V_\alpha \quad (37)$$

During operation, Sm turns on for 350 μs. When imain (=idc) reaches 80 A, the DC current interruption process begins. S1 turns on to generate a reverse pulse current to compensate the DC current, providing a soft-switching turn-off at Sm. It has shown a rapid response speed.

Regarding the bottom side of FIG. 54, the response time of the SSCB is 9.4 μs, iLr reduces to zero after 48.4 μs (39 μs+9.4 μs), and the DC current interruption process completes in 77 μs. The response time of the proposed SSCB can be further reduced by increasing VCs and decreasing Lr according to the DC system inertia.

FIG. 54 also shows the overvoltage and oscillation during the switching transient. This voltage contributes to reduce the current in the main DC power system. The maximum Vmain reaches 721V; meanwhile, the peak value of VS1 reaches 980V.

To protect S1 during turn-off, three ERZV20D820 MOVs from Panasonic with a rated voltage of 65V and maximum clamping voltage of 135V are connected in parallel to Lr.

Regarding Eq. (37), the difference between Vmain and VS1 is determined by VCs+VLr. In addition to that, the stored inductive energy in the parasitic inductance of the transfer branch is also the source of the high voltage stress on VS1. In this design, VCs and VLr are minimized to limit the overvoltage. Since 1.2 kV device is utilized, there is still a sufficient safety margin.

4.2.4. Experiment: Soft-Switching Validation

Figure 55:
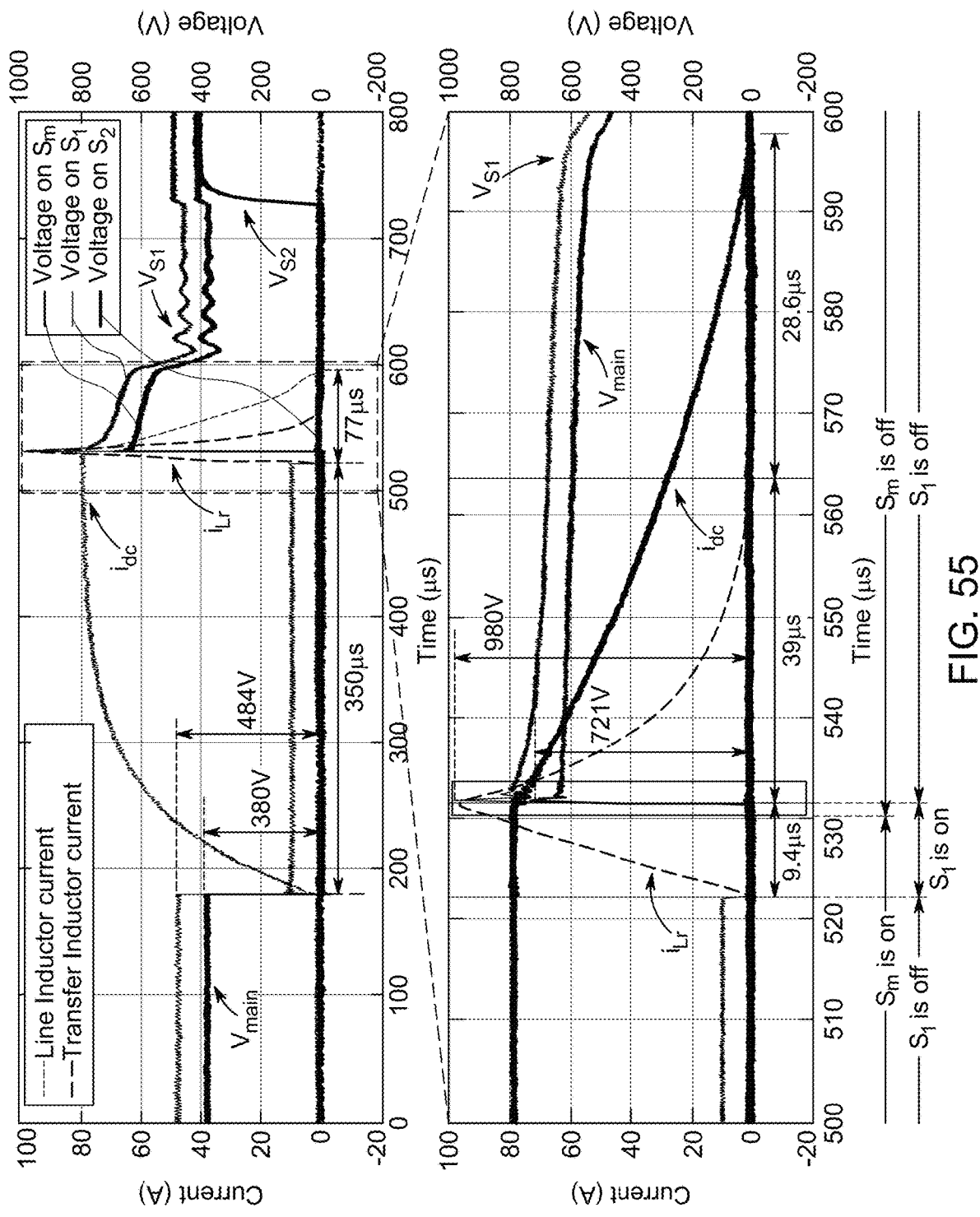
FIG. 55 shows experimental results: Line inductor current (idc), transfer inductor current (iLr), and voltage on Sm (Vmain), S1 (VS1), and S2 (VS2).

FIG. 55 illustrates the gate voltage waveforms on Sm (VGS,Sm), S1 (VGS,S1) and the current waveform of iLr during DC current interruption. It clearly shows the operation sequence of the proposed SSCB.

When S1 turns on, the inductor current iLr starts to increase linearly from zero. Since the inductor Lr is relatively small, the current iLr increases very fast. After 7.6 μs, it reaches the DC current, 80 A. At this point, there is an effective time interval $\Delta t\beta$=1.8 μs in which Sm can be turned off reliably in a soft switching condition.

In this experiment, Sm turns off after 8.7 μs, and the inductor current iLr increases to 88 A, which is sufficient to achieve soft switching turn-off in Sm. Then, after an additional 0.7 μs, S1 also turns off. At this time, the maximum current iLr reaches 96.5 A.

Therefore, the total active time interval of the proposed SSCB is determined as 9.4 μs. The delay of 0.7 μs is determined based on the hardware delay time of gate-driver circuits and SiC turnoff delay time. This delay is required to make sure that Sm is completely off, and its gate voltage is stabilized at negative 5V.

It should be emphasized that this control process is time sequence based, which does not require real-time detections during the transient. It will be relatively simple and reliable to be applied in practical applications.

Regarding FIG. 55, it is clear that the proposed AIC SSCB effectively eliminates the effects of parasitic components in the main switch during DC current interruption. As the Sm's gate source voltage waveform represents in FIG. 55, the voltage oscillations due to the Miller effect of the SiC MOSFET and the common impedance coupling have been removed completely, which guarantees no false turn-on triggering during DC current interruption. Besides, as multiple SiC MOSFETs are connected in parallel to enhance the efficiency in practice, the proposed AIC is more applicable to provide a reliable soft-switching turnoff by preventing gate voltage oscillations due to the parasitic components. The proposed AIC SSCB can improve the full utilization of SiC MOSFETs while maintaining compactness and reliability.

4.2.5. Experiment: MOV Oscillation and Leakage Elimination

Figure 56:
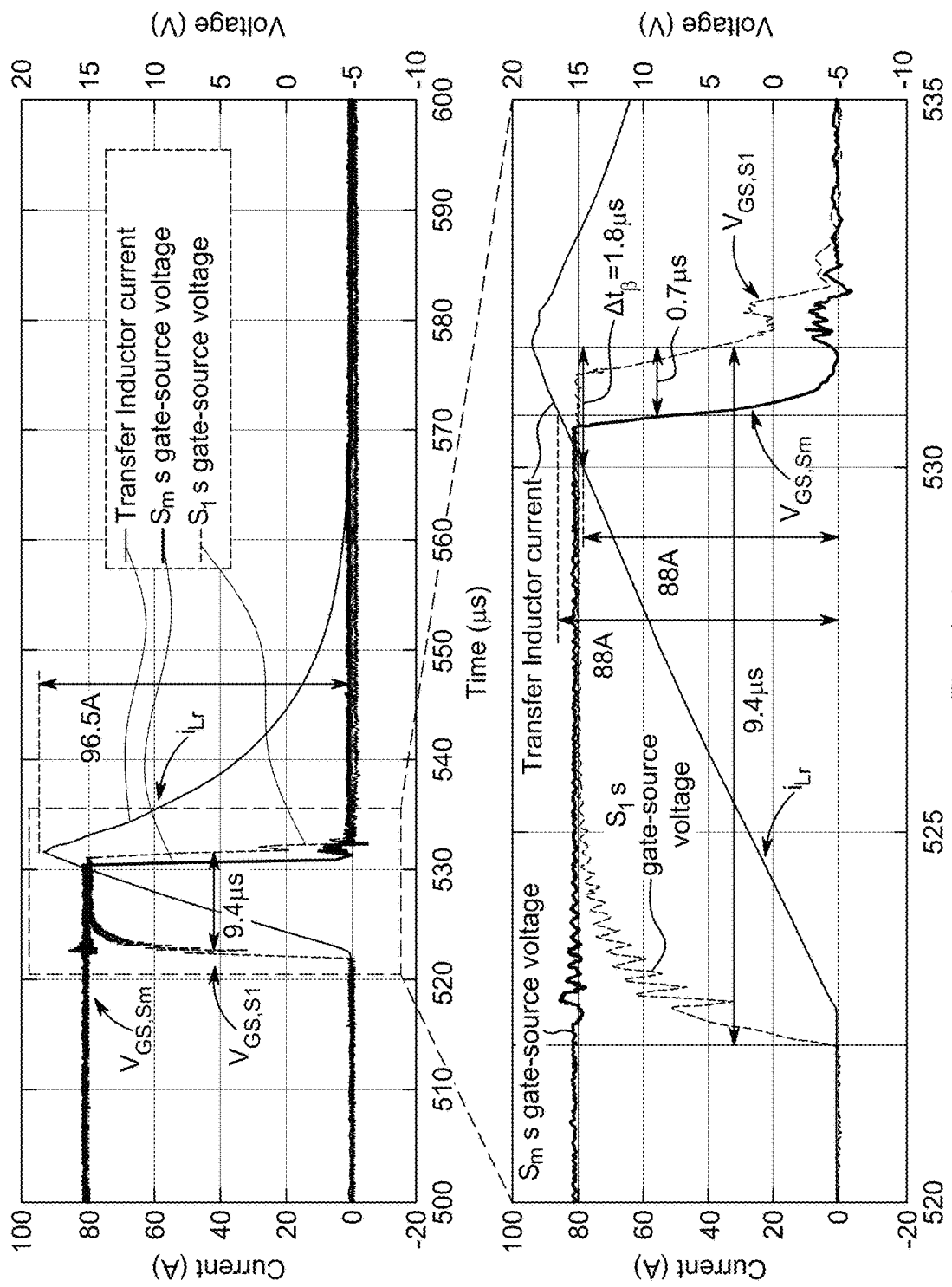
FIG. 56 shows experimental results: Transfer inductor current (iLr), and gate-source voltage of Sm (VGS,Sm) and S1 (VGS,S1).

FIG. 56 illustrates the current idc and iLr, and the voltage Vmain, VS2, and VMOV. After S1 turns off, it clearly shows that VMOV reduces rapidly, and there is a very little oscillation that can be neglected. In addition, after S2 turns off, VMOV further reduces to zero, which completely eliminates the leakage current. In the experiment, MOV is in parallel with RM of 1 kΩ When the MOV is conducting a high current, it dominates the voltage across Sm. When its current reduces to leakage currents, RM contributes to limit the voltage oscillation.

Figure 57:
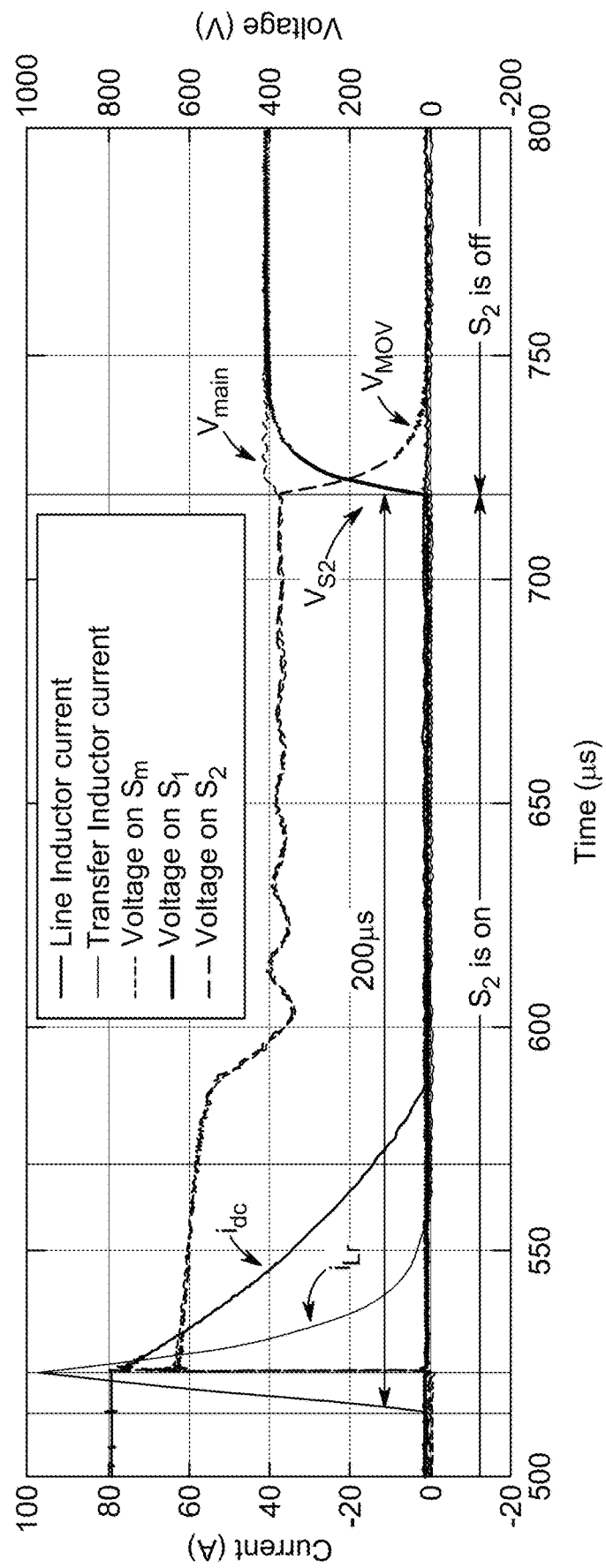
FIG. 57 shows Experimental results: Line inductor current (idc), transfer inductor current (iLr), and voltage on Sm (Vmain), S2 (VS2) and MOV (VMOV).

As shown in FIG. 57, After absorbing the stored inductive energy in the line inductor by the MOV, S2 turns off at t=722 μs. Since RM is much lower than the turn-off resistance of S2, the voltage across the MOV reduces to zero, and S2 holds the DC voltage. Therefore, there are no leakage currents in the MOV branch and no power dissipations on the MOV anymore. This obtains the possibility to choose MOVs with lower clamping voltage, which consequently decreases the peak value of voltage oscillations across the main switch. Also, compared with the conventional SSCBs, the reset time of the SSCB before reclosing can be reduced to tens of μs.

While the invention has been described with reference to the embodiments, a person of ordinary skill in the art would understand that various changes or modifications may be made thereto without departing from the scope of the claims.

The invention claimed is:

1. A solid-state circuit breaker for fault protection comprising:
   a conduction branch including stacked medium voltage (MV) silicon carbide (SiC) devices; and
   a breaker branch comprising a modular current programmable power supply (PPS);
   capacitive couplings joining the conductive branch to the breaker branch in parallel;
   wherein upon detection of a short-circuit fault, the modular current PPS generates a current pulse that flows through one of the coupling capacitors and reduces the current flowing through the conduction branch to zero.

2. The solid-state circuit breaker of claim 1, wherein the solid-state circuit breaker is a DC solid-state circuit breaker.

3. The solid-state circuit breaker of claim 2, wherein the solid-state circuit breaker is designed for voltages in a range from 1 kV-100 kV.

4. The solid-state circuit breaker system of claim 3, wherein the capacitive couplings are made from metal and the conduction loss of the couplings is minimized.

5. The solid-state circuit breaker system of claim 3, wherein in the normal conduction state, the modular current PPS is not working and there is no current flowing through the capacitive couplings.

6. The solid-state circuit breaker of claim 3, wherein the breaker branch compensates or completely cancels the current increase during the fault time inside the solid-state circuit breaker.

7. The solid-state circuit breaker of claim 3, wherein the capacitive couplings are wireless.

8. The solid-state circuit breaker of claim 3, wherein a value of the current is determined based on the circuit parameters and an input voltage source.

9. The solid-state circuit breaker of claim 3, wherein the capacitive couplings use a parallel plate structure.

10. The solid-state circuit breaker of claim 9, wherein parallel plates in the structure are rectangular.

11. The solid-state circuit breaker of claim 9, wherein parallel plates in the structure are disc shaped.

12. The solid-state circuit breaker of claim 9, wherein the structure is cylindrical.

13. The solid-state circuit breaker of claim 3, wherein a two-switch forward converter is used as a voltage input to charge the capacitive couplings to provide a desired initial voltage.

* * * * *